United States Patent
Ito et al.

(10) Patent No.: US 10,059,539 B2
(45) Date of Patent: Aug. 28, 2018

(54) CONVEYANCE SYSTEM FOR OBJECT TO BE CONVEYED AND CONVEYANCE METHOD

(71) Applicant: TOYOTA STEEL CENTER CO., LTD., Tokai-shi (JP)

(72) Inventors: Nobuaki Ito, Tokai (JP); Manabu Matsumoto, Tokai (JP)

(73) Assignee: TOYOTA STEEL CENTER CO., LTD., Tokai-shi (JP)

( * ) Notice: Subject to any disclaimer, the term of this patent is extended or adjusted under 35 U.S.C. 154(b) by 154 days.

(21) Appl. No.: 15/027,363

(22) PCT Filed: Nov. 22, 2013

(86) PCT No.: PCT/JP2013/081547
§ 371 (c)(1),
(2) Date: Apr. 5, 2016

(87) PCT Pub. No.: WO2015/075822
PCT Pub. Date: May 28, 2015

(65) Prior Publication Data
US 2016/0236881 A1    Aug. 18, 2016

(51) Int. Cl.
*B65G 67/04* (2006.01)
*B65G 69/24* (2006.01)
(Continued)

(52) U.S. Cl.
CPC ............. *B65G 69/24* (2013.01); *B65G 67/04* (2013.01); *B65G 67/20* (2013.01); *B65G 67/24* (2013.01); *B65G 69/006* (2013.01)

(58) Field of Classification Search
CPC ........ B65G 67/04; B65G 67/20; B65G 67/24; B65G 69/006; B65G 69/24
(Continued)

(56) References Cited

U.S. PATENT DOCUMENTS 3,250,408 A * 5/1966 Syl Daniluk ............. B60P 1/36
254/94
3,710,961 A * 1/1973 Bornstein ............... B61D 47/00
414/396
(Continued)

FOREIGN PATENT DOCUMENTS

AU    2004291426 B2    1/2011
CN    88 1 01498 A    10/1988
(Continued)

OTHER PUBLICATIONS

Combined Chinese Office Action and Search Report dated Apr. 5, 2016 in Patent Application No. 201310701111.0 (with English language translation and English translation of categories of cited documents).
(Continued)

*Primary Examiner* — Mark C Hageman
(74) *Attorney, Agent, or Firm* — Oblon, McClelland, Maier & Neustadt, L.L.P.

(57) ABSTRACT

Provided is a conveyance system for an object and for conveying the object to a container mounted on a chassis of a trailer. The conveyance system includes a jack device that lifts the chassis from below, and a stage device arranged behind the jack device. The stage device includes a conveyance body on which the object is placed and conveyed, a stage on which the conveyance body travels, a mobile body supporting the stage and capable of movement in a front-back direction of the chassis, and a jack mechanism provided to the mobile body and that raises the stage from below to lift or lower the stage. The mobile body moves forward and the jack mechanism lowers the stage while the jack device raises the chassis, and the conveyance body travels on floor faces of the stage and the container in this state to convey the object to the container.

8 Claims, 41 Drawing Sheets

(51) Int. Cl.
*B65G 67/20* (2006.01)
*B65G 67/24* (2006.01)
*B65G 69/00* (2006.01)

(58) Field of Classification Search
USPC ............ 414/391–393, 395–396, 398–401
See application file for complete search history.

(56) References Cited

U.S. PATENT DOCUMENTS

| | | | |
|---|---|---|---|
| 3,727,777 A | | 4/1973 | Hanson |
| 4,469,277 A | * | 9/1984 | Howes .................. B60S 13/00 |
| | | | 180/313 |
| 4,699,337 A | * | 10/1987 | Lewis ...................... B64D 9/00 |
| | | | 244/137.1 |
| 4,969,792 A | * | 11/1990 | Ellis ..................... B65G 69/005 |
| | | | 188/32 |
| 5,082,415 A | | 1/1992 | Hayashi |
| 6,318,947 B1 | * | 11/2001 | Hahn ................... B65D 88/121 |
| | | | 410/82 |
| 6,450,753 B1 | * | 9/2002 | Hallstrom ............ B65G 25/065 |
| | | | 414/396 |
| 7,914,042 B2 | * | 3/2011 | Andersen ............ B65G 69/003 |
| | | | 280/762 |
| 9,371,201 B2 | * | 6/2016 | Ward ..................... B65G 67/22 |
| 2002/0094258 A1 | | 7/2002 | Iwasaki et al. |

FOREIGN PATENT DOCUMENTS

| | | |
|---|---|---|
| CN | 1362356 A | 8/2002 |
| CN | 102874611 A | 1/2013 |
| CN | 203652825 U | 6/2014 |
| FR | 2 320 883 A3 | 3/1977 |
| JP | 61-166434 A | 7/1986 |
| JP | 2620707 B2 | 6/1997 |
| JP | 11-199058 A | 7/1999 |
| JP | 11-343034 A | 12/1999 |
| JP | 2002-205826 A | 7/2002 |
| JP | 2008-189004 A | 8/2008 |
| JP | 4381796 B2 | 12/2009 |
| KR | 10-2002-0055383 A | 7/2002 |
| WO | 2005/049461 A1 | 6/2005 |

OTHER PUBLICATIONS

International Search Report dated Feb. 18, 2014 in PCT/JP13/081547 Filed Nov. 22, 2013.
Japanese Office Action dated Oct. 25, 2017 in Patent Application No. 10-2016-7010605 (with English Translation).

* cited by examiner

FIG.12
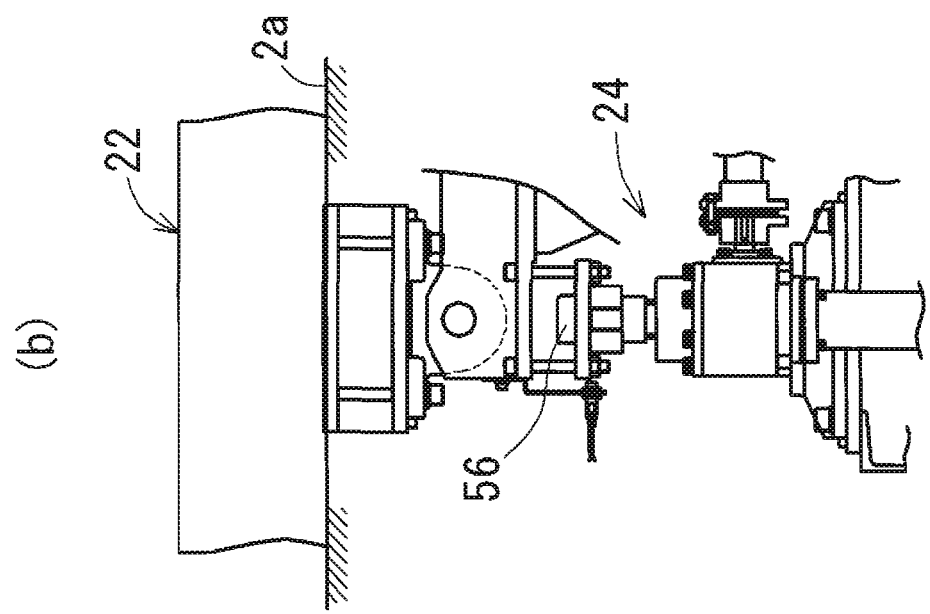
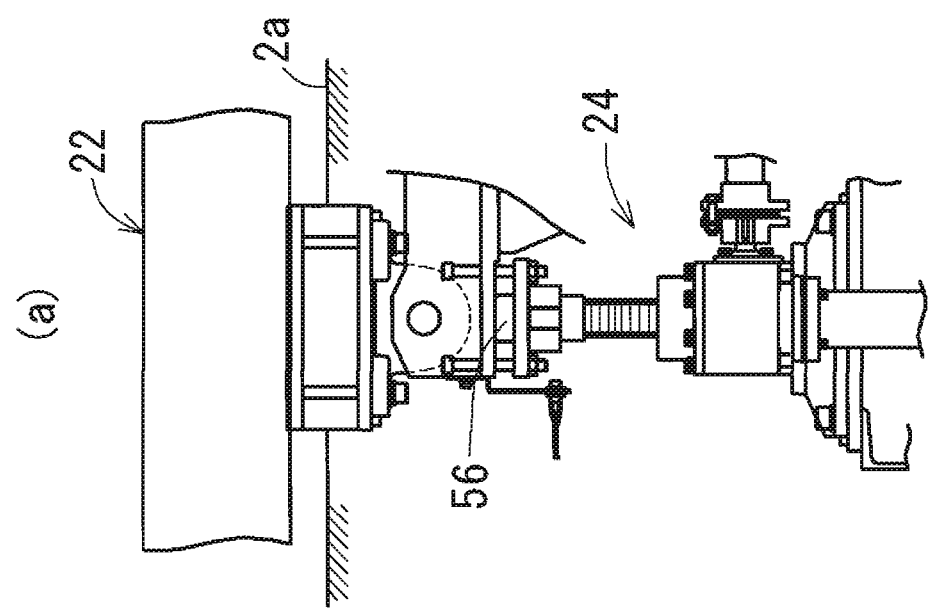

FIG.14
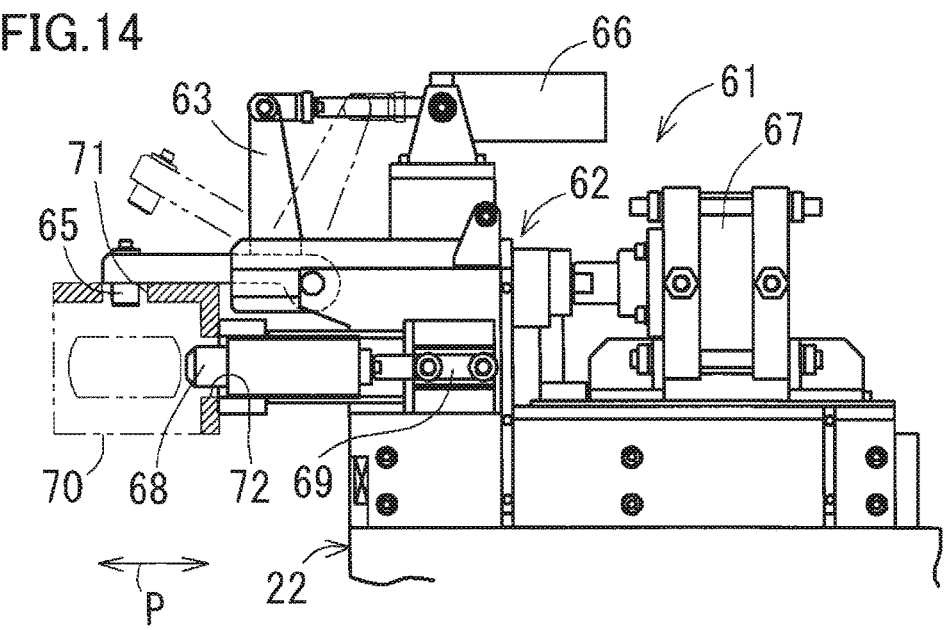
FIG.15
(a) 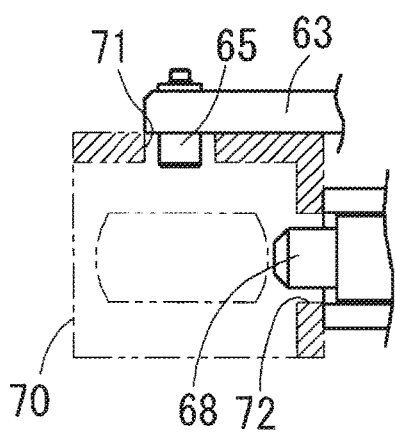   (b) 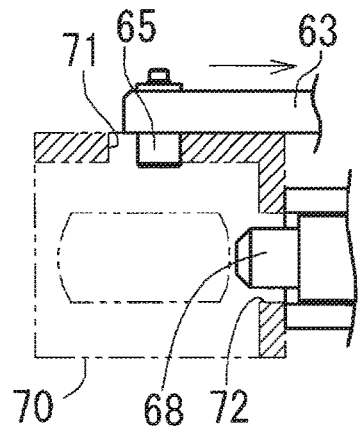

FIG.23
(a)
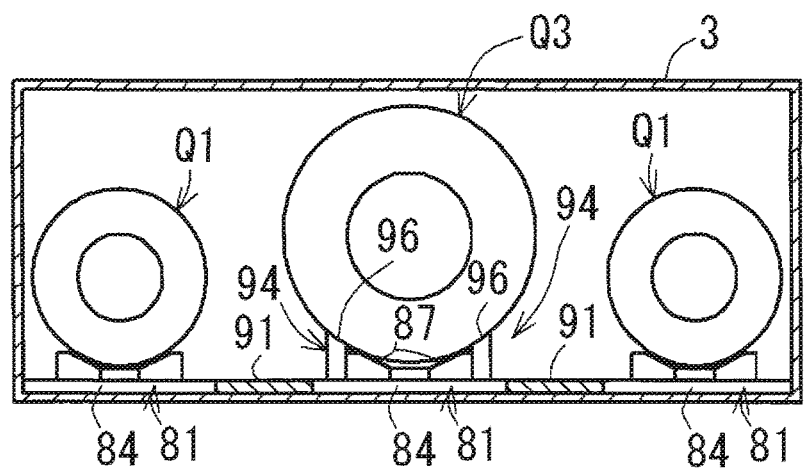
(b)
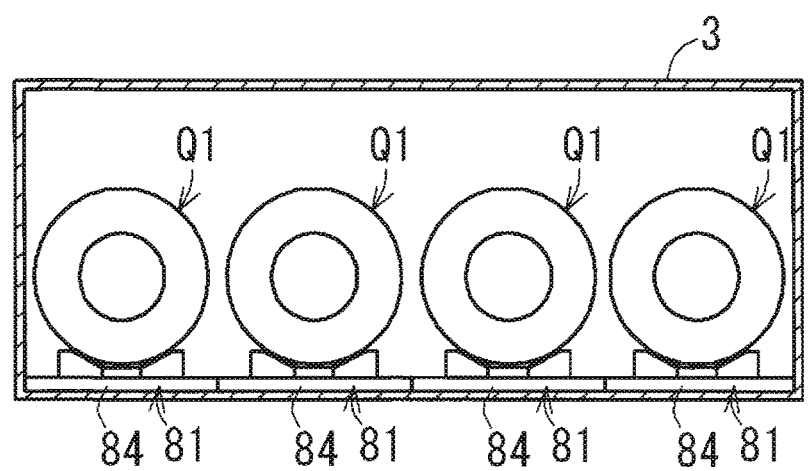
(c)
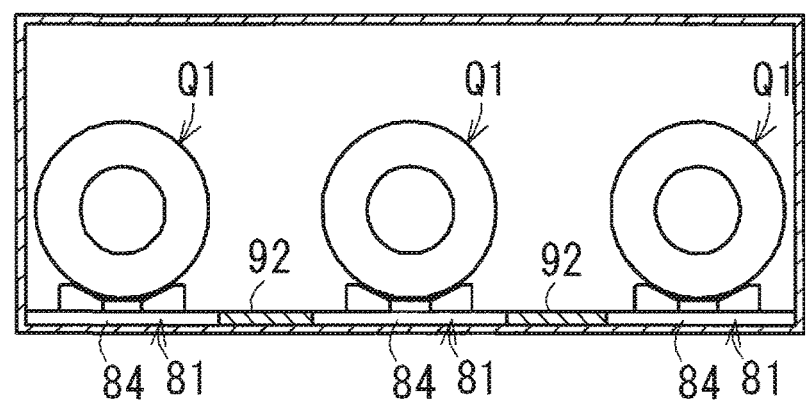

FIG.24
(a)
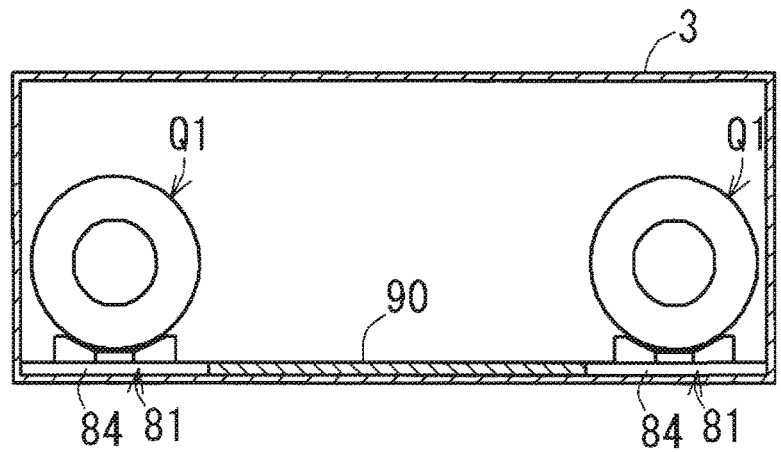
(b)
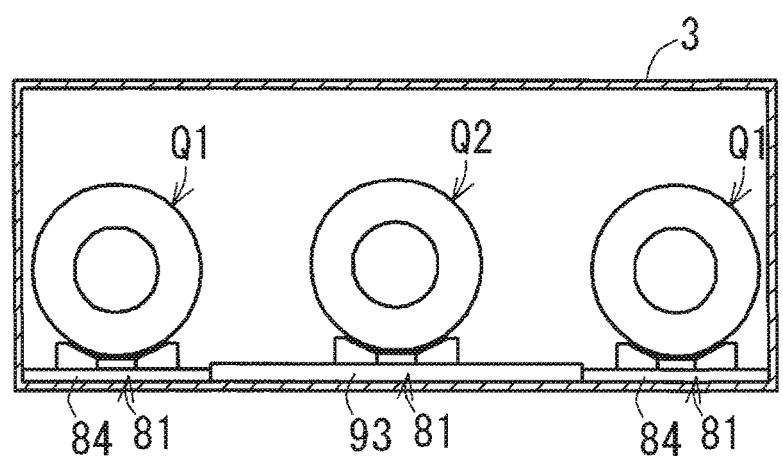
(c)
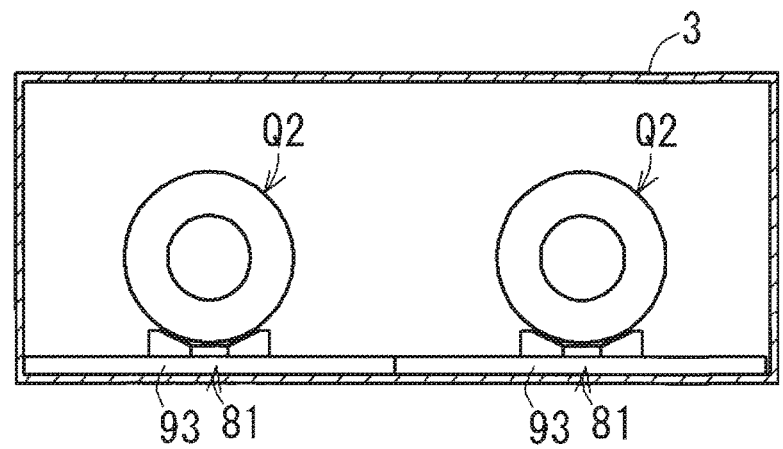

FIG.25
(a)
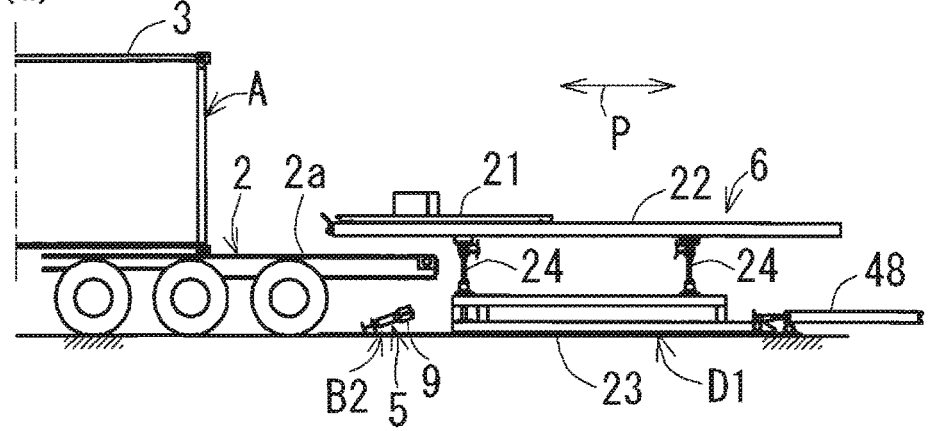
(b)
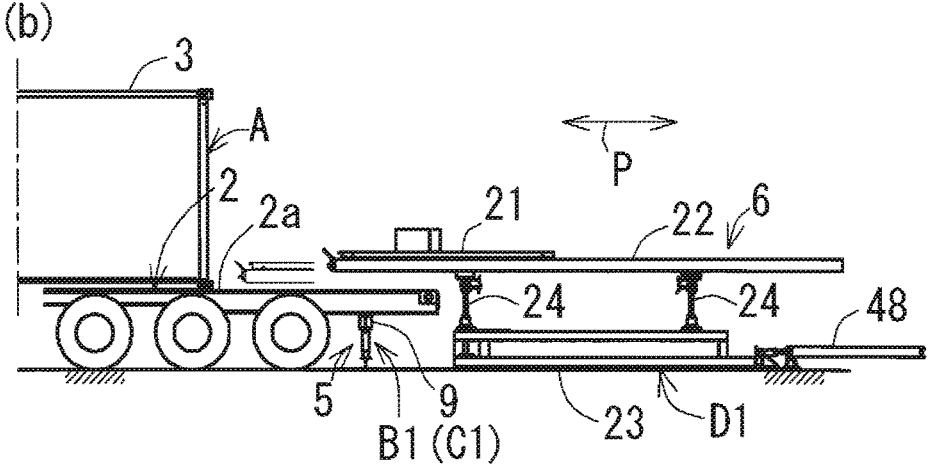
(c)
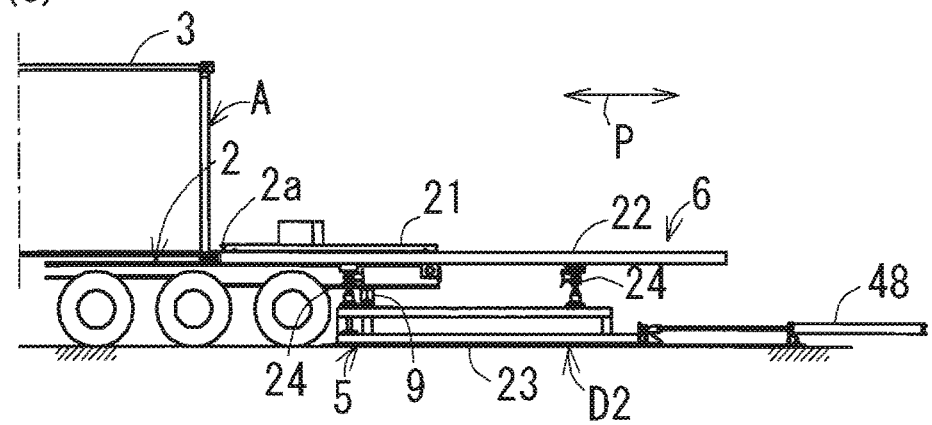

FIG.26
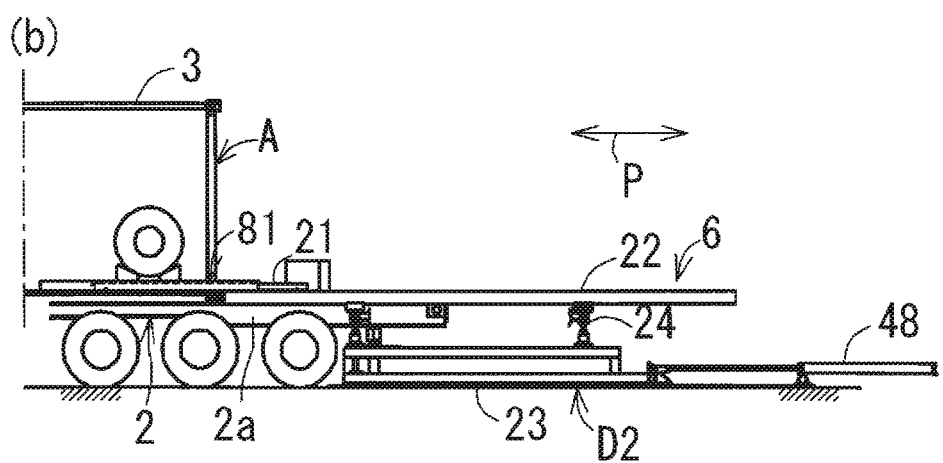
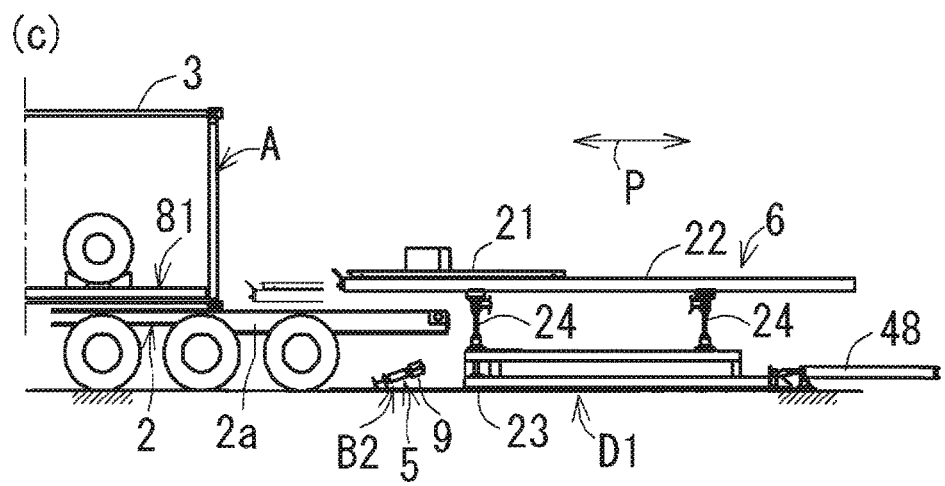

FIG.27
(a)
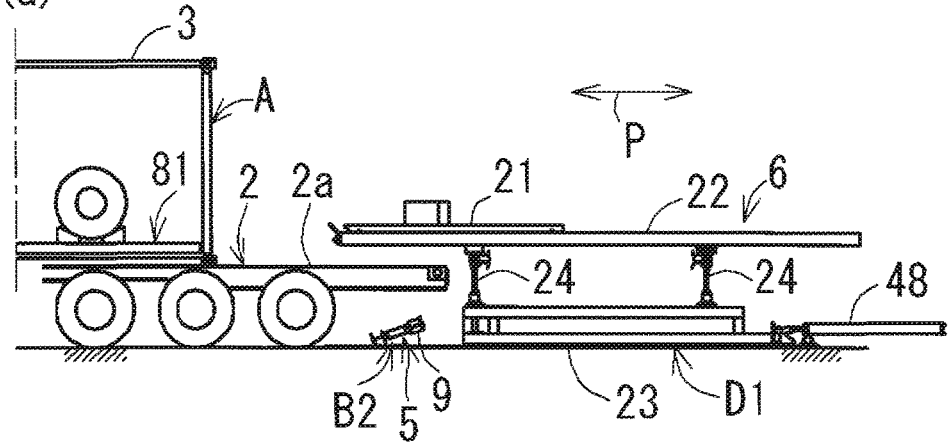
(b)
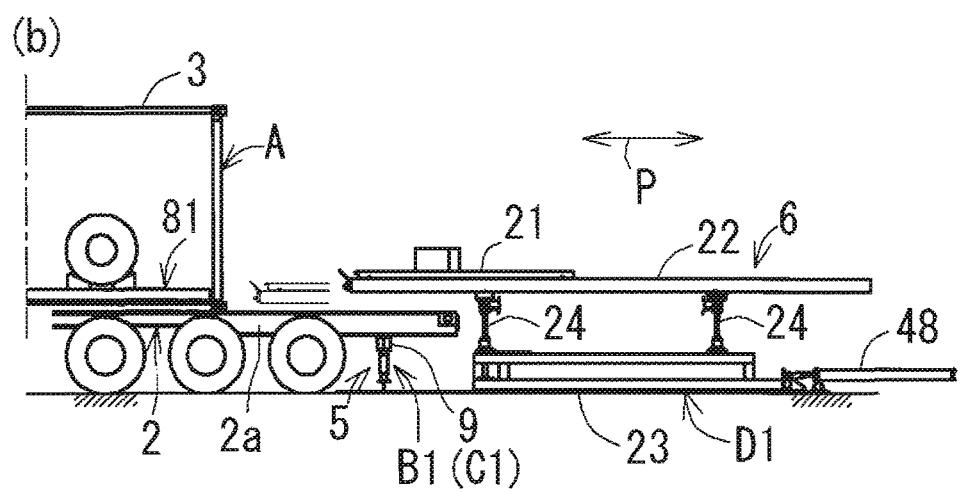
(c)
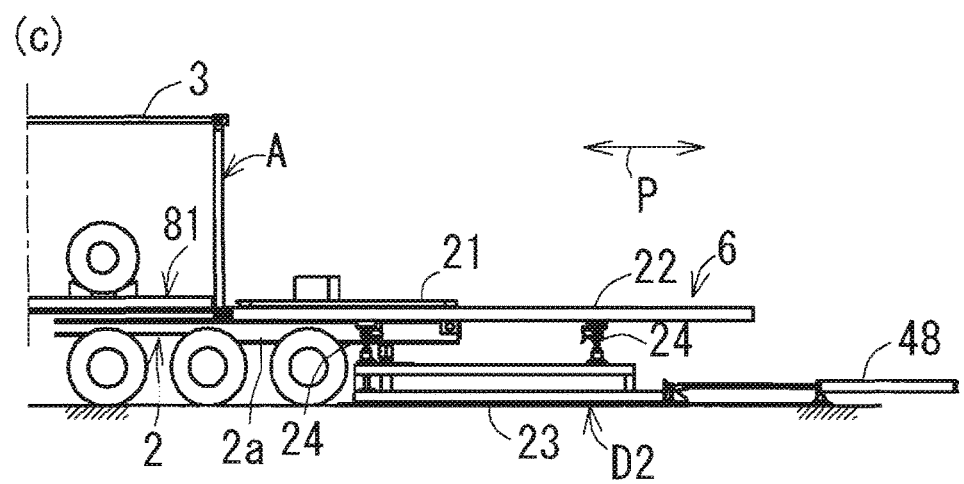

FIG.28
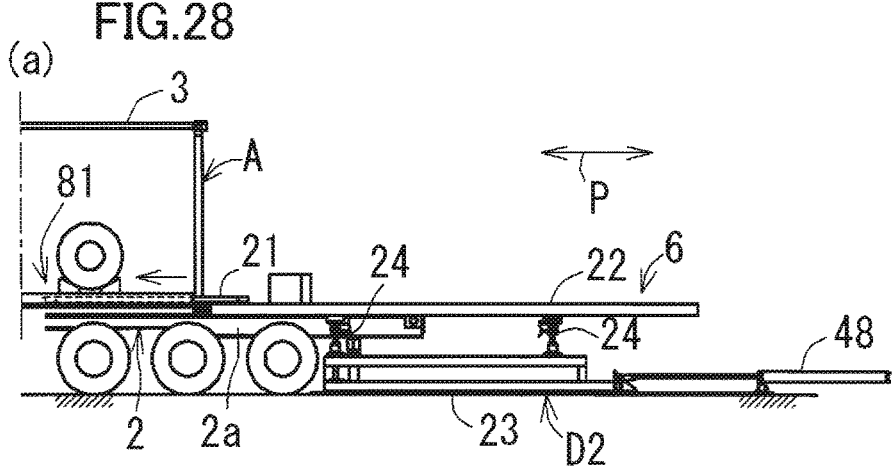
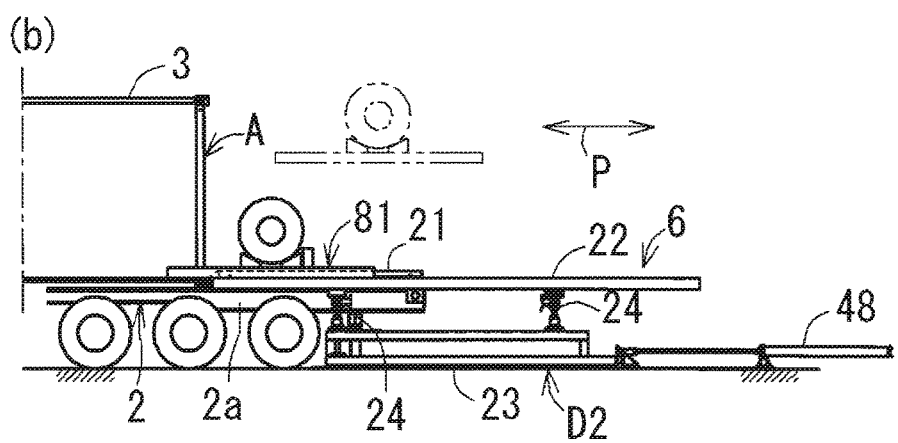
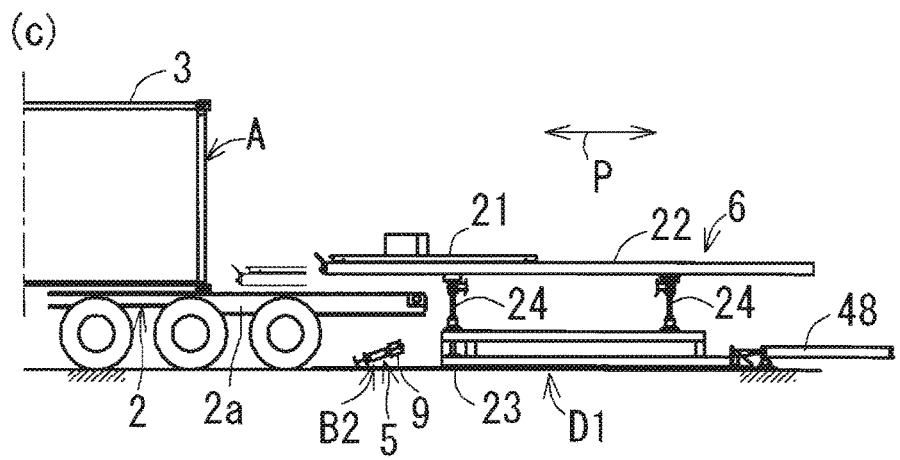

FIG.40
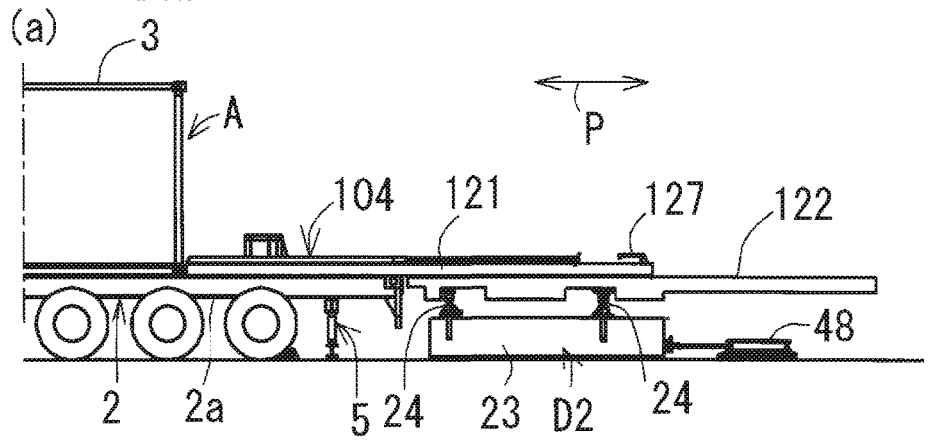
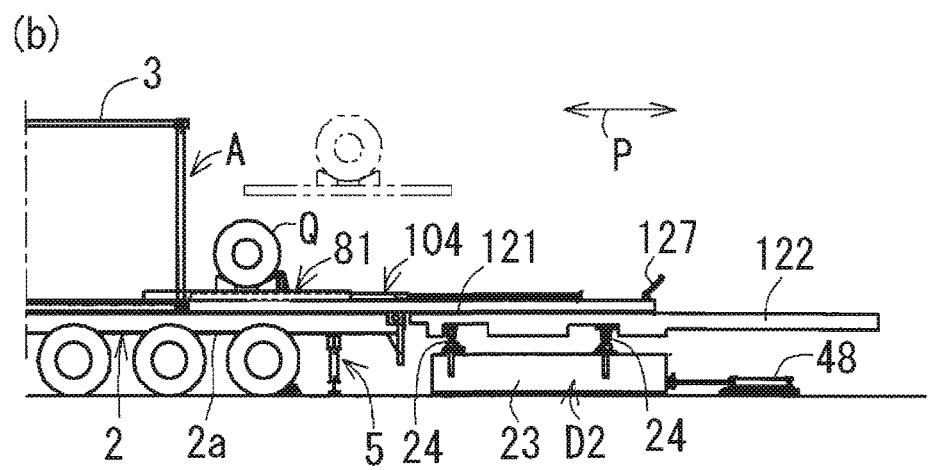
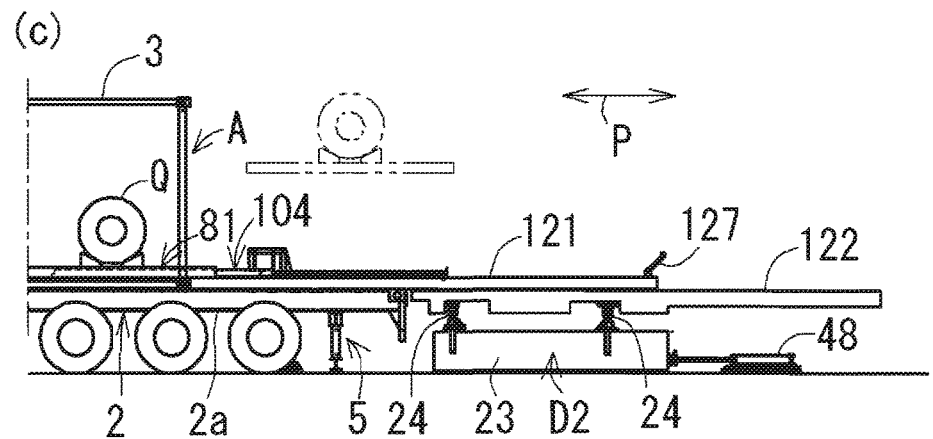

FIG.43
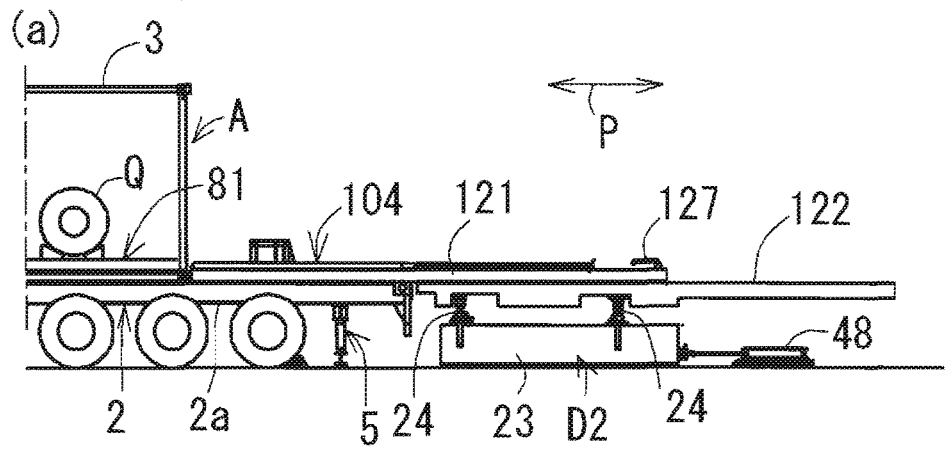
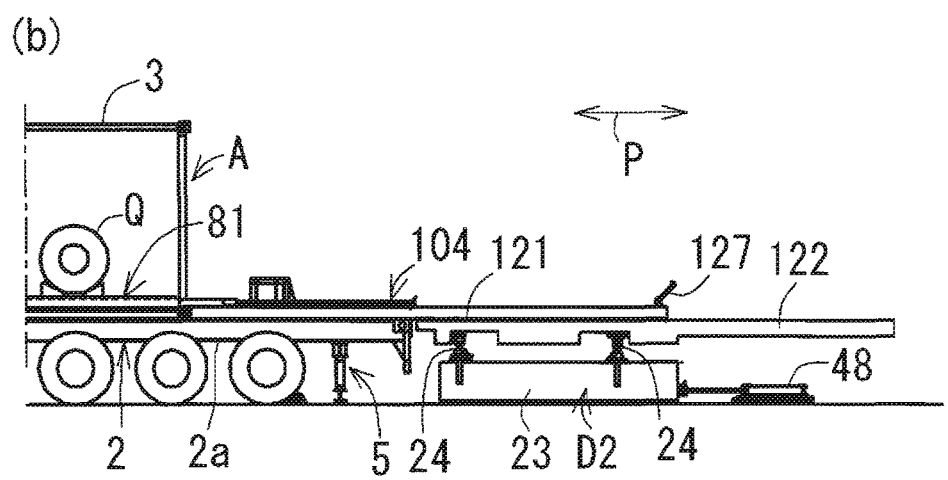
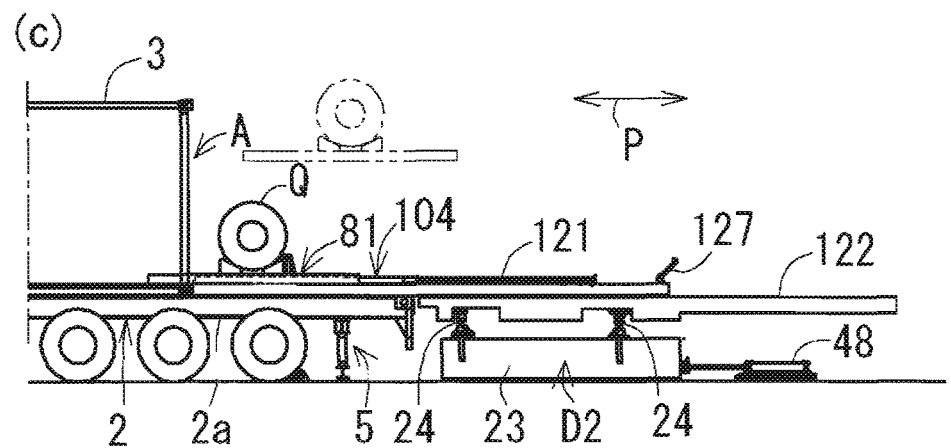

FIG.44
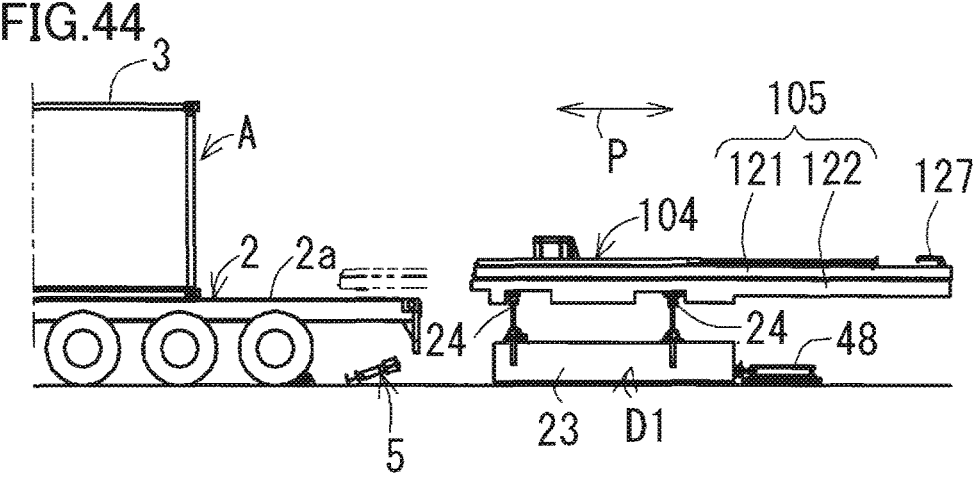
FIG.45
(a)
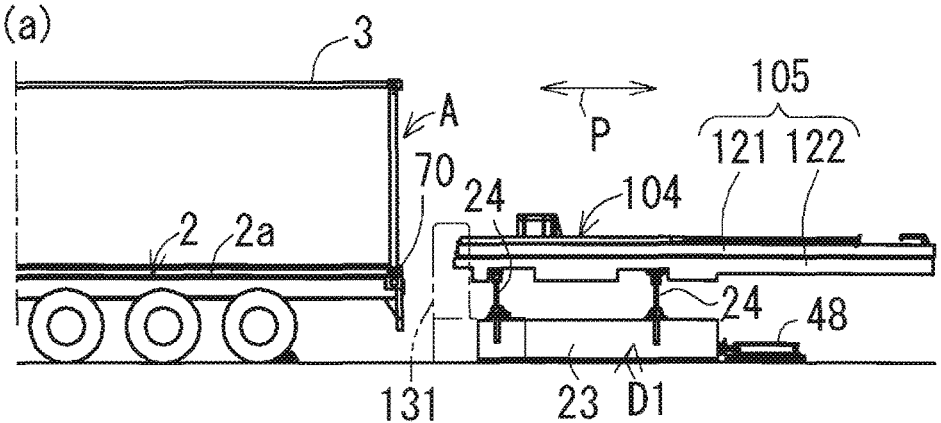
(b)
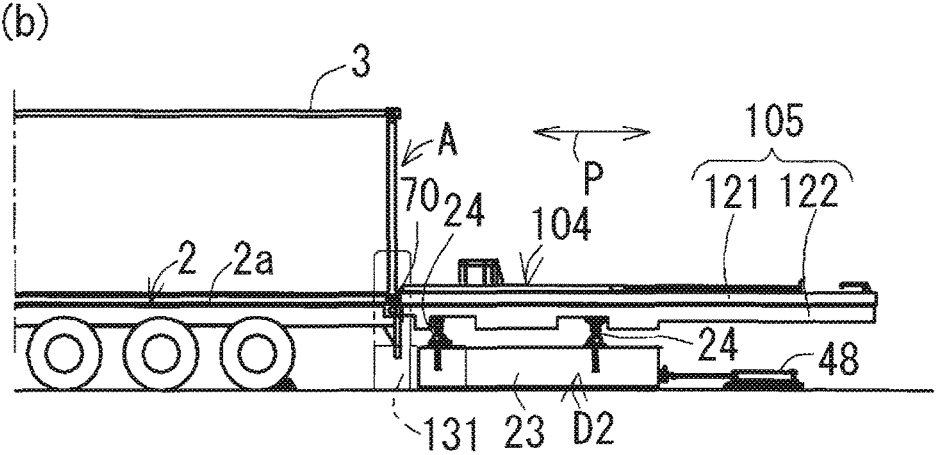

CONVEYANCE SYSTEM FOR OBJECT TO BE CONVEYED AND CONVEYANCE METHOD

TECHNICAL FIELD

The present invention relates to a conveyance system for an object to be conveyed and a conveyance method and more specifically to a conveyance system for an object to be conveyed and a conveyance method which make it possible to easily and quickly convey an object to be conveyed to a container mounted on a chassis of a trailer and which can increase efficiency of containerized transportation.

BACKGROUND ART

As a prior-art conveyance system for an object to be conveyed, there is a generally known system for conveying an object to be conveyed to a container mounted on a chassis of a trailer (see Patent Literature 1, for example). Patent Literature 1 discloses a stage device arranged behind the chassis of the trailer positioned in a predetermined position determined in advance. This stage device includes a conveyance vehicle on which the object to be conveyed is placed and conveyed, a stage on which the conveyance vehicle travels, lock pins to be inserted into insertion holes formed in corner fittings of the container, and a lifting/lowering device for lifting and lowering the lock pins. By inserting the lock pins into the insertion holes in the corner fittings of the container mounted on the chassis and lifting the lock pins, the container is raised to align a floor face of the stage and a floor face of the container substantially at the same height and to keep the container on the level. At the same time, the conveyance vehicle on which the object to be conveyed is placed is lifted by air and pushed by a person to convey the heavy object into the container.

CITATIONS LIST

Patent Literatures

Patent Literature 1: Japanese Patent Application Laid-Open No. H11-343034
Patent Literature 2: Japanese Patent Application Laid-Open No. 2008-189004

SUMMARY OF INVENTION

Technical Problems

In the present circumstances, an allowable cargo weight (including a container weight) for a twenty-foot container is 30.48 tons. However, the cargo weight of 30.48 tons is allowed under a condition (in Japan) of containerized transportation using a chassis bulging rearward from an opening end side of a container. With the technique in Patent Literature 1 described above, it is impossible to load cargo of 30.48 tons. If the container can be lowered onto a floor and heavy machinery with sufficient cargo handling performance is available, it is possible to load the cargo of 30.48 tons. However, in this case, complicated and time-consuming conveyance operations are required. Moreover, in the technique in Patent Literature 1 described above, the height of the container is adjusted by lifting the lock pins inserted into the insertion holes in the corner fittings of the container, which is a complicated and time-consuming adjustment operation.

Patent Literature 2 discloses a technique of providing a deck structure which can lift and lower on a rear end side of a chassis and conveying an object to be conveyed to a container with the chassis bulging rearward from an opening end side of the container by use of the deck structure. With the technique in Patent Literature 2 described above, however, it is necessary to provide the deck structure to the chassis, which results in a complicated structure.

The present invention has been made with the above-described circumstances in view and its object is to provide a conveyance system for an object to be conveyed and a conveyance method which make it possible to easily and quickly convey the object to be conveyed to a container mounted on a chassis of a trailer and which can increase efficiency of containerized transportation.

Solutions to Problems

In order to solve the above problem, the invention as defined in claim 1 relates to a conveyance system for an object to be conveyed and for conveying an object to be conveyed to a container mounted on a chassis of a trailer with the chassis bulging rearward from an opening end side of the container, the conveyance system comprising:
a jack device for lifting the chassis from below; and
a stage device arranged behind the jack device,
wherein the stage device includes a conveyance body on which the object to be conveyed is placed and conveyed, a stage on which the conveyance body travels, a mobile body for supporting the stage and capable of movement in a front-back direction of the chassis, and a jack mechanism provided to the mobile body to raise the stage from below so that the stage is lifted or lowered,
the mobile body moves forward and the jack mechanism lowers the stage while the jack device raises the chassis from below to thereby place the stage on the chassis so that the opening end side of the container and a tip end side of the stage are connected to each other, and the conveyance body on which the object to be conveyed is placed travels on floor faces of the stage and the container in this state to thereby convey the object to be conveyed to the container.

The invention as defined in claim 2 relates to the conveyance system for an object to be conveyed according to claim 1, wherein the conveyance body includes a guided portion to be guided by a guide portion provided to the stage when the conveyance body travels on the stage.

The invention as defined in claim 3 relates to the conveyance system for an object to be conveyed according to claim 1 or 2, wherein the stage has a lock mechanism for inserting a lock pin into an insertion hole formed in a corner fitting of the container from a width direction of the chassis and drawing the lock pin rearward.

The invention as defined in claim 4 relates to the conveyance system for an object to be conveyed according to claim 3, wherein the mobile body includes a guided portion to be guided by a guide portion provided to the floor face when the mobile body moves in a front-back direction of the chassis.

The invention as defined in claim 5 relates to the conveyance system for an object to be conveyed according to any one of claims 1 to 4, wherein the object to be conveyed is a coil-shaped object to be conveyed which is loaded on a pallet, a large weight attachment is attached to the pallet when a weight of the coil-shaped object to be conveyed is larger than or equal to a predetermined value, and a large outside diameter attachment is attached to the pallet when an outside diameter of the coil-shaped object to be conveyed is larger than or equal to a predetermined value.

In order to solve the above problem, the invention as defined in claim 6 relates to a conveyance method for an object to be conveyed and using the conveyance system for an object to be conveyed according to any one of claims 1 to 5, the method comprising moving the mobile body forward and lowering the stage with the jack mechanism while raising the chassis with the jack device from below to thereby place the stage on the chassis so that the opening end side of the container and the tip end side of the stage are connected to each other, and causing the conveyance body on which the object to be conveyed is placed to travel on floor faces of the stage and the container in this state to thereby convey the object to be conveyed to the container.

Advantageous Effects of Invention

A conveyance system for an object to be conveyed according to an aspect of the invention includes a jack device for lifting a chassis from below and a stage device arranged behind the jack device. The stage device includes a conveyance body on which an object to be conveyed is placed and conveyed, a stage on which the conveyance body travels, a mobile body for supporting the stage and capable of movement in the front-back direction of the chassis, and a jack mechanism provided to the mobile body to raise the stage from below so that the stage is lifted or lowered. The mobile body moves forward and the jack mechanism lowers the stage while the jack device raises the chassis from below to thereby place the stage on the chassis so that the opening end side of a container and the tip end side of the stage are connected to each other. The conveyance body on which the object to be conveyed is placed travels on the floor faces of the stage and the container in this state to thereby convey the object to be conveyed to the container. In this way, it is possible to easily and quickly convey the object to be conveyed to the container mounted on the chassis of the trailer. Moreover, because of containerized transportation with the chassis bulging rearward from the opening end side of the container, it is possible to load the maximum loading amount of objects to be conveyed to the container. As a result, it is possible to increase efficiency of the containerized transportation.

If the conveyance body includes a guided portion to be guided by a guide portion provided to the stage when the conveyance body travels on the stage, the guided portion is guided by the guide portion during the traveling of the conveyance body, which suppresses meandering of the conveyance body.

If the stage has a lock mechanism for inserting a lock pin into an insertion hole formed in a corner fitting of the container from the width direction of the chassis and drawing the lock pin rearward, the lock mechanism inserts the lock pin into the insertion hole and draws the lock pin rearward in placing of the stage onto the chassis, which brings the opening end side of the container and the tip end side of the stage into contact with or close to each other in the front-back direction of the chassis. Then, the stage is placed on the chassis while accurately positioned and fixed in the width direction and the front-back direction with respect to the container.

If the mobile body includes a guided portion to be guided by a guide portion provided to the floor face when the mobile body moves in the front-back direction of the chassis, the guided portion is guided by the guide portion during the movement of the mobile body, which suppresses meandering of the mobile body. This improves ease of insertion of the lock pin into the insertion hole.

Moreover, if the object to be conveyed is a coil-shaped object to be conveyed which is loaded on a pallet, if a large weight attachment is attached to the pallet when the weight of the coil-shaped object to be conveyed is larger than or equal to a predetermined value, and if a large outside diameter attachment is attached to the pallet when the outside diameter of the coil-shaped object to be conveyed is larger than or equal to a predetermined value, it is possible to adapt to a wide variety of specifications of coil-shaped objects to be conveyed.

The conveyance method for an object to be conveyed according to the aspect of the invention includes moving the mobile body forward and lowering the stage with the jack mechanism while raising the chassis with the jack device from below to thereby place the stage on the chassis so that the opening end side of the container and the tip end side of the stage are connected to each other, and causing the conveyance body on which the object to be conveyed is placed to travel on the floor faces of the stage and the container in this state to thereby convey the object to be conveyed to the container. In this way, it is possible to easily and quickly convey the object to be conveyed to the container mounted on the chassis of the trailer. Moreover, because of the containerized transportation with the chassis bulging rearward from the opening end side of the container, it is possible to load the maximum loading amount of objects to be conveyed to the container. As a result, it is possible to increase efficiency of the containerized transportation.

BRIEF DESCRIPTION OF DRAWINGS

The present invention will be further described in the following detailed description by using non-restrictive examples of representative embodiments of the invention and with reference to a plurality of mentioned drawings. The same reference signs designate similar parts in some of the drawings.

FIGS. 9(a) and 9(b) are sectional views taken along line IX-IX in FIG. 8, wherein FIG. 9(a) shows a raised state of the object to be conveyed and FIG. 9(b) shows a state of the object to be conveyed placed on a floor face.

FIGS. 12(a) and 12(b) are side views of a main portion of the jack mechanism, wherein FIG. 12(a) shows a state of a lifting/lowering body in contact with a stage and FIG. 12(b) shows a state that the lifting/lowering body has cancelled the contact with the stage.

FIGS. 13(a) and 13(b) are plan view of a main portion of the mobile body, wherein FIG. 13(a) shows a projecting state of a guide roller and FIG. 13(b) shows a receding state of the guide roller.

FIG. 14 is a side view of a lock mechanism according to Example 1.

FIGS. 15(a) and 15(b) are enlarged views of a main portion of FIG. 14, wherein FIG. 15(a) shows a state in which a first lock pin is inserted into a first insertion hole and FIG. 15(b) shows a state in which the first lock pin is drawn rearward.

FIGS. 23(a) to 23(c) are explanatory diagrams for explaining forms of storage of the pallets in a container, wherein FIG. 23(a) shows a storage state including the pallet with the large outside diameter attachments and FIGS. 23(b) and 23(c) show storage states not including the pallet with the attachments.

FIGS. 24(a) to 24(c) are explanatory diagrams for explaining storage forms of the pallets in the container, wherein FIG. 24(a) shows a storage state not including the pallet with the attachments and FIGS. 24(b) and 24(c) show storage states including the pallets with the large weight attachments.

FIGS. 25(a) to 25(c) are explanatory diagrams of workings (carrying-in workings) of the conveyance system for an object to be conveyed, wherein FIG. 25(a) shows a state before setting, FIG. 25(b) shows a state in which a chassis is raised by a jack device, and FIG. 25(c) shows a state in which the stage is placed on the chassis.

FIGS. 26(a) to 26(c) are explanatory diagrams of the workings (carrying-in workings) of the conveyance system for an object to be conveyed, wherein FIG. 26(a) shows a state in which an object to be conveyed is unloaded onto the stage, FIG. 26(b) shows a state in which the object to be conveyed is carried in by the conveyance body, and FIG. 26(c) shows a state in which the stage is returned from a position on the chassis after completion of the carrying in.

FIGS. 27(a) to 27(c) are explanatory diagrams of workings (carrying-out workings) of the conveyance system for an object to be conveyed, wherein FIG. 27(a) shows a state before setting, FIG. 25(b) shows a state in which the chassis is raised by the jack device, and FIG. 25(c) shows a state in which the stage is placed on the chassis.

FIGS. 28(a) to 28(c) are explanatory diagrams of the workings (carrying-out workings) of the conveyance system for an object to be conveyed, wherein FIG. 28(a) shows a state in which the conveyance body is caused to travel to a position directly below an object to be conveyed, FIG. 28(b) shows a state in which the object to be conveyed is carried out by the conveyance body, and FIG. 28(c) shows a state in which the stage is returned from the position on the chassis after completion of carrying out.

FIGS. 35(a) and 35(b) are sectional views taken along line XXXV-XXXV in FIG. 34, wherein FIG. 35(a) shows a state in which an object to be conveyed is raised and FIG. 35(b) shows a state in which the object to be conveyed is placed on a floor face.

FIGS. 39(a) to 39(c) are explanatory diagrams of workings (carrying-in workings) of the conveyance system for an object to be conveyed, wherein FIG. 39(a) shows a state before setting, FIG. 39(b) shows a state in which a chassis is raised by a jack device, and FIG. 39(c) shows a state in which a mobile-side stage is caused to travel forward.

FIGS. 40(a) to 40(c) are explanatory diagrams of workings (carrying-in workings) of the conveyance system for an object to be conveyed, wherein FIG. 40(a) shows a state in which the mobile-side stage is placed on the chassis, FIG. 40(b) shows a state in which the object to be conveyed is unloaded onto the mobile-side stage, and FIG. 40(c) shows a state in which the object to be conveyed is carried in by the conveyance body.

FIG. 41 is an explanatory of the workings (carrying-in workings) of the conveyance system for an object to be conveyed and shows a state in which the stage is returned from a position on the chassis after completion of carrying in.

FIGS. 42(a) to 42(c) are explanatory diagrams of workings (carrying-out workings) of the conveyance system for an object to be conveyed, wherein FIG. 42(a) shows a state before setting, FIG. 42(b) shows a state in which the chassis is raised by the jack device, and FIG. 42(c) shows a state in which the mobile-side stage is caused to travel forward.

FIGS. 43(a) to 43(c) are explanatory diagrams of the workings (carrying-out workings) of the conveyance system for an object to be conveyed, wherein FIG. 43(a) shows a state in which the mobile-side stage is placed on the chassis, FIG. 43(b) shows a state in which the conveyance body is caused to travel to a position directly below an object to be conveyed, and FIG. 43(c) shows a state in which the object to be conveyed is carried out by the conveyance body.

FIG. 44 is an explanatory diagram of the workings (carrying-out workings) of the conveyance system for an object to be conveyed and shows a state in which the stage is returned from the position on the chassis after completion of carrying out.

FIGS. 45(a) and 45(b) are explanatory diagrams of workings using the auxiliary jack devices, wherein FIG. 45(a)

shows a state before setting and FIG. 45(b) shows a state in which the chassis is raised by the auxiliary jack devices and the stage is caused to travel forward.

DESCRIPTION OF EMBODIMENTS

Figure 1:
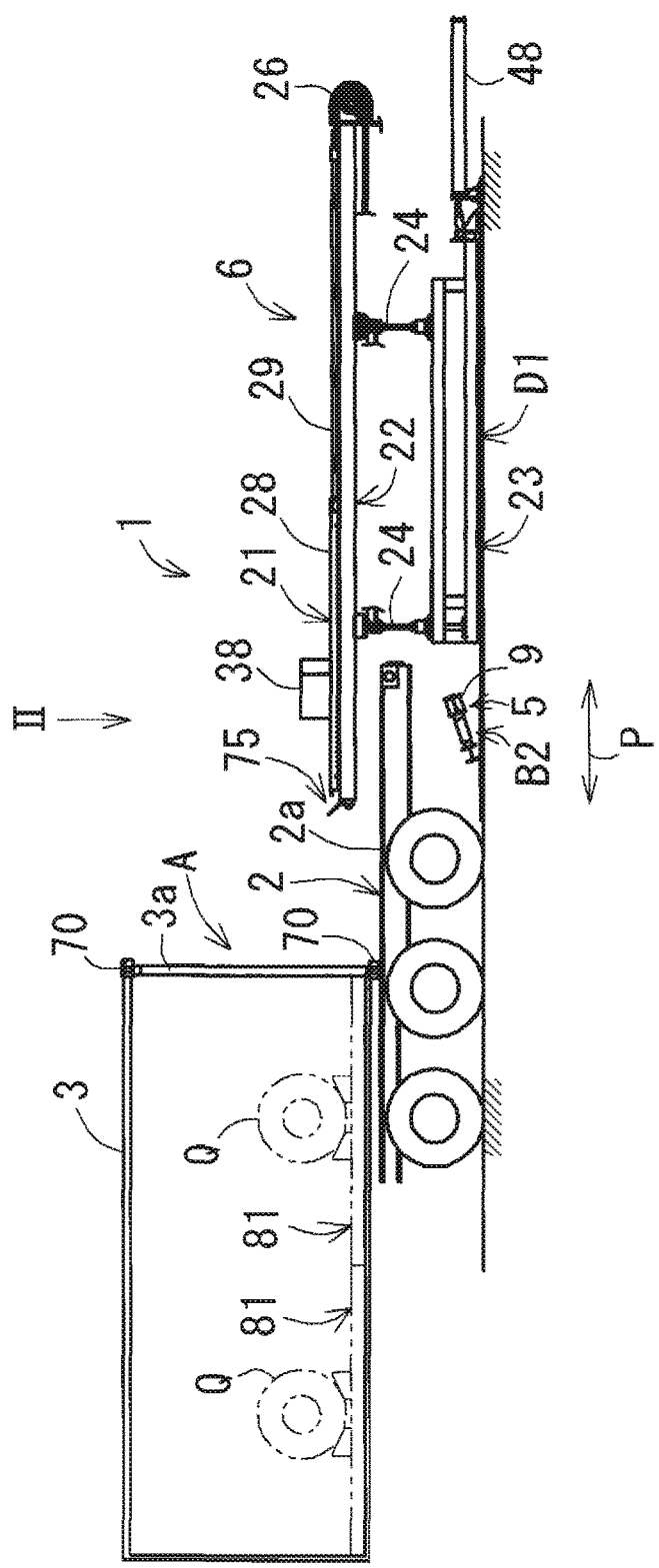
FIG. 1 is a side view of a conveyance system for an object to be conveyed (before setting) according to Example 1.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

<Conveyance System for Object to be Conveyed>

A conveyance system for an object to be conveyed according to a present embodiment is a conveyance system (1, 101) for an object to be conveyed and for conveying an object to be conveyed (Q) to a container (3) mounted on a chassis (2a) of a trailer (2) with the chassis bulging rearward from an opening end side (3a) of the container (3). The conveyance system (1, 101) includes a jack device (5) for raising the chassis from below and a stage device (6, 102) arranged behind the jack device. The stage device (6, 102) includes a conveyance body (21, 104) on which the object to be conveyed (Q) is placed and conveyed, a stage (22, 105) on which the conveyance body travels, a mobile body (23) for supporting the stage and capable of movement in the front-back direction (P) of the chassis, and a jack mechanism (24) provided to the mobile body to raise the stage from below for lifting/lowering the stage (see FIGS. 1 to 4 and FIGS. 29 to 32, for example). The mobile body (23) moves forward and the jack mechanism (24) lowers the stage (22, 105) while the jack device (5) raises the chassis (2a) from below to thereby place the stage on the chassis so that the opening end side (3a) of the container (3) and a tip end side of the stage (22, 105) are connected to each other. The conveyance body (21, 104) on which the object to be conveyed (Q) is placed travels on floor faces of the stage and the container in this state to thereby convey the object to be conveyed to the container (see FIGS. 25(a) to 28(c), FIGS. 39(a) to 44, and the like, for example).

As the conveyance system for an object to be conveyed according to the embodiment, for example, there is a form in which the conveyance body (21, 104) includes a guided portion (36) to be guided by a guide portion (37) provided to the stage when the conveyance body travels on the stage (22) (see FIGS. 7, 8, 33, 34, and the like, for example).

In the above-described form, for example, the conveyance body (21, 104) may include a main body (28, 109) having a traveling wheel (27, 108) for traveling on the floor face, and a support body (29, 110) extending in the front-back direction of the chassis from one end side of the main body. The plurality of guided portions (36) can be arranged at predetermined intervals along the front-back direction (P) of the chassis on left and right opposite sides of the support body (see FIGS. 7, 8, 33, 34, and the like, for example). In this way, it is possible to further reliably suppress meandering of the conveyance body.

As the conveyance system for the object to be conveyed according to the embodiment, for example, there is a form in which the stage (22, 105) has a lock mechanism (61) for inserting a lock pin (65) into an insertion hole (71) formed in a corner fitting (70) of the container (3) from a width direction of the chassis and drawing the lock pin (65) rearward (see FIGS. 14, 15, and the like, for example).

Figure 11:
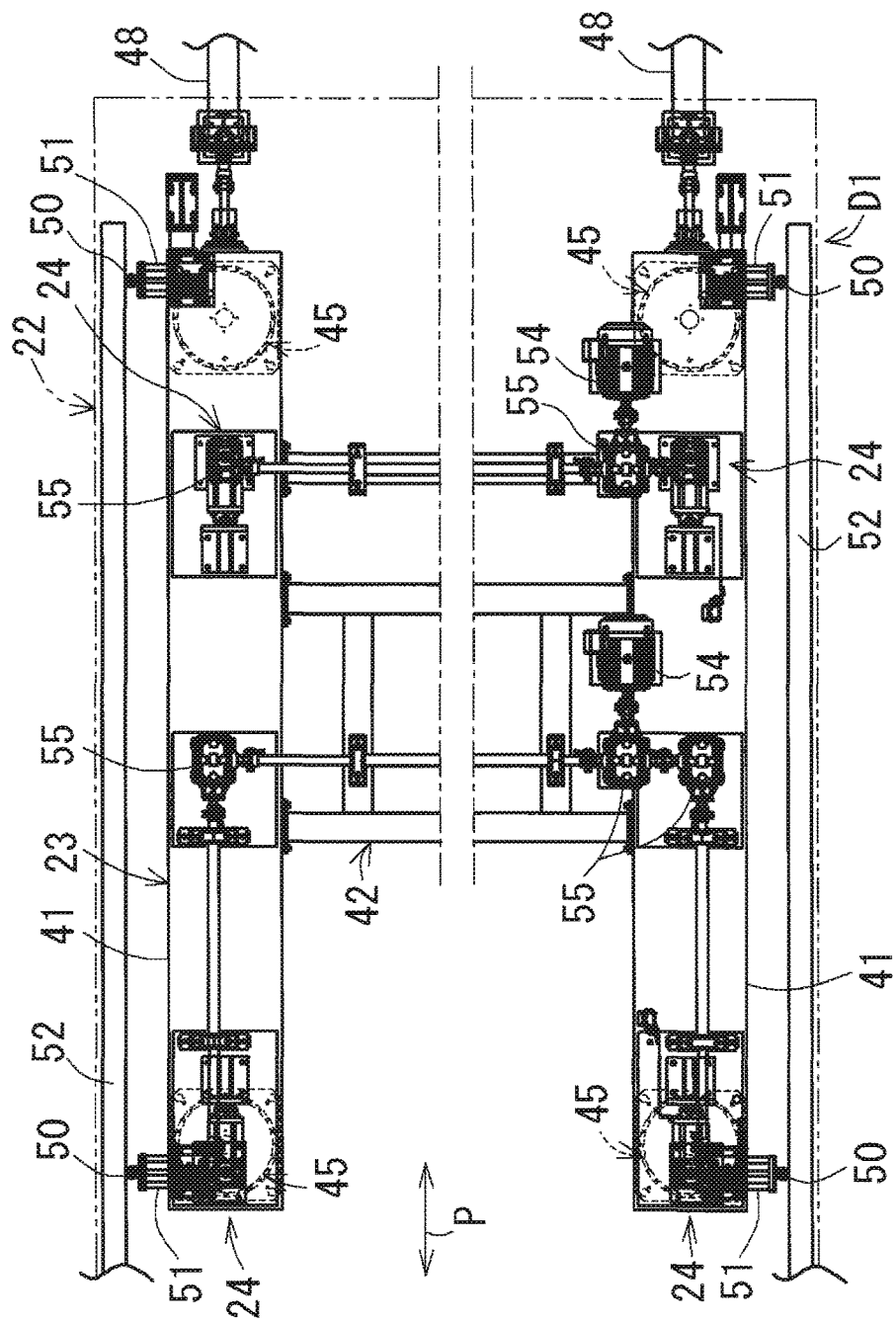
FIG. 11 is a sectional view taken along line XI-XI in FIG. 10.

In the above-described form, for example, the mobile body (23) may include a guided portion (50) to be guided by a guide portion (52) provided to the floor face when the mobile body moves in the front-back direction (P) of the chassis (2a) (see FIGS. 11, 13(a), 13(b), and the like, for example).

In the above-described form, for example, the guide roller (50) may be capable of projecting and receding in a direction intersecting a moving direction of the mobile body (23) (see FIGS. 13(a), 13(b), and the like, for example). In this way, by causing the guide roller to recede immediately before the end of a forward movement of the mobile body in placing the stage onto the chassis, it is possible to finely adjust a position of the mobile body in the width direction of the chassis. This improves ease of insertion of the lock pin into the insertion hole.

In the above-described form, for example, the mobile body (23) may include air bearings (45) that jets air toward the floor face to levitate the mobile body from the floor face (see FIGS. 13(a), 13(b), and the like, for example). In this way, it is possible to finely adjust the position of the mobile body in the width direction of the chassis. This improves ease of insertion of the lock pin into the insertion hole.

As the conveyance system for an object to be conveyed according to the embodiment, for example, there is a form in which the object to be conveyed (Q) is a coil-shaped object to be conveyed which is loaded on a pallet (81). A large weight attachment (93) is attached to the pallet when a weight of the coil-shaped object to be conveyed is larger than or equal to a predetermined value. A large outside diameter attachment (94) is attached to the pallet when an outside diameter of the coil-shaped object to be conveyed is larger than or equal to a predetermined value (see FIGS. 17 to 22, for example).

In the above-described form, for example, the pallet (81) includes a pallet main body (82), a pair of support portions (83) each having a first slope (87) disposed on an upper portion of the pallet main body and facing each other so as to support an outer peripheral face of the coil-shaped object to be conveyed (Q), and long leg portions (84) which are disposed at a lower portion of the pallet main body to come in contact with the floor face and which extend in directions intersecting an axis of the coil-shaped object to be conveyed supported on the support portion. The large weight attachment (93) may include a long leg member (95) which is detachably attached to the leg portion to come in contact with the floor face and which extends to be longer than the leg portion. The large outside diameter attachment (94) may include a support member (97) which is detachably attached to the support portion or the pallet main body and has a second slope (96) positioned above the first slope in an attached state (see FIGS. 17 to 22, for example). This improves ease of attachment and detachment of the large weight attachment and the large outside diameter attachment to and from the pallet.

As the conveyance system for an object to be conveyed according to the embodiment, for example, there is a form in which the stage (105) includes a mobile-side stage (121) on which the conveyance body (104) travels and a fixed-side stage (122) which supports the mobile-side stage so that the mobile-side stage can move in the front-back direction (P) of the chassis and which is lifted and lowered by the jack mechanism (24) (see FIGS. 29 to 32 and the like, for example). In this way, by moving the mobile-side stage in the front-back direction of the chassis with respect to the fixed-side stage to change a slide position, it is possible to convey the object to be conveyed to the container with the chassis bulging rearward from the opening end side of the container and it is possible to convey the object to be conveyed to the container with the chassis not bulging rearward from the opening end side of the container.

Figure 36:
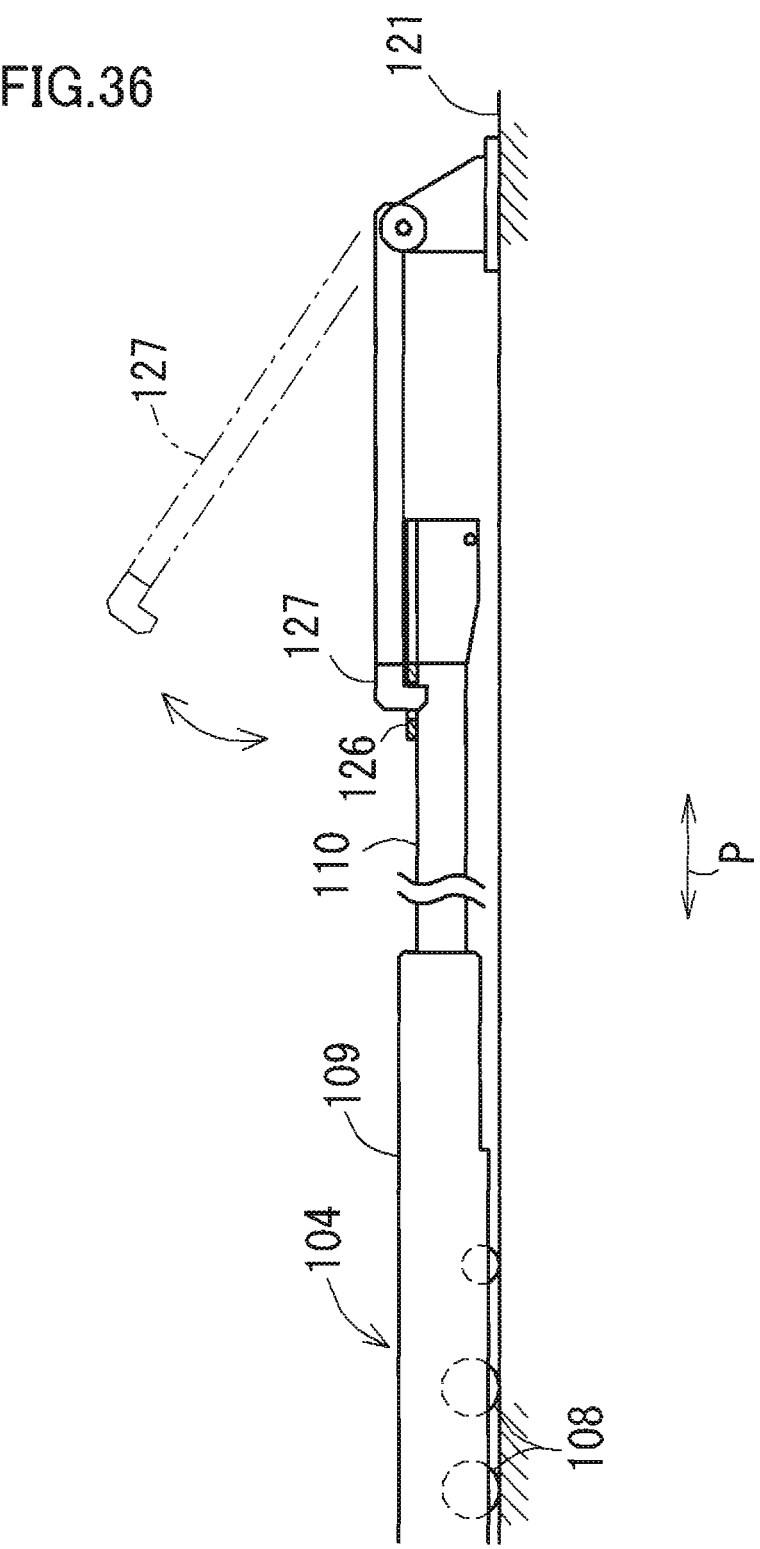
FIG. 36 is an enlarged view of a main essential portion of FIG. 33.

In the above-described form, for example, a driving means (107) for causing the conveyance body to travel may be connected to the conveyance body (104) and the mobile-side stage (121) may be provided with an engagement lever (127), which can be engaged with and disengaged from an engaged portion (126) provided to the conveyance body, so that the engagement lever (127) can swing (see FIG. 36 and the like, for example). In this way, by engaging the engagement lever with the engaged portion, the driving means can move the mobile-side stage in the front-back direction of the chassis together with the conveyance body.

<Conveyance Method for Object to be Conveyed>

A conveyance method for an object to be conveyed according to the present embodiment is a conveyance method for an object to be conveyed using the conveyance system (1, 101) for an object to be conveyed according to the above-described embodiment, the method including moving the mobile body (23) forward and lowering the stage (22, 105) with the jack mechanism (24) while raising the chassis (2a) with the jack device (5) from below to thereby place the stage on the chassis so that the opening end side (3a) of the container (3) and the tip end side of the stage (22, 105) are connected to each other, and causing the conveyance body (21, 104) on which the object to be conveyed (Q) is placed to travel on the floor faces of the stage and the container to thereby convey the object to be conveyed to the container (see FIGS. 25(a) to 28(c), FIGS. 39(a) to 44, and the like, for example).

Reference signs in parentheses for the respective structures described in the above-described embodiment show relations to specific structures described in the following examples.

EXAMPLES

The present invention will be specifically described below by way of examples with reference to the drawings.

Example 1

(1) Structure of Conveyance System for Object to be Conveyed

A conveyance system 1 for an object to be conveyed according to the present example is for conveying an object to be conveyed Q to a container 3 mounted on a chassis 2a of a trailer 2 with the chassis 2a bulging rearward from an opening end side 3a of the container 3 as shown in FIGS. 1 to 4. The conveyance system 1 for an object to be conveyed includes a jack device 5 for raising the chassis 2a from below and a stage device 6 arranged behind the jack device 5.

In the example, a semi-trailer connected to a tractor is employed as the trailer 2 and a dry container is employed as the container 3. In the above-described semi-trailer, a twenty-foot dry container is mounted on a central side in a length direction of the chassis on which a forty-foot dry container can be mounted and a predetermined length (three meters, for example) of the chassis is bulging rearward from the opening end side of the container. A coil-shaped object to be conveyed formed by winding a steel sheet is employed as the object to be conveyed.

Figure 5:
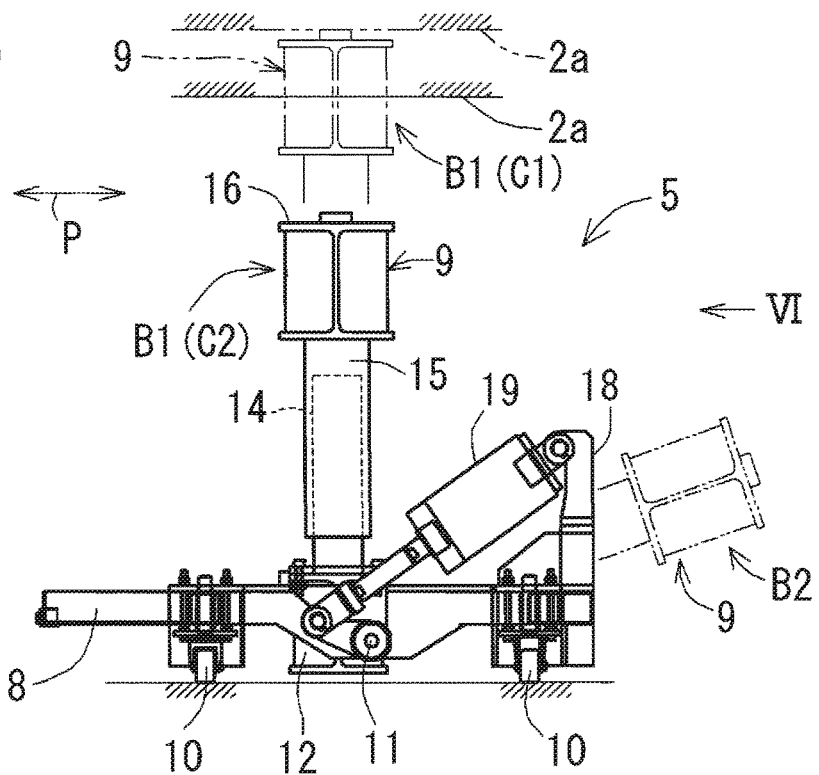
FIG. 5 is a side view of a jack device according to Embodiment 1.
Figure 6:
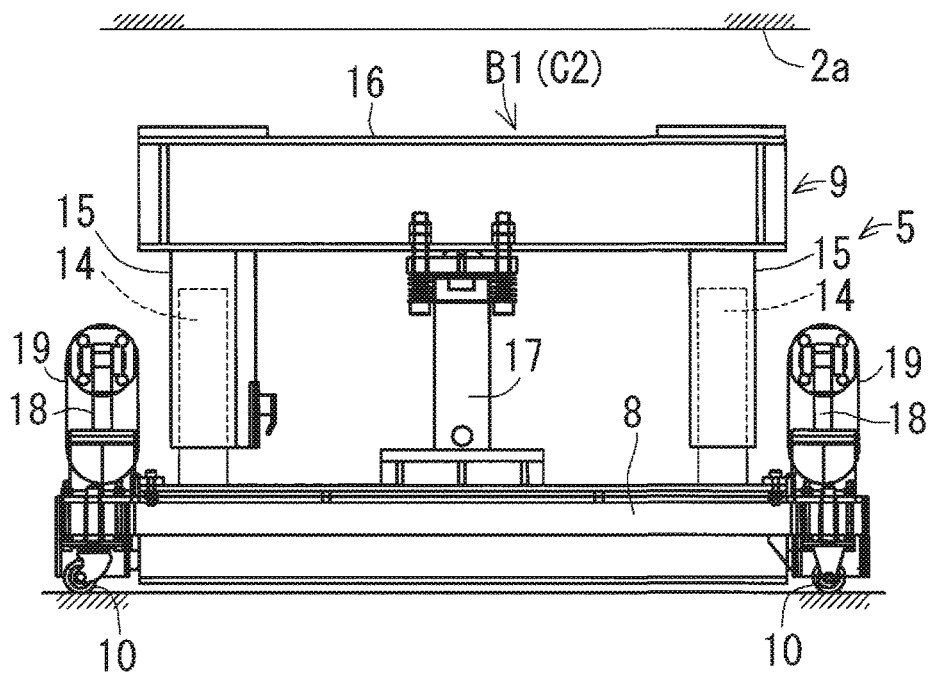
FIG. 6 is a diagram taken in a direction of arrow VI in FIG. 5.

The jack device 5 is arranged in a position immediately below the chassis 2a bulging rearward from the opening end side 3a of the container 3 when the trailer 2 is positioned in a predetermined position A determined in advance (see FIG. 1). As shown in FIGS. 5 and 6, the jack device 5 includes a support mount 8 and a lifting/lowering body 9 provided to the support mount 8 to be able to lift/lower and tilt. A plurality of casters 10 which can travel on the floor face are attached to a lower side of the support mount 8. A pivot 11 is axially supported about a horizontal axis on the support mount 8 and a base 12 is attached to the pivot 11. The trailer 2 is positioned in the predetermined position A (see FIG. 1) by traveling backward with rear wheels in contact with wheel stoppers (not shown).

The lifting/lowering body 9 includes left and right support portions 15 supported to be movable along left and right support columns 14 rising from the base 12 and a raising portion 16 connected to upper end sides of the respective support portions 15. Onto the base 12, a lifting/lowering cylinder 17 to be actuated by hydraulic pressure is attached. The raising portion 16 is connected to a tip end side of a piston rod of the lifting/lowering cylinder 17. Left and right support chips 18 rise from a rear end side of the support mount 8 and left and right reversing cylinders 19 to be actuated by air pressure are supported on upper end sides of the respective support chips 18 to be able to tilt. Tip end sides of piston rods of the respective reversing cylinders 19 are connected to the pivot 11. By extension and contraction of the piston rods of the reversing cylinders 19, the lifting/lowering body 9 can be reversed between an upright state B1 and a tilting state B2. Moreover, by extension and contraction of the piston rod of the lifting/lowering cylinder 17 in the upright state B1 of the lifting/lowering body 9, the lifting/lowering body 9 can lift and lower between a raising state C1 in which the lifting/lowering body 9 raises the chassis 2a from below and a separate state C2 in which the lifting/lowering body 9 is separate at a predetermined distance from the chassis 2a.

As shown in FIGS. 1 to 4, the stage device 6 includes a conveyance body 21 on which the object to be conveyed Q is placed and conveyed, a stage 22 on which the conveyance body 21 travels, a mobile body 23 for supporting the stage 22 and capable of movement in the front-back direction P of the chassis 2a, and a jack mechanisms 24 provided to the mobile body 23 to raise the stage 22 from below so that the stage 22 is lifted or lowered.

Figure 7:
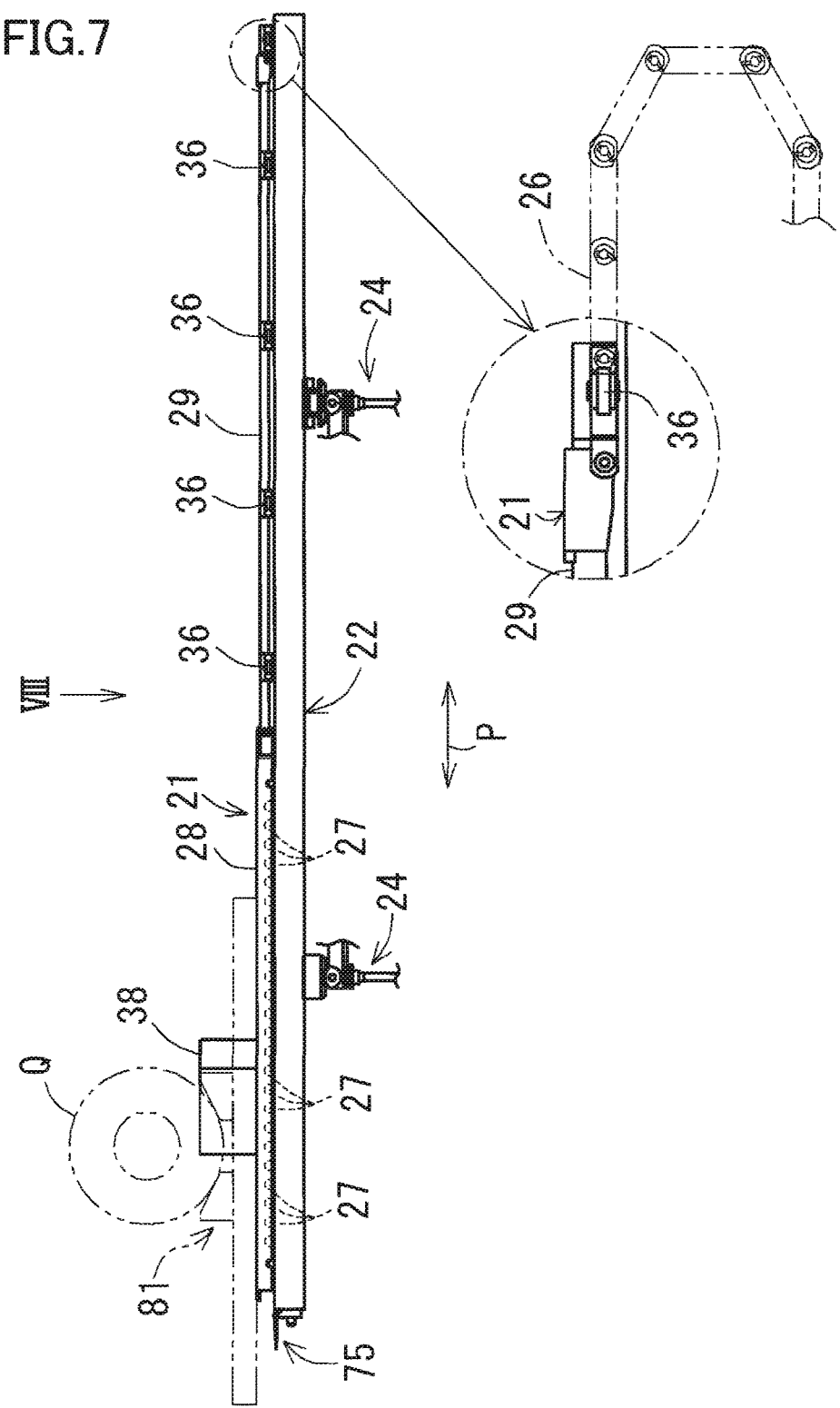
FIG. 7 is a side view of a conveyance body according to Example 1.
Figure 8:
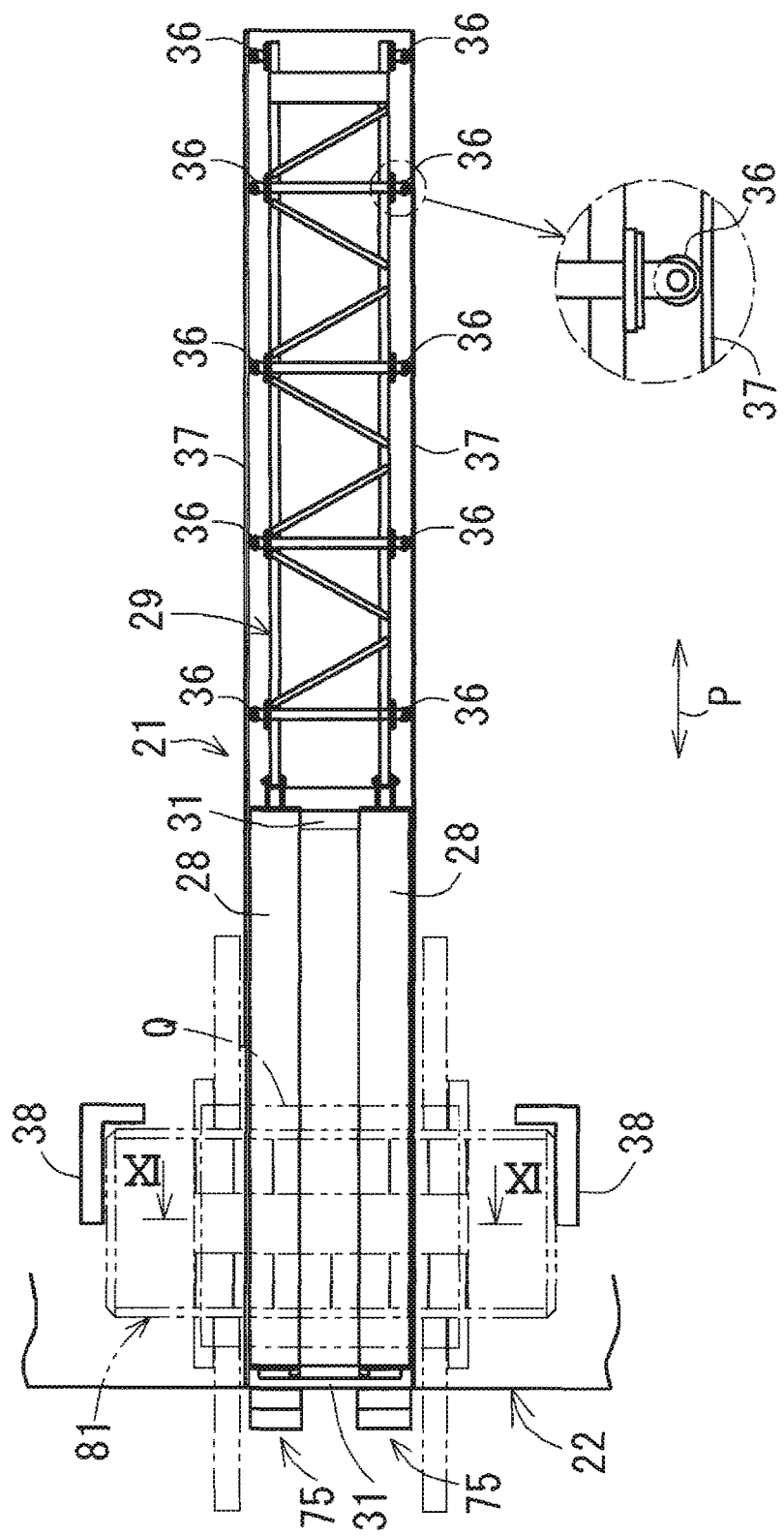
FIG. 8 is a diagram taken in a direction of arrow VIII in FIG. 7.

To the conveyance body 21, one end side of a push chain 26 for causing the conveyance body 21 to travel on the floor face along the front-back direction P of the chassis 2a is connected (see FIG. 1). As shown in FIGS. 7 and 8, this conveyance body 21 includes the left and right main bodies 28 having a large number of traveling wheels 27 for traveling on the floor face, and a support body 29 extending in the front-back direction P of the chassis 2a from the one end sides of the respective main bodies 28. Opposite end sides in a length direction of the left and right main bodies 28 are connected to each other by connecting members 31. One end side of the push chain 26 is moved in the front-back direction P above the stage 22 by driving by a motor to thereby send the conveyance body 21 forward or pull the conveyance body 21 rearward.

Figure 9:
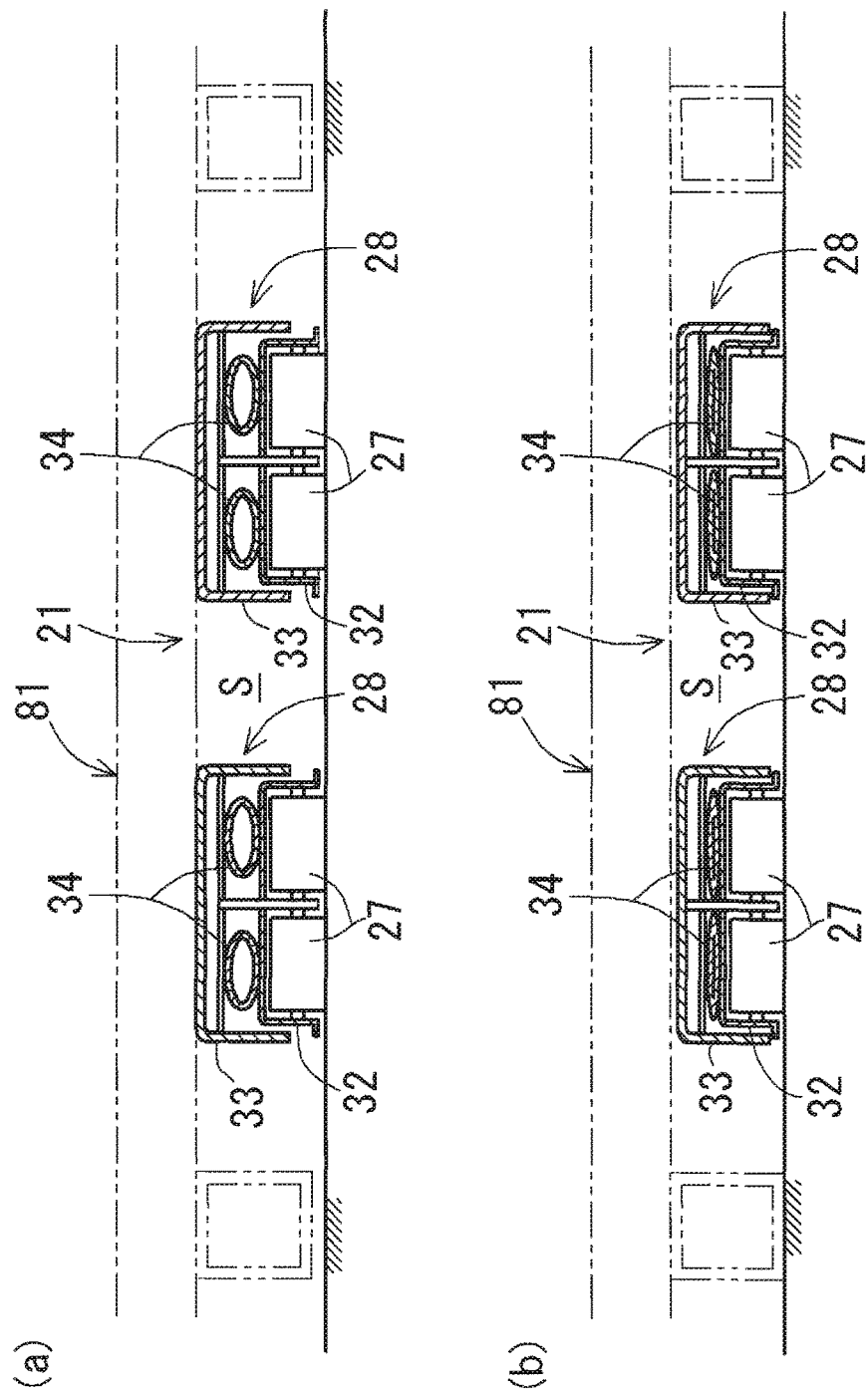

As shown in FIGS. 9(a) and 9(b), each of the main bodies 28 includes: a base member 32 for rotatably supporting the traveling wheels 27 and having a substantially U-shaped vertical section; a pallet support member 33 disposed to cover an upper part of the base member 32, supporting the pallet 81, and having a substantially U-shaped vertical section; and tubular expanding/contracting members 34 disposed between the base member 32 and the pallet support member 33 and expanding and contracting when compressed air is supplied into and exhausted from the expanding/contracting members 34. When the expanding/contracting members 34 expand due to the supply of compressed air, the pallet support members 33 lift to raise the pallet 81 placed on the floor face (see FIG. 9(*a*)). On the other hand, when the expanding/contracting members 34 contract due to the exhausting of the compressed air, the pallet support members 33 which have lifted lower to place the pallet 81 onto the floor face (see FIG. 9(*b*)).

As shown in FIGS. 7 and 8, the support body 29 is formed by assembling a plurality of long members into a frame. On the left and right opposite sides of the support body 29, a plurality of rotary rollers (shown as examples of "guided portions" according to the invention) 36 are supported to be rotatable about vertical axes at predetermined intervals along the front-back direction P of the chassis 2*a*. The respective rotary rollers 36 are guided by the guide portions 37 provided to the stage 22 when the conveyance body 21 travels on the stage 22. The guide portions 37 extend like walls along a traveling direction of the conveyance body 21 (i.e., the front-back direction P of the chassis 2*a*).

The stage 22 is in such a state as to cover a rear end side of the chassis 2*a* (i.e., such a state as to lap the rear end side of the chassis 2*a* at a predetermined distance in a vertical direction) when the mobile body 23 is in a standby state D1 (described later) and the trailer 2 is positioned in the predetermined position A (see FIG. 1). As shown in FIGS. 7 and 8, left and right guides 38 having substantially L-shaped cross sections are provided on an upper face side of the stage 22. By being guided by the respective guides 38, the pallet 81 which is suspended and transferred by a crane or the like is positioned in a predetermined position on the stage 22 which is determined in advance.

Figure 10:
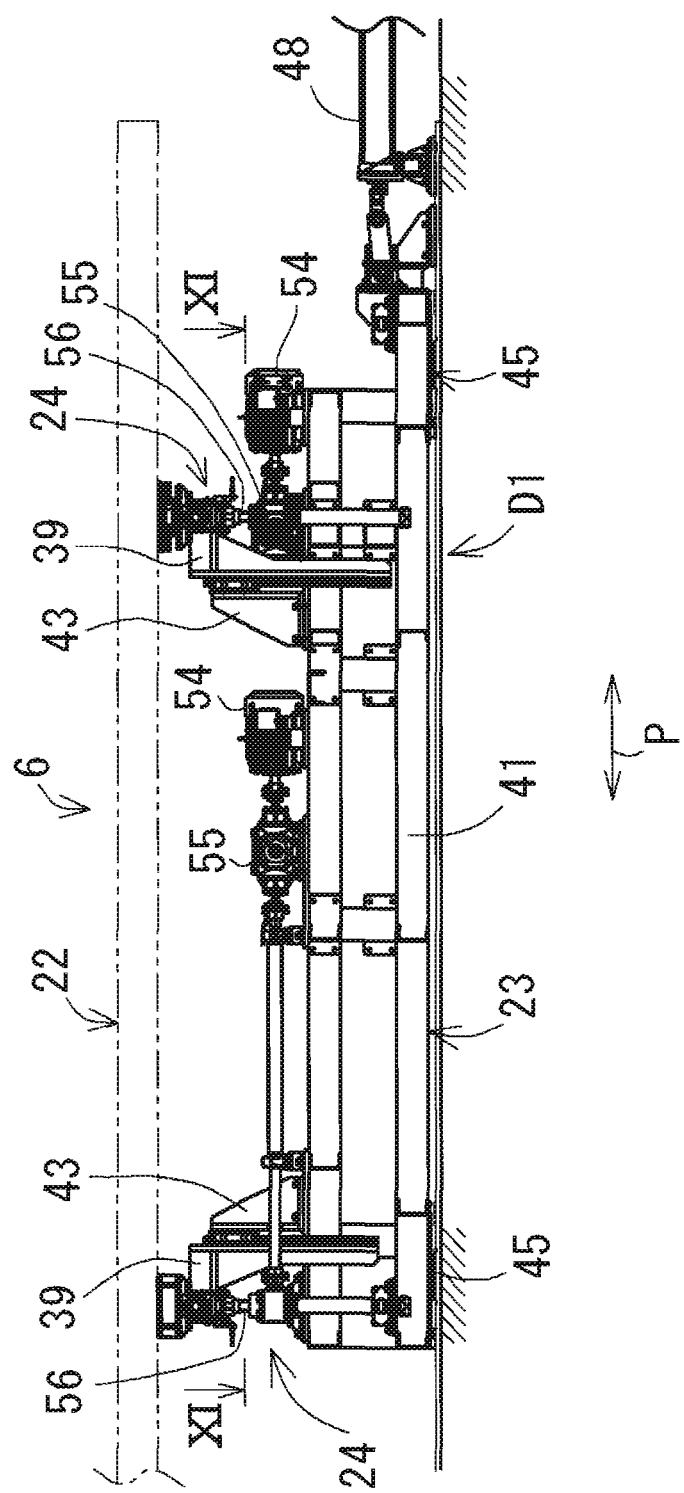
FIG. 10 is a side view of a mobile body and jack mechanisms according to Example 1.

As shown in FIGS. 10 and 11, the mobile body 23 is formed by connecting left and right main bodies 41 extending in the front-back direction P of the chassis 2*a* with a connecting member 42. On upper face sides of the respective main bodies 41, guide portions 43 for supporting sliding portions 39 provided to a lower face side of the stage 22 so that the sliding portions 39 can lift and lower are provided. By supporting and guiding the sliding portions 39 with the guide portions 43, the mobile body 23 supports the stage 22 so that the stage 22 can lift and lower.

As shown in FIGS. 10 and 11, the mobile body 23 has air bearings 45 for lifting the mobile body 23 from the floor face. The air bearings 45 are disposed on opposite end sides in a length direction of the respective main bodies 41. Each of the air bearings 45 has an annular tube portion 46 on which a large number of air ejecting holes 46*a* are formed (see FIGS. 13(*a*) and 13(*b*)). Tip end sides of piston rods of moving cylinders 48 which are actuated by air pressure are connected to one end side of the mobile body 23. By ejecting the compressed air supplied into the tube portion 46 from the air ejecting holes 46*a* toward the floor face, a minute air film is formed between the air bearing 45 and the floor face to lift the mobile body 23 from the floor face. Extension and contraction of the piston rods of the moving cylinders 48 in this lifted state allow the mobile body 23 to move between the standby state D1 (see FIG. 1) and an advanced state D2 in which the mobile body 23 has moved from the standby state D1 to a front end (see FIG. 3).

Figure 13:
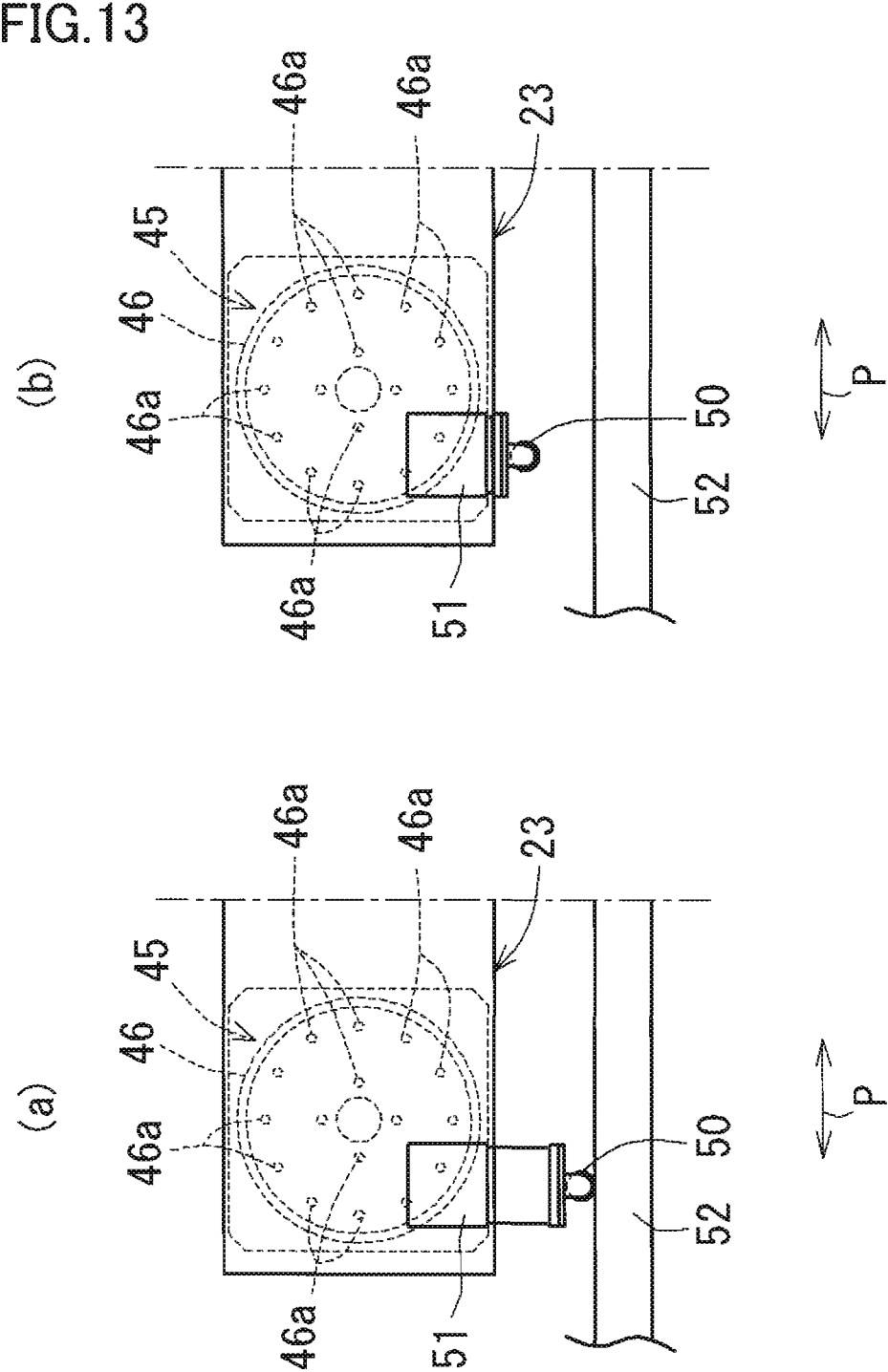

As shown in FIG. 11, the mobile body 23 includes guide rollers (shown as examples of "guided portions" according to the invention) 50 capable of projecting and receding in directions intersecting a moving direction of mobile body 23. The guide rollers 50 are supported on tip end sides of piston rods of guiding cylinders 51 mounted to opposite end sides in length directions of the respective main bodies 41 to be rotatable about vertical axes. As shown in FIG. 13(*a*), the guide rollers 50 project to be guided by long guide portions 52 provided onto the floor face due to extension of the piston rods of the guiding cylinders 51. On the other hand, when the mobile body 23 moves forward and a clearance between the opening end side 3*a* of the container 3 and the tip end side of the stage 22 becomes smaller than or equal to a predetermined value, each of the guide rollers 50 comes into a receding state due to contraction of the piston rod of the guiding cylinder 51 as shown in FIG. 13(*b*) and separates from the guide portion 52 to cancel the guiding.

As shown in FIGS. 10 and 11, the jack mechanisms 24 are provided on opposite end sides in the length directions of the main bodies 41 of the mobile body 23. Each of the jack mechanisms 24 has a lifting/lowering body 56 to which a rotational force of a motor 54 is transmitted via a gearbox 55 and which is lifted and lowered by a screw (not shown). As shown in FIG. 12(*a*), the lifting/lowering body 56 comes in contact with the stage 22 from below and lifts and lowers the stage 22. On the other hand, as shown in FIG. 12(*b*), the lifting/lowering body 56 of each of front jack mechanisms 24 separates from the stage 22 to cancel the contact when the stage 22 is lowered with the lifting/lowering body 56 and placed onto the chassis 2*a*.

Figure 2:
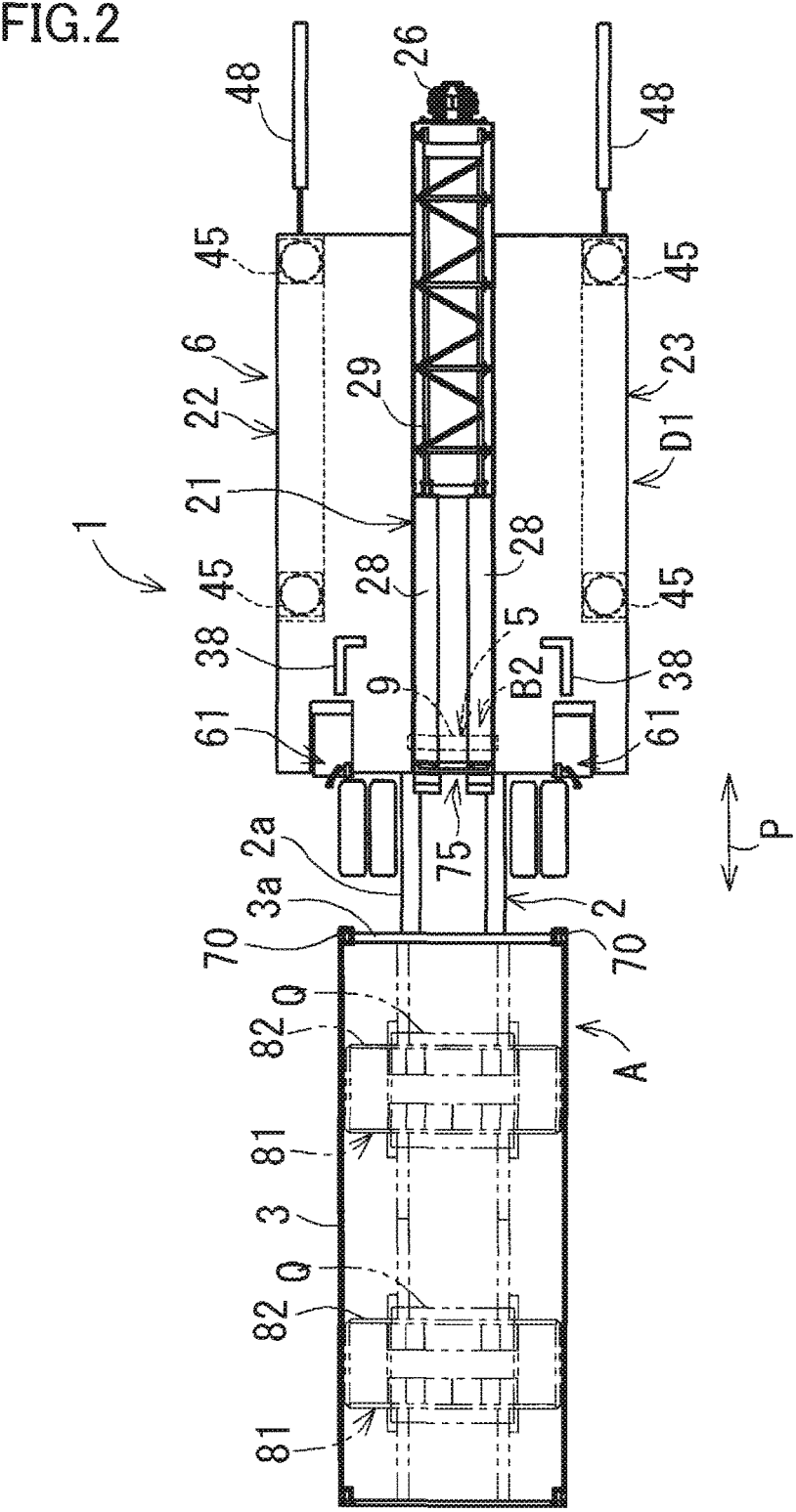
FIG. 2 is a diagram taken in a direction of arrow II in FIG. 1.
Figure 3:
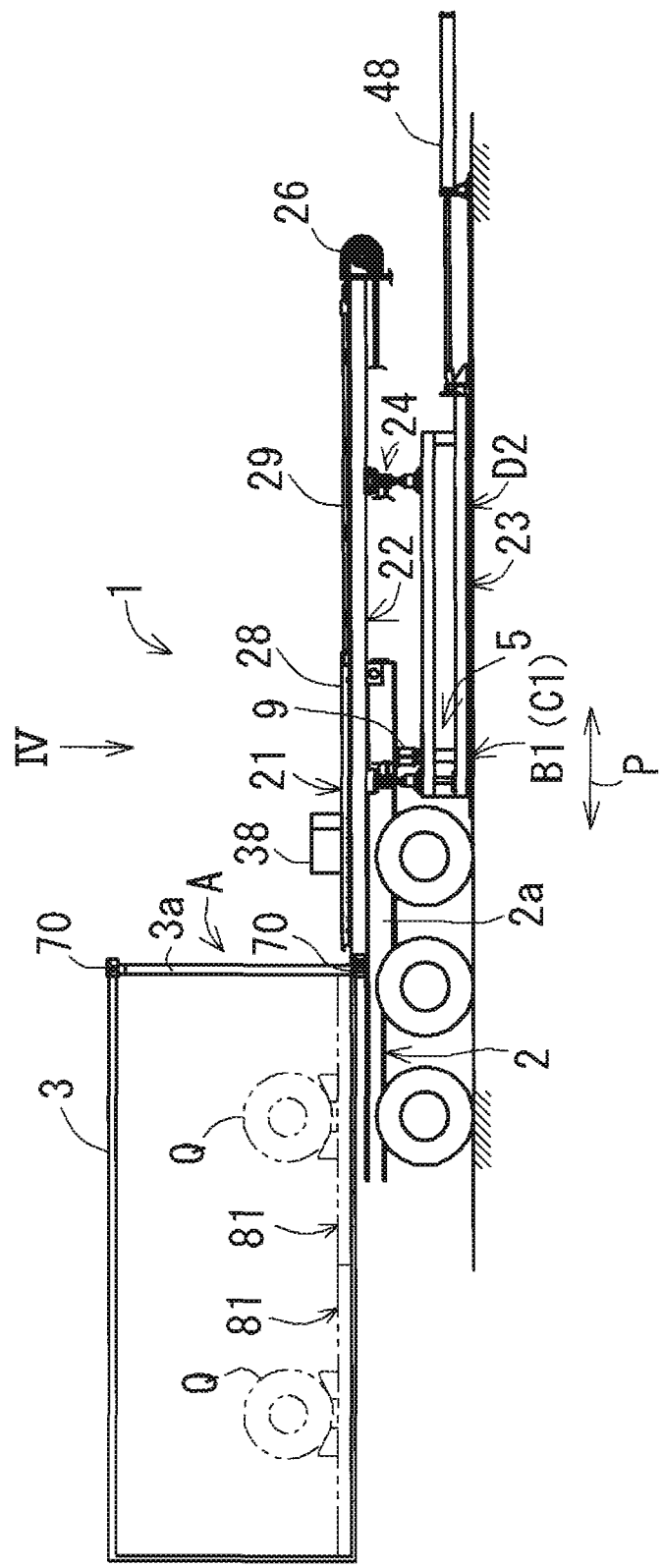
FIG. 3 is a side view of the conveyance system for the object to be conveyed (after the setting).
Figure 4:
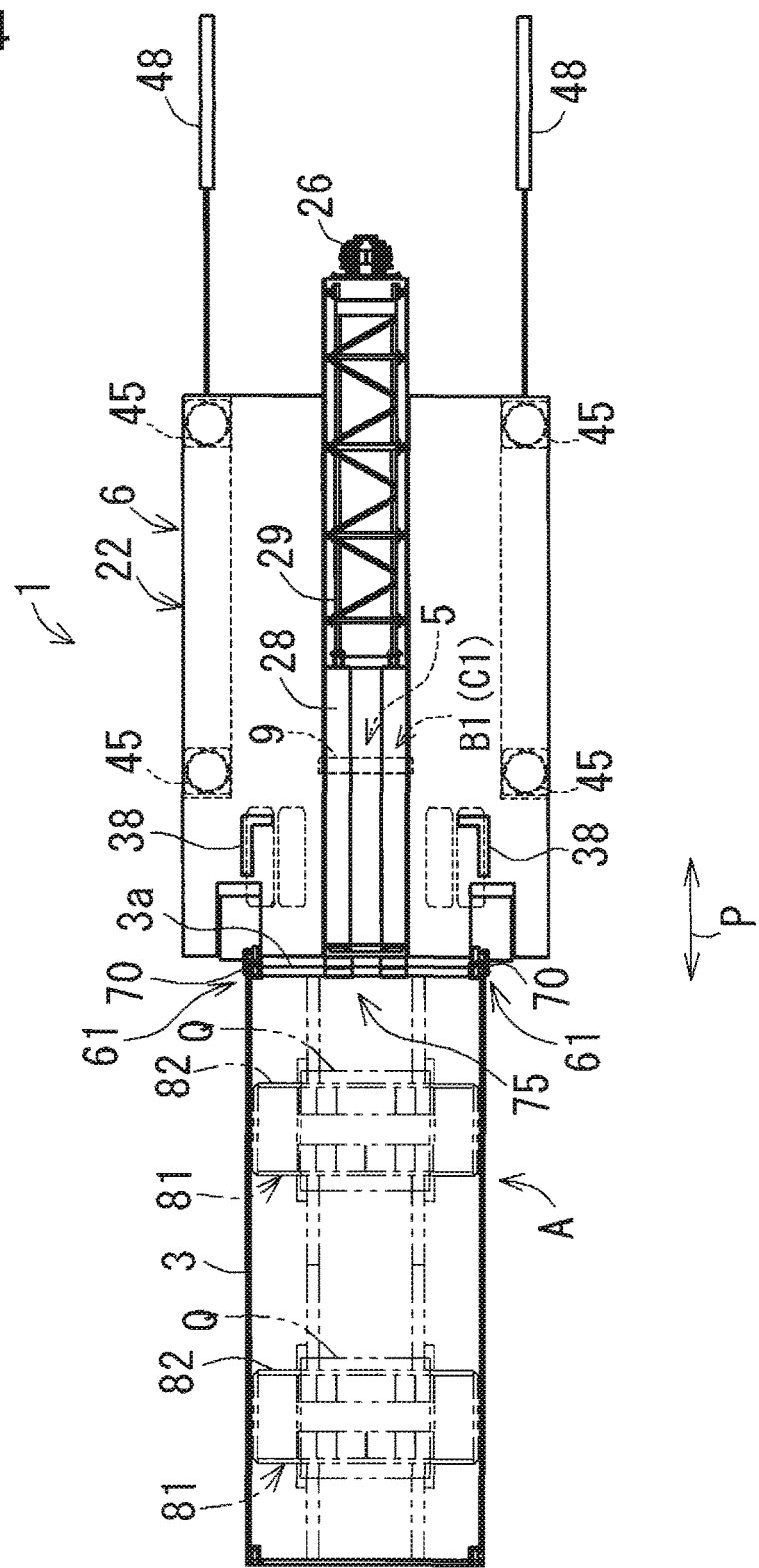
FIG. 4 is a diagram taken in a direction of arrow IV in FIG. 3.

The stage 22 has lock mechanisms 61 on left and right opposite sides of a front end portion of the stage 22 (see FIG. 2). As shown in FIG. 14, each of the lock mechanisms 61 has a support portion 62 supported on the stage 22 to be movable in the front-back direction P of the chassis 2*a*. On the support portion 62, a substantially L-shaped swinging lever 63 is supported to be able to swing about a vertical axis. A first lock pin 65 is provided to one end side of the swinging lever 63 and a tip end side of a piston rod of a swinging cylinder 66 which is actuated by air pressure is connected to the other end side of the swinging lever 63. The swinging cylinder 66 is supported on the support portion 62 to be able to swing about a vertical axis. A withdrawing cylinder 67 which is actuated by air pressure is mounted to the stage 22. The support portion 62 is connected to a tip end side of a piston rod of the withdrawing cylinder 67. Extension of the piston rod of the swinging cylinder 66 causes the swinging lever 63 to swing and the first lock pin 65 is inserted into a first insertion hole 71 formed in a corner fitting 70 of the container 3 from the width direction of the chassis 2*a* as shown in FIG. 15(*a*). Contraction of the piston rod of the withdrawing cylinder 67 in this inserted state draws the first lock pin 65 rearward together with the support portion 62 as shown in FIG. 15(*b*). At this time, the opening end side 3*a* of the container 3 and the front end side of the stage 22 are brought in contact with and connected to each other.

On the left and right opposite sides of the front end portion of the stage 22, sliding cylinders 69 to be actuated by air pressure are mounted as shown in FIG. 14. A second lock pin 68 is provided to a tip end side of a piston rod of each of the sliding cylinders 69. When the stage 22 moves forward, the second lock pins 68 are inserted into second insertion holes 72 formed in the corner fittings 70 of the container 3 from the front-back direction P of the chassis 2*a*. From the state in which the second lock pins 68 are inserted into the second insertion holes 72, the second lock pins 68 can be swiftly withdrawn from the second insertion holes 72 by contraction of the piston rods of the sliding cylinders 69.

Figure 16:
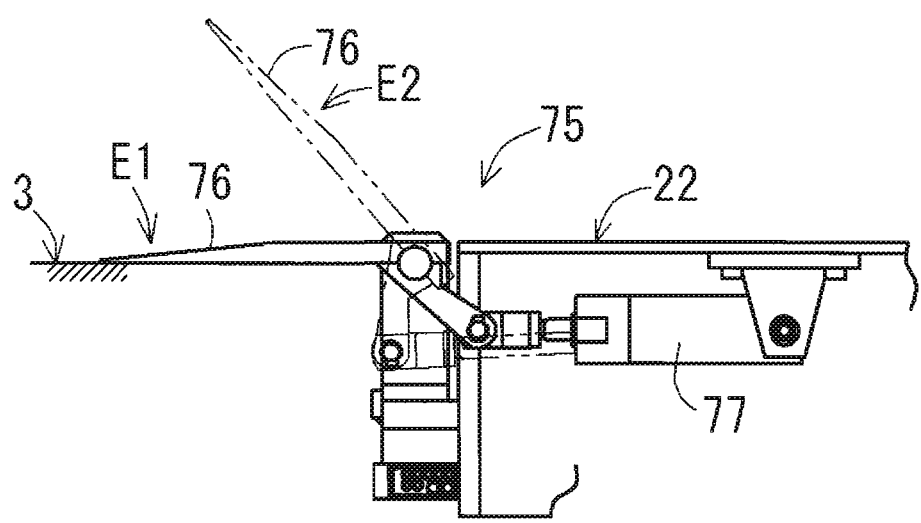
FIG. 16 is a side view of an access plate mechanism according to Example 1.

An access plate mechanism 75 is provided to the front end portion of the stage 22 (see FIG. 1). As shown in FIG. 16, the access plate mechanism 75 includes an access plate 76 supported on the front end side of the stage 22 to be able to swing about a horizontal axis. A swinging cylinder 77 to be actuated by air pressure is supported on the stage 22 to be able to swing about the horizontal axis. An axially-supported side of the access plate 76 is connected to a tip end side of a piston rod of the swinging cylinder 77. Extension and contraction of the piston rod of the swinging cylinder 77 allows the access plate 76 to swing between a reaching state E1 in which the access plate 76 reaches the floor face of the opening end side 3a of the container 3 and a separated state E2 in which the access plate 76 is separated from the floor face of the container 3.

(2) Structure of Pallet

Figure 17:
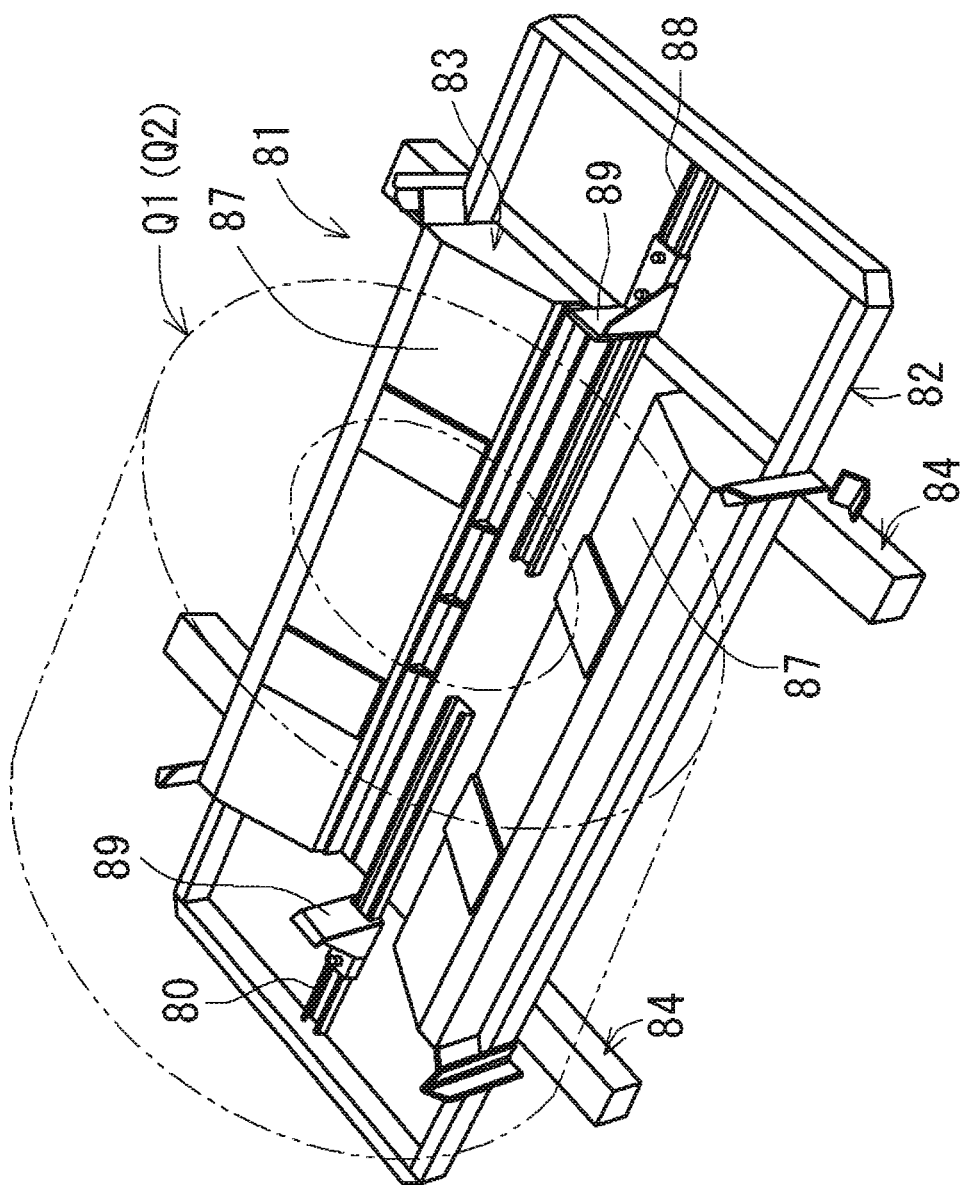
FIG. 17 is a perspective view of a pallet according to Example 1.

As shown in FIG. 17, a pallet 81 according to Example 1 includes a pallet main body 82, a support portion 83 disposed on the upper portion of the pallet main body 82, and leg portions 84 which are disposed at the lower portion of the pallet main body 82 to come in contact with the floor face. The pallet main body 82 is formed by assembling metal long materials into a substantially rectangular frame. A width of the pallet main body 82 is substantially the same as a clearance between left and right side walls of container 3 (see FIG. 2). A space S which the conveyance body 21 can enter is formed under the pallet main body 82 (see FIG. 9).

The support portion 83 has a pair of first slopes 87 facing each other so as to support the outer peripheral face of the coil-shaped object to be conveyed Q. The leg portions 84 extend in directions substantially orthogonal to the axis of the coil-shaped object to be conveyed Q supported on the support portion 83. A length of a longer side of each of the leg portions 84 is substantially one-fourth of a length of a longer side of the floor face of the container 3 in which the pallet 81 is stored (see FIG. 23(b)).

The pallet main body 82 is provided with rails 88 extending in an axial direction of the coil-shaped object to be conveyed Q supported on the support portion 83. A pair of first support chips 89 for supporting axial end faces of the coil-shaped object to be conveyed Q are mounted to the rails 88 to be able to slide. Mounted positions of the first support chips 89 on the rails 88 can be adjusted according to an axial length of the coil-shaped object to be conveyed Q.

Figure 19:
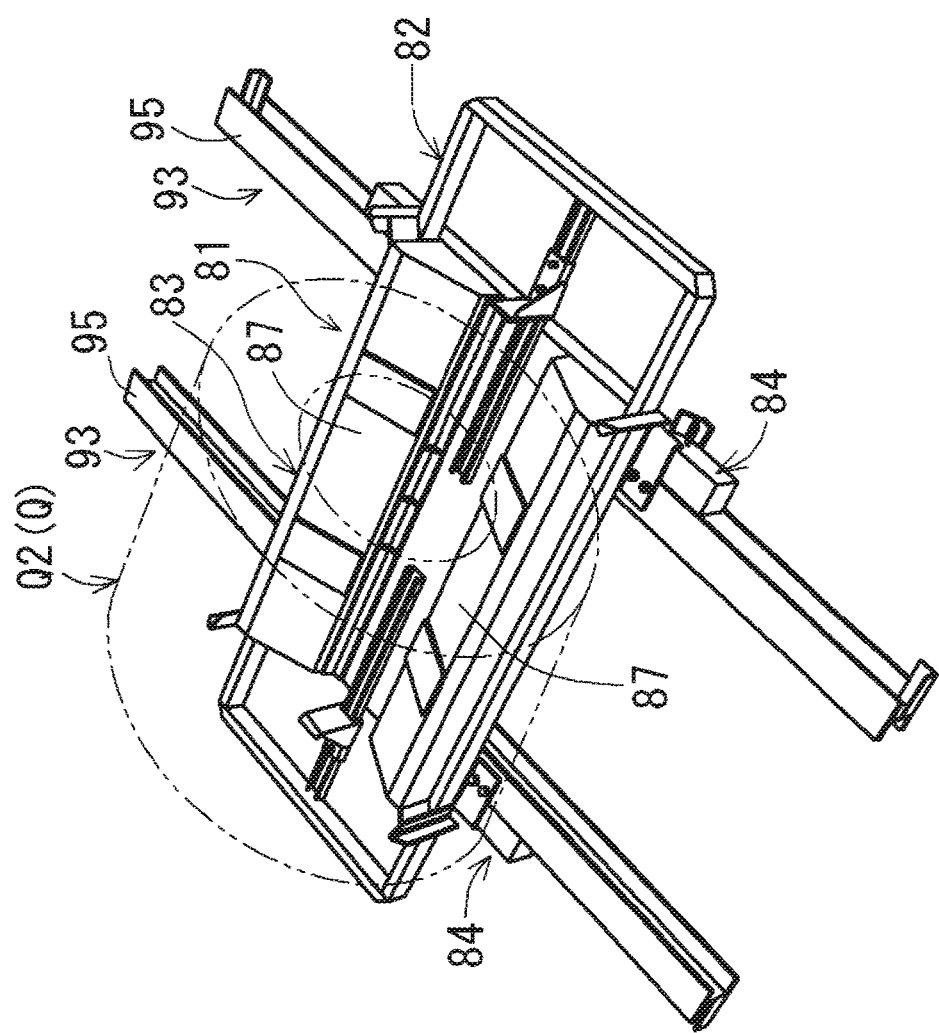
FIG. 19 is a perspective view of the pallet with the large weight attachments.

Here, if the coil-shaped object to be conveyed Q is a coil-shaped object to be conveyed Q2 with a large weight larger than or equal to a predetermined value (e.g., 12 tons to 1.35 tons, also referred to as "large unit weight"), large weight attachments 93 are attached to the pallet 81 (see FIG. 19). If the coil-shaped object to be conveyed Q is a coil-shaped object to be conveyed Q3 with a large outside diameter larger than or equal to a predetermined value (e.g., φ1420 mm to 1660 mm), large outside diameter attachments 94 are attached to the pallet 81 (see FIG. 21). Moreover, if the coil-shaped object to be conveyed Q is a coil-shaped object to be conveyed Q4 with a large weight and a large outside diameter, the large weight attachments 93 and the large outside diameter attachments 94 are attached to the pallet 81 (see FIG. 22).

If the coil-shaped object to be conveyed Q is a coil-shaped object to be conveyed Q1 with a normal weight (smaller than 12 tons, for example) and a normal outside diameter (smaller than φ1420 mm, for example), the pallet 1 is used as it is without use of the large weight and large outside diameter attachments 93 and 94 (see FIG. 17).

Figure 18:
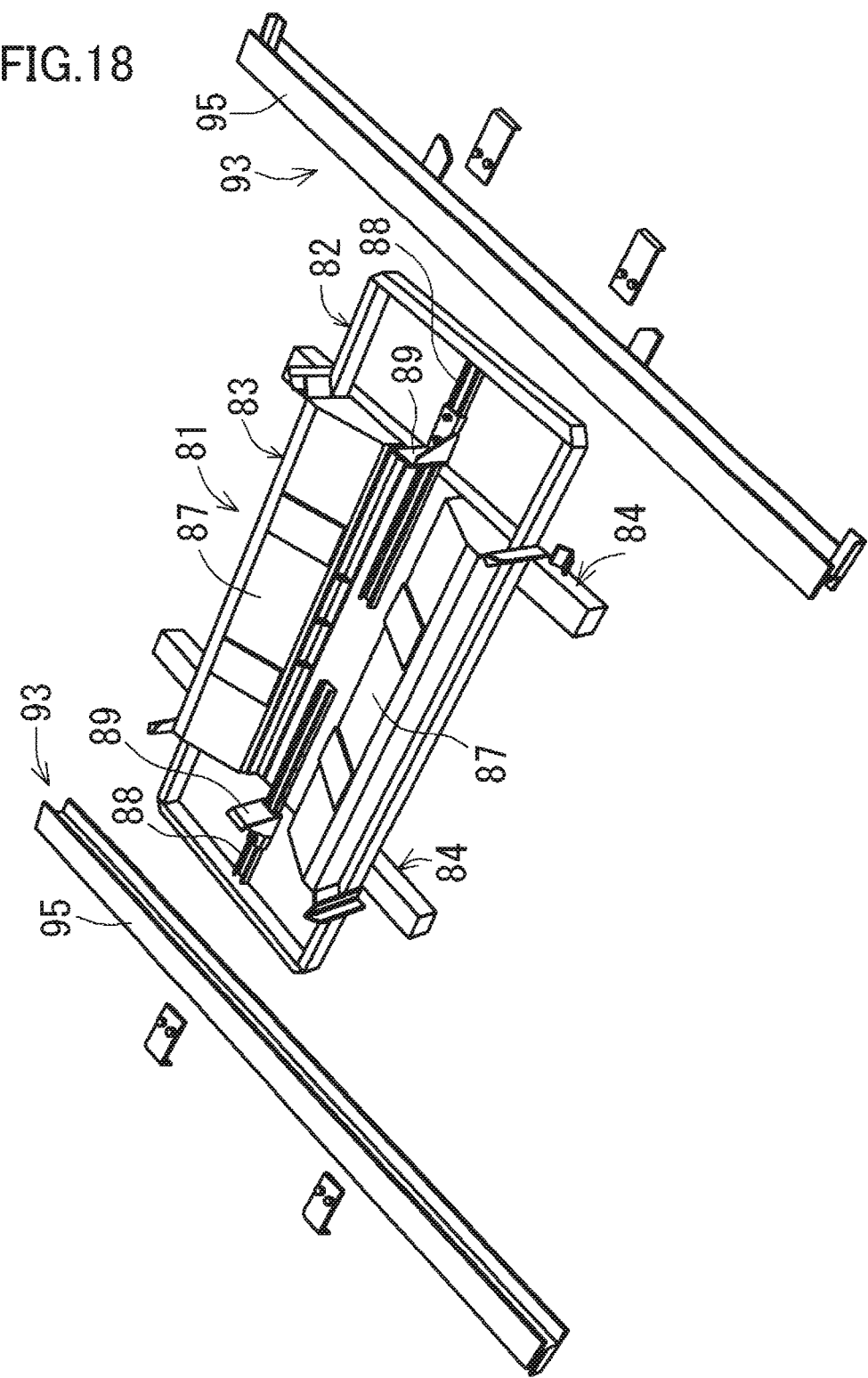
FIG. 18 is a perspective view for explaining large weight attachments according to Example 1.

As shown in FIGS. 18 and 19, each of the large weight attachments 93 includes a long leg member 95 which is detachably attached to the leg portion 84 to come in contact with the floor face and extends to be longer than the leg portion 84. Each of the leg members 95 extends to be longer than the length of the longer side of the leg portion 84. To put it concretely, a length of a longer side of each of the leg members 95 is substantially twice the length of the longer side of the leg portion 84.

Figure 20:
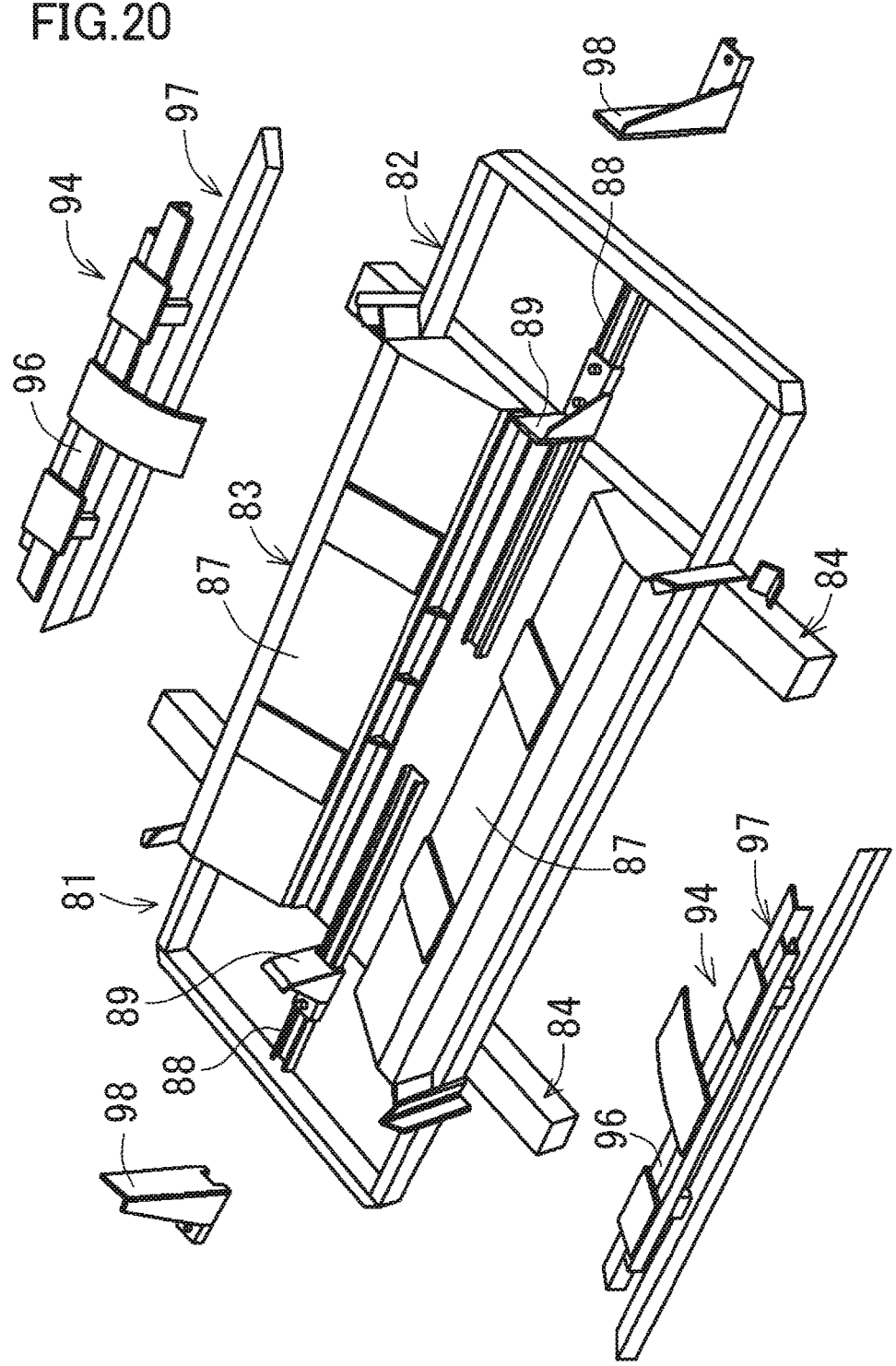
FIG. 20 is a perspective view for explaining large outside diameter attachments according to Example 1.
Figure 21:
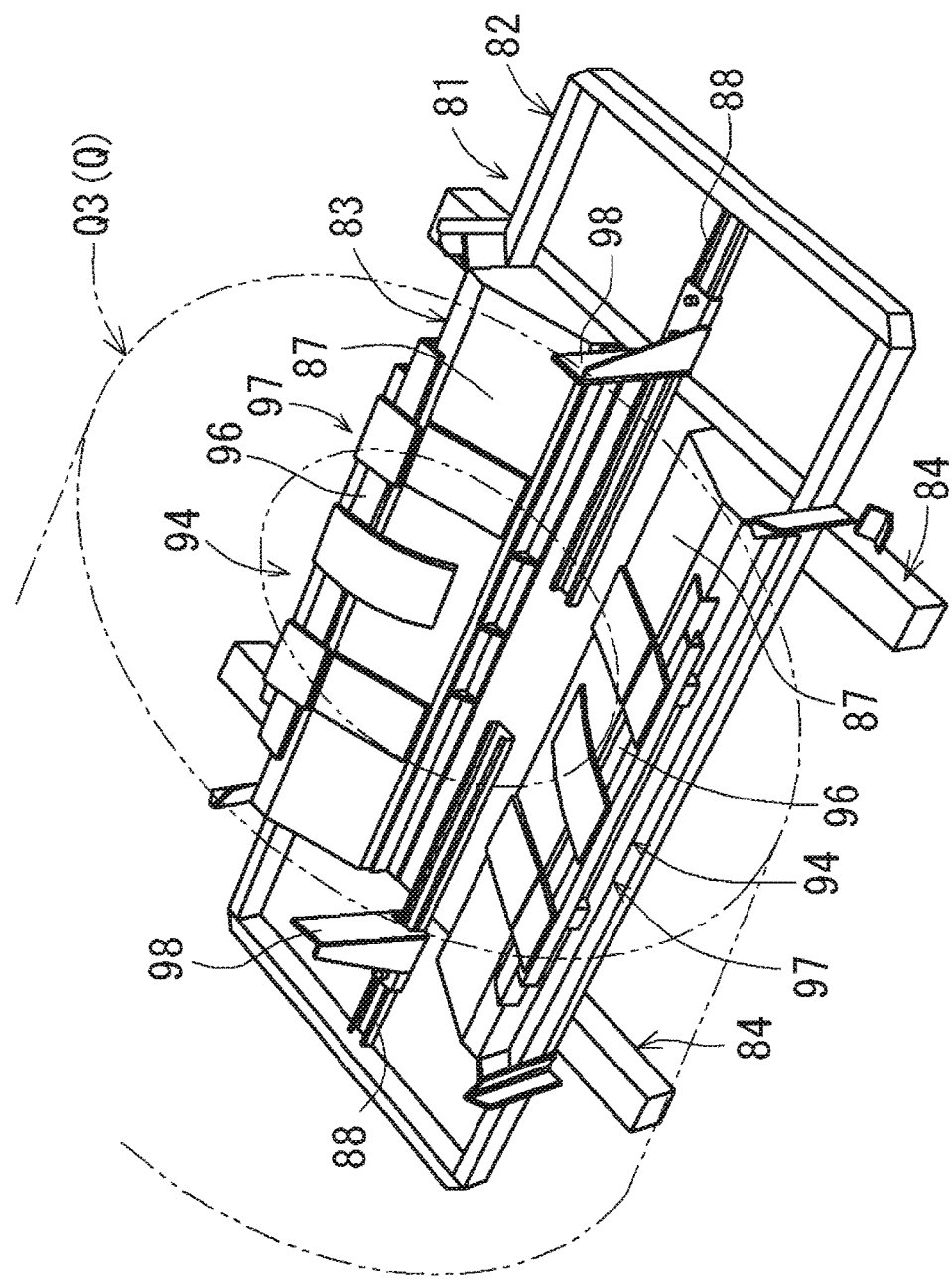
FIG. 21 is a perspective view of a pallet with the large outside diameter attachments.
Figure 22:
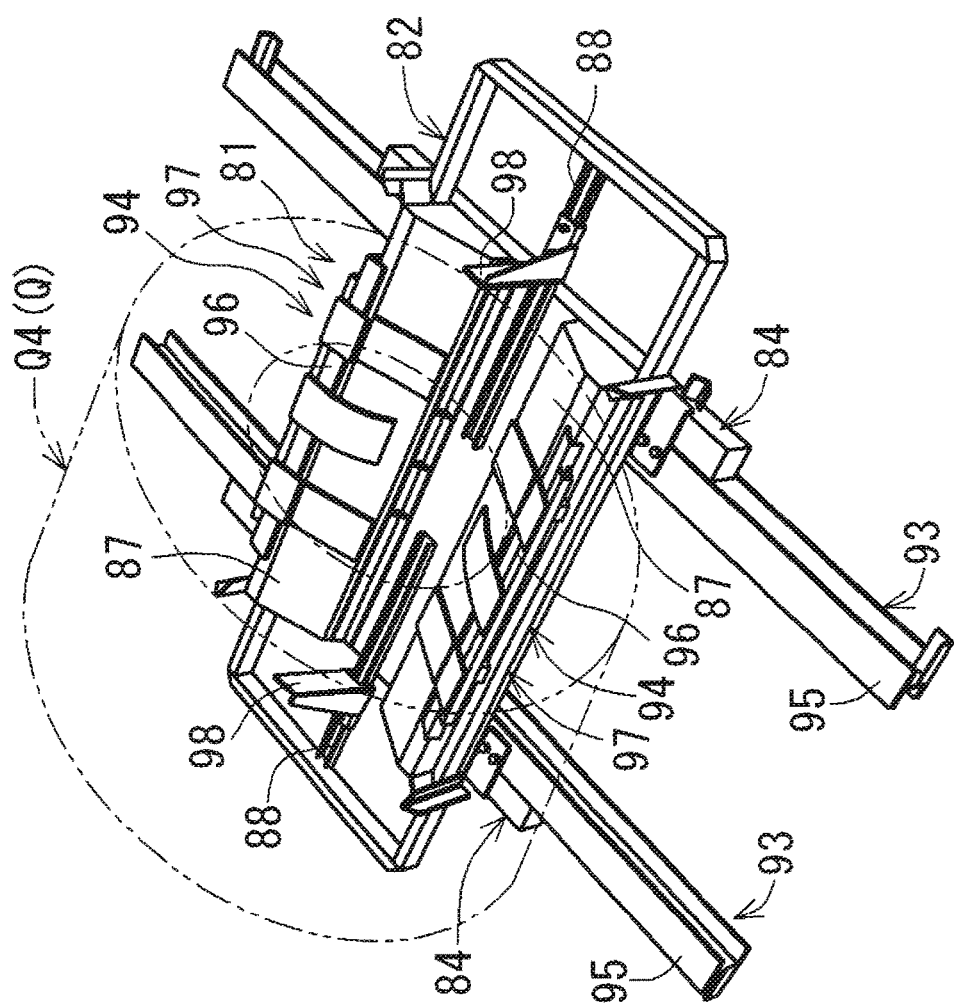
FIG. 22 is a perspective view of a pallet with the large weight attachments and the large outside diameter attachments.

As shown in FIGS. 20 and 21, each of the large outside diameter attachments 94 includes a support member 97 which is detachably attached to the support portion 83 or the pallet main body 82 and has a second slope 96 positioned above the first slope 87 in the attached state. To put it concretely, the second slope 96 is positioned above and beside the first slope 87 so as to extend diagonally upward from an upper end side of the first slope 87 (see FIG. 23(a)). The first slope 87 and the second slope 96 are substantially the same as each other in angles of inclination with respect to a horizontal direction.

To use the large outside diameter attachments 94, the first support chips 89 are detached from the pallet main body 82 and second support chips 98 having greater height dimensions than the first support chips 89 are attached to the pallet main body 82.

As a form of storage of the pallets 81 on which the above-described various coil-shaped objects to be conveyed Q1 to Q4 are loaded into the container 3, the pallet 81 on which the large outside diameter coil-shaped object to be conveyed Q3 is loaded by use of the large outside diameter attachments 94 may be disposed at a center of the length direction of the container 3 and the pallets 81 on each of which the coil-shaped object to be conveyed Q1 is loaded without use of the attachments may be disposed on opposite sides in the length direction of the container 3 with spacers 91 disposed between the central and opposite pallets 81, for example, as shown in FIG. 23(a). As another example, as shown in FIG. 23(b), the pallets 81 on each of which the coil-shaped object to be conveyed Q1 is loaded without use of the attachments may be arranged and disposed along the length direction of the container 3. As yet another example, as shown in FIG. 23(c), the pallets 81 on each of which the coil-shaped object to be conveyed Q1 is loaded without use of the attachments may be arranged and disposed along the length direction of the container 3 with spacers 92 interposed between the pallets 81.

As another example, as shown in FIG. 24(a), the pallets 81 on each of which the coil-shaped object to be conveyed Q1 is loaded without use of the attachments may be disposed on opposite end sides in the length direction of the container 3 with a spacer 90 interposed therebetween. As another example, as shown in FIG. 24(b), the pallet 81 on which the large weight coil-shaped object to be conveyed Q2 is loaded by use of the large weight attachments 93 may be disposed at the center in the length direction of the container 3 and the pallets 81 on each of which the coil-shaped object to be conveyed Q1 is loaded without use of the attachments may be disposed on the opposite sides in the length direction of the container 3. As yet another example, as shown in FIG. 24(c), the pallets 81 on each of which the large weight coil-shaped object to be conveyed Q2 is loaded by use of the large weight attachments 93 may be arranged and disposed along the length direction of the container 3.

(3) Workings of Conveyance System for Object to be Conveyed

Next, carrying-in (also referred to as "vanning") workings of the conveyance system 1 for the object to be conveyed having the above-described structure will be described. In the present example, the two pallets 81 on each of which the large weight coil-shaped object to be conveyed Q2 is loaded by use of the large weight attachments 93 (hereinafter, also referred to as "pallets 81 loaded with the objects to be conveyed") are arranged and stored in the container 3 (see FIG. 24(c)).

First, as shown in FIG. 25(a), the trailer 2 with doors on the opening end side 3a of the container 3 open is moved backward and positioned in the predetermined position A. Next, in the jack device 5, the lifting/lowering body 9 is brought into the upright state B1 by extension of the piston rods of the reversing cylinders 19 and the lifting/lowering body 9 is lifted in the upright state B1 to be brought into raising state C1 by extension of the piston rod of the lifting/lowering cylinder 17 (see FIG. 5). Then, as shown in FIG. 25(b), the chassis 2a bulging rearward from the opening end side 3a of the container 3 is raised by the jack device 5 from below. Then, as shown in FIG. 25(c), the mobile body 23 which is in the standby state D1 and lifted from the floor face by the air bearings 45 is moved forward by extension of the piston rods of the moving cylinders 48.

During the forward movement of the mobile body 23, the stage 22 is lowered by the jack mechanisms 24 so that the lower face of the stage 22 and an upper face of the chassis 2a come close to each other (specifically, the stage 22 automatically stops at a position 20 mm above the upper face of the chassis 2a by use of a proximity sensor) and the guide rollers 50 are brought into the projecting states by extension of the piston rods of the guiding cylinders 51 and guided by the guide portions 52 (see FIG. 13(a)). On the other hand, immediately before the end of the forward movement of the mobile body 23 (i.e., immediately before the mobile body 23 comes into the advanced state D2), the guide rollers 50 are brought into the receding states by contraction of the piston rods of the guiding cylinders 51 and the guiding by the guide portions 52 is cancelled (see FIG. 13(b)). When the mobile body 23 is brought into the advanced state D2, the second lock pins 68 are inserted into the second insertion holes 72 formed in the corner fittings 70 of the container 3 and the first lock pins 65 are inserted by the lock mechanisms 61 into the first insertion holes 71 in the corner fittings 70 of the container 3 and drawn rearward (see FIG. 15(b)).

Then, the opening end side 3a of the container 3 and the tip end side of the stage 22 come in contact with and are connected to each other in the front-back direction P of the chassis 2a and the stage 22 is accurately positioned in the width direction and the front-back direction with respect to the chassis 2a. Then, the access plate 76 is caused to reach the floor face of the opening end side 3a of the container 3 to come into the reaching state E1 due to extension of the piston rod of the swinging cylinder 77 (see FIG. 16). Then, the stage 22 is further lowered by the jack mechanisms 24 and placed onto the chassis 2a. At this time, the lifting/lowering bodies 56 of the front jack mechanisms 24 are separated from the stage 22 with the contact between the lifting/lowering bodies 56 and the stage 22 cancelled (see FIG. 12(b)) and the floor face of the container 3 and the floor face of the stage 22 substantially flush with each other.

Then, as shown in FIG. 26(a), the pallet 81 which is loaded with the object to be conveyed and which is suspended and transferred by the crane or the like is lowered onto the predetermined position on the stage 22. At this time, the conveyance body 21 is on standby below the pallet 81 loaded with the object to be conveyed. Next, as shown in FIG. 26(b), compressed air is supplied into the expanding/contracting members 34 to cause the conveyance body 21 to raise the pallet 81 loaded with the object to be conveyed from the floor face (see FIG. 9(a)) and the push chain 26 (see FIG. 1) causes the conveyance body 21 to travel from the position on the stage 22 toward an inside of the container 3. Then, the compressed air is exhausted from the expanding/contracting members 34 to cause the conveyance body 21 to place the pallet 81 loaded with the object to be conveyed onto the floor face of the container 3 (see FIG. 9(b)). Then, by repeating the above-described workings according to the number of pallets 81 which are loaded with the objects to be conveyed and which are to be stored into the container 3, the predetermined number of pallets 81 loaded with the objects to be conveyed are carried into the container 3.

When a series of carrying-in operations are finished as described above, as shown in FIG. 26(c), the stage device 6 is returned into a state before setting. To put it concretely, the access plate 76 is separated from the floor face of the opening end side 3a of the container 3 and the stage 22 is lifted slightly from the upper face of the chassis 2a by the jack mechanisms 24. In this state, the first lock pins 65 are withdrawn from the first insertion holes 71 by the lock mechanisms 61 and the mobile body 23 is caused to move rearward by contraction of the moving cylinders 48 to withdraw the second lock pins 68 from the second insertion holes 72. Then, it is cancelled to raise the chassis 2a by the jack device 5.

Next, carrying-out (also referred to as "devanning") workings of the conveyance system 1 for the object to be conveyed having the above-described structure will be described. In the present example, the two pallets 81 on each of which the large weight coil-shaped object to be conveyed Q2 is loaded by use of the large weight attachments 93 (hereinafter also referred to as "pallets 81 loaded with the objects to be conveyed") are arranged and stored in the container 3 (see FIG. 24(c)).

First, as shown in FIG. 27(a), the trailer 2 with the doors on the opening end side 3a of the container 3 open is moved backward and positioned in the predetermined position A. Next, in the jack device 5, the lifting/lowering body 9 is brought into the upright state B1 by extension of the piston rods of the reversing cylinders 19 and the lifting/lowering body 9 is lifted in the upright state B1 to be brought into the raising state C1 by extension of the piston rod of the lifting/lowering cylinder 17 (see FIG. 5). Then, as shown in FIG. 27(b), the chassis 2a bulging rearward from the opening end side 3a of the container 3 is raised by the jack device 5 from below. Then, as shown in FIG. 27(c), the mobile body 23 which is in the standby state D1 and lifted from the floor face by the air bearings 45 is moved forward by extension of the piston rods of the moving cylinders 48.

During the forward movement of the mobile body 23, the stage 22 is lowered by the jack mechanisms 24 so that the lower face of the stage 22 and the upper face of the chassis 2a come close to each other (specifically, the stage 22 automatically stops at the position 20 mm above the upper face of the chassis 2a by use of the proximity sensor) and the guide rollers 50 are brought into the projecting states by extension of the piston rods of the guiding cylinders 51 and guided by the guide portions 52 (see FIG. 13(a)). On the other hand, immediately before the end of the forward movement of the mobile body 23 (i.e., immediately before the mobile body 23 comes into the advanced state), the guide rollers 50 are brought into the receding states by contraction of the piston rods of the guiding cylinders 51 and the guiding by the guide portions 52 is cancelled (see FIG. 13(b)). When the mobile body 23 is brought into the advanced state D2, the second lock pins 68 are inserted into the second insertion holes 72 formed in the corner fittings 70 of the container 3 and the first lock pins 65 are inserted by the lock mechanisms 61 into the first insertion holes 71 in the corner fittings 70 of the container 3 and drawn rearward (see FIG. 15(b)).

Then, the opening end side 3a of the container 3 and the tip end side of the stage 22 come in contact with and are connected to each other in the front-back direction P of the chassis 2a and the stage 22 is accurately positioned in the width direction and the front-back direction with respect to the chassis 2a. Then, the access plate 76 is caused to reach the floor face of the opening end side 3a of the container 3 to come into the reaching state E1 due to extension of the piston rod of the swinging cylinder 77 (see FIG. 16). Then, the stage 22 is lowered by the jack mechanisms 24 and placed onto the chassis 2a. At this time, the lifting/lowering bodies 56 of the front jack mechanisms 24 are separated from the stage 22 with the contact between the lifting/lowering bodies 56 and the stage 22 cancelled (see FIG. 12(b)) and the floor face of the container 3 and the floor face of the stage 22 substantially flush with each other.

Then, as shown in FIG. 28(a), the conveyance body 21 on the stage 22 is caused to travel toward the inside of the container 3 by the push chain 26 (see FIG. 1). Then, compressed air is supplied into the expanding/contracting members 34 to cause the conveyance body 21 to raise the pallet 81 loaded with the object to be conveyed from the floor face while the conveyance body 21 is positioned directly below the pallet 81 which is loaded with the object to be conveyed and which is placed in the container 3 (see FIG. 9(a)) and the conveyance body 21 is caused to travel toward the stage 22 by the push chain 26. Then, as shown in FIG. 28(b), the compressed air is exhausted from the expanding/contracting members 34 to cause the conveyance body 21 to place the pallet 81 loaded with the object to be conveyed onto the floor face of the stage 22 (see FIG. 9(b)). Then, the pallet 81 loaded with the object to be conveyed is transferred from the position on the stage 22 by the crane or the like. Then, by repeating the above-described workings according to the number of pallets 81 which are loaded with the objects to be conveyed and which are stored in the container 3, the predetermined number of pallets 81 loaded with the objects to be conveyed are carried out of the container 3.

When a series of carrying-out operations are finished as described above, as shown in FIG. 28(c), the stage device 6 is returned into the state before setting. To put it concretely, the access plate 76 is separated from the floor face of the opening end side 3a of the container 3 and the stage 22 is lifted slightly from the upper face of the chassis 2a by the jack mechanisms 24. In this state, the first lock pins 65 are withdrawn from the first insertion holes 71 by the lock mechanisms 61 and the mobile body 23 is caused to move rearward by contraction of the moving cylinders 48 to withdraw the second lock pins 68 from the second insertion holes 72. Then, it is cancelled to raise the chassis 2a by the jack device 5.

(4) Effect of Embodiment

According to the conveyance system 1 for the object to be conveyed of the embodiment, the conveyance system 1 includes the jack device 5 for lifting the chassis 2a from below and the stage device 6 arranged behind the jack device 5. The stage device 6 includes the conveyance body 21 on which the object to be conveyed Q is placed and conveyed, the stage 22 on which the conveyance body 21 travels, the mobile body 23 for supporting the stage 22 and capable of movement in the front-back direction P of the chassis 2a, and the jack mechanism 24 provided to the mobile body 23 to raise the stage 22 from below so that the stage 22 is lifted or lowered. The mobile body 23 moves forward and the jack mechanism 24 lowers the stage 22 while the jack device 5 raises the chassis 2a from below to thereby place the stage 22 on the chassis 2a so that the opening end side 3a of the container 3 and the tip end side of the stage 22 are connected to each other. The conveyance body 21 on which the object to be conveyed Q is placed travels on the floor faces of the stage 22 and the container 3 in this state to thereby convey the object to be conveyed Q to the container 3. In this way, it is possible to easily and quickly convey the object to be conveyed Q to the container 3 mounted on the chassis 2a of the trailer 2. Moreover, because of containerized transportation with the chassis 2a bulging rearward from the opening end side 3a of the container 3, it is possible to load the maximum loading amount of objects to be conveyed Q to the container 3. As a result, it is possible to increase efficiency of the containerized transportation.

Especially, according to the conveyance system 1 for the object to be conveyed in the present example, it is possible to load the objects to be conveyed Q of 30.48 tons (including the weight of the container) at the maximum into the container 3 to thereby reduce the number of containers to ship the same number of products. As a result, operation time can be shortened, profits can be improved, and container drayage cost can be reduced. Moreover, because the operation for setting the stage device 6 on the chassis 2a is semi-automated, operation time can be shortened and operations which an operator carries out by following his/her hunch and relying on tricks and experience are eliminated so that anyone can carry out the operation. Furthermore, use of the conveyance body 21 for the conveyance operation can substantially reduce physical burdens on the operator. Especially, in the present example, it is possible to increase an amount of objects which can be conveyed in the same conveyance as compared with a conveyance vehicle which is lifted by air and pushed by a person to travel. Moreover, it is unnecessary to modify a chassis to have a deck structure which can lift and lower as in prior art, which simplifies a structure of a trailer.

Further, in the embodiment, the conveyance body 21 includes the rotary roller 36 to be guided by the guide portion 37 provided to the stage 22 when the conveyance body 21 travels on the stage 22. In this way, the rotary roller 36 is guided by the guide portion 37 during the traveling of the conveyance body 21, which suppresses meandering of the conveyance body 21.

Further, in the embodiment, the conveyance body 21 includes the main body 28 having the traveling wheel 27 for traveling on the floor face, and the support body 29 extending in the front-back direction P of the chassis 2a from one end side of the main body 28. The plurality of rotary rollers 36 are arranged at predetermined intervals along the front-back direction P of the chassis 2a on left and right opposite sides of the support body 28. In this way, it is possible to further reliably suppress meandering of the conveyance body 21.

Further, in the embodiment, the stage 22 has the lock mechanism 61 for inserting the lock pin 65 into the insertion hole 71 formed in the corner fitting 70 of the container 3 from the width direction of the chassis 2a and drawing the lock pin 65 rearward. In this way, the lock mechanism 61 inserts the lock pin 65 into the insertion hole 71 and draws the lock pin 65 rearward in placing of the stage 22 onto the chassis 2a, which brings the opening end side 3a of the container 3 and the tip end side of the stage 22 into contact with or close to each other in the front-back direction P of the chassis 2a. Then, the stage 22 is placed on the chassis 2a while accurately positioned and fixed in the width direction and the front-back direction with respect to chassis 2a.

Further, in the embodiment, the mobile body 23 includes the guide roller 50 to be guided by the guide portion 52 provided to the floor face when the mobile body 23 moves in the front-back direction P of the chassis 2a, the guide roller 50 is guided by the guide portion 52 during the movement of the mobile body 23, which suppresses meandering of the mobile body 23. This improves ease of insertion of the lock pin 65 into the insertion hole 71.

Further, in the embodiment, the guide roller 50 is capable of projecting and receding in a direction intersecting the moving direction of the mobile body 23. In this way, by causing the guide roller 50 to recede immediately before the end of a forward movement of the mobile body 23 in placing the stage 22 onto the chassis 2a, it is possible to finely adjust a position of the mobile body 23 in the width direction of the chassis 2a. This improves ease of insertion of the lock pin 65 into the insertion hole 71.

Further, in the embodiment, the mobile body 23 includes the air bearing 45 that jets air toward the floor face to levitate the mobile body 23 from the floor face. In this way, it is possible to finely adjust the position of the mobile body 23 in the width direction of the chassis 2a. As a result, it is possible to easily insert the lock pin 65 into the insertion hole 71 in a corner fitting 70 of the container 3.

Further, in the embodiment, the object to be conveyed Q is the coil-shaped object to be conveyed which is loaded on the pallet 81, the large weight attachment 93 is attached to the pallet 81 when the weight of the coil-shaped object to be conveyed is larger than or equal to the predetermined value, and the large outside diameter attachment 94 is attached to the pallet 81 when the outside diameter of the coil-shaped object to be conveyed is larger than or equal to the predetermined value. In this way, it is possible to adapt to a wide variety of specifications of coil-shaped objects to be conveyed.

Further, in the embodiment, the pallet 81 includes the pallet main body 82, the pair of support portions 83 each having the first slope 87 disposed on the upper portion of the pallet main body 82 and facing each other so as to support the outer peripheral face of the coil-shaped object to be conveyed, and the long leg portions 84 which are disposed at the lower portion of the pallet main body 82 to come in contact with the floor face and which extend in directions intersecting the axis of the coil-shaped object to be conveyed supported on the support portion 83. The large weight attachment 93 includes the long leg member 95 which is detachably attached to the leg portion 84 to come in contact with the floor face and which extends to be longer than the leg portion 84. The large outside diameter attachment 94 includes the support member 97 which is detachably attached to the support portion 83 or the pallet main body 82 and has the second slope 96 positioned above the first slope 87 in the attached state. This improves ease of attachment and detachment of the large weight attachment 93 and the large outside diameter attachment 94 to and from the pallet 81.

Example 2

Next, a conveyance system for an object to be conveyed according to Example 2 will be described. In the conveyance system for the object to be conveyed according to Example 2, substantially the same structural portions as those of the conveyance system 1 for the object to be conveyed according to Example 1 described above will be provided with the same reference signs and will not be described in detail.

(1) Structure of Conveyance System for Object to be Conveyed

The conveyance system 101 for an object to be conveyed according to the present example is for conveying the object to be conveyed to the container 3 mounted on the chassis 2a of the trailer 2 with the chassis 2a bulging rearward from the opening end side 3a of the container 3 as shown in FIGS. 29 to 32. The conveyance system 101 for the object to be conveyed is provided with the jack device 5 for raising the chassis 2a from below and a stage device 102 arranged behind the jack device 5.

The stage device 102 includes a conveyance body 104 on which the object to be conveyed Q is placed and conveyed, a stage 105 on which the conveyance body 104 travels, the mobile body 23 for supporting the stage 105 and capable of movement in the front-back direction P of the chassis 2a, and the jack mechanisms 24 provided to the mobile body 23 to raise the stage 105 from below so that the stage 105 is lifted or lowered.

Figure 29:
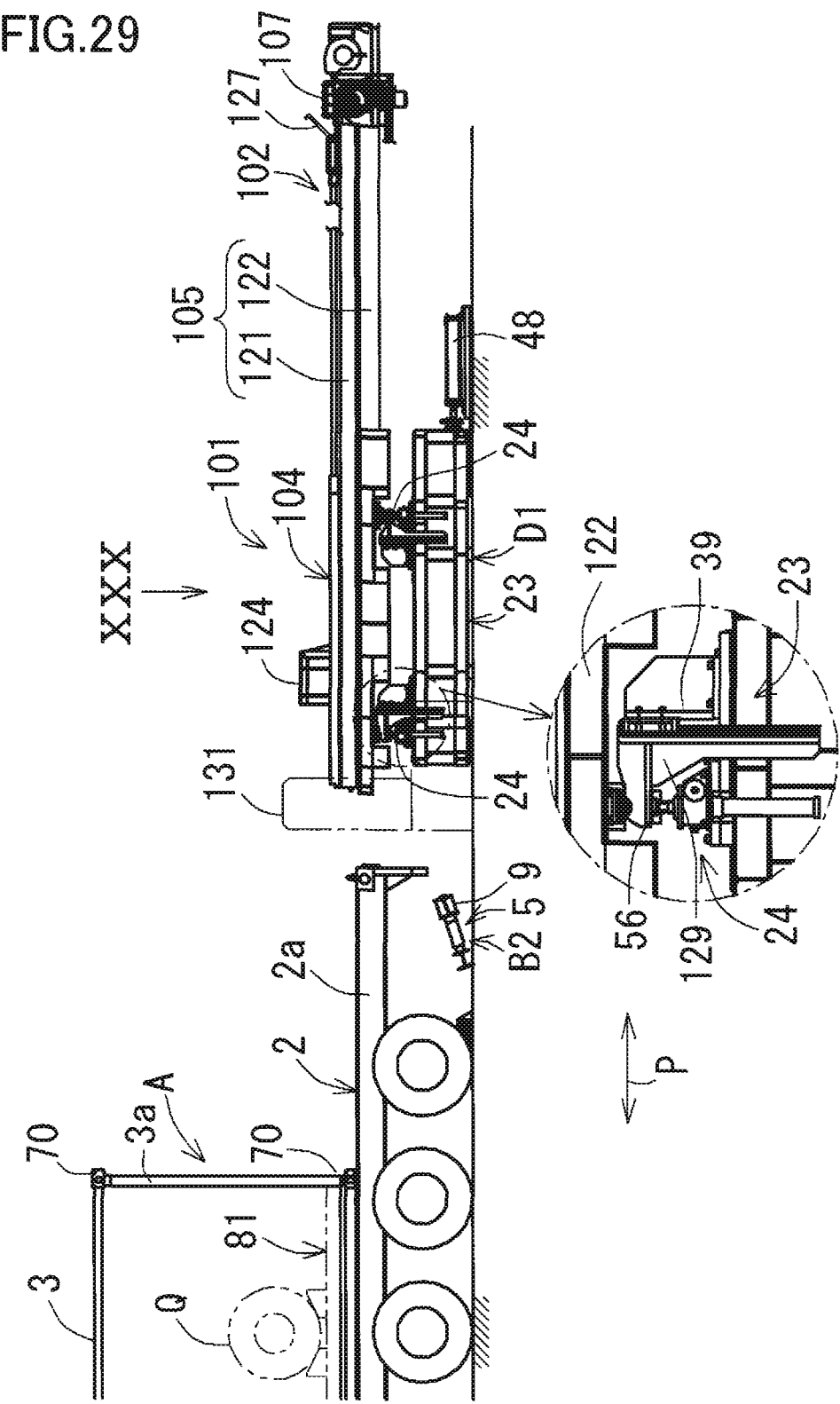
FIG. 29 is a side view of a conveyance system (before setting) for an object to be conveyed according to Example 2.
Figure 33:
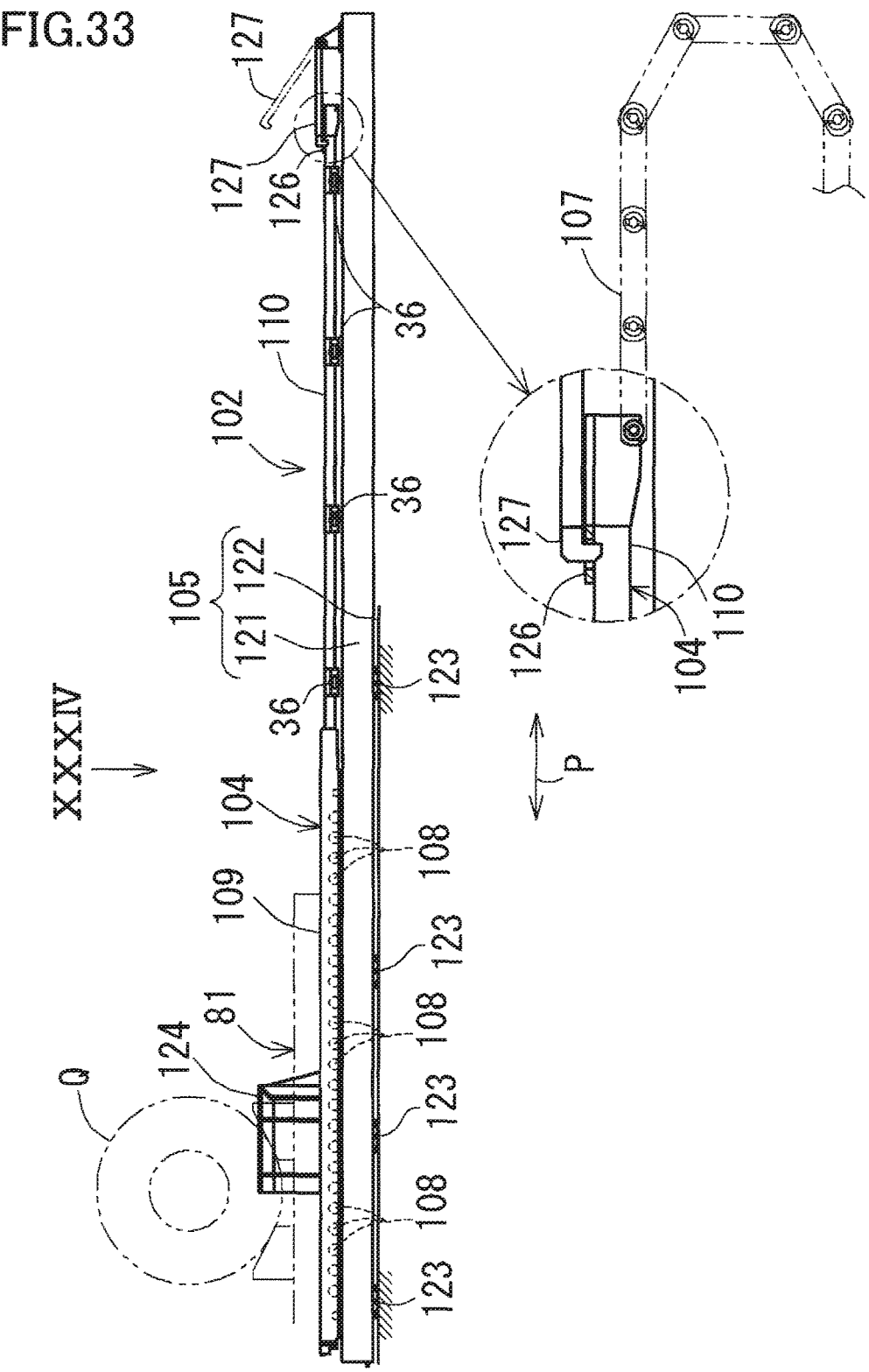
FIG. 33 is a side view of a conveyance body according to Example 2.
Figure 34:
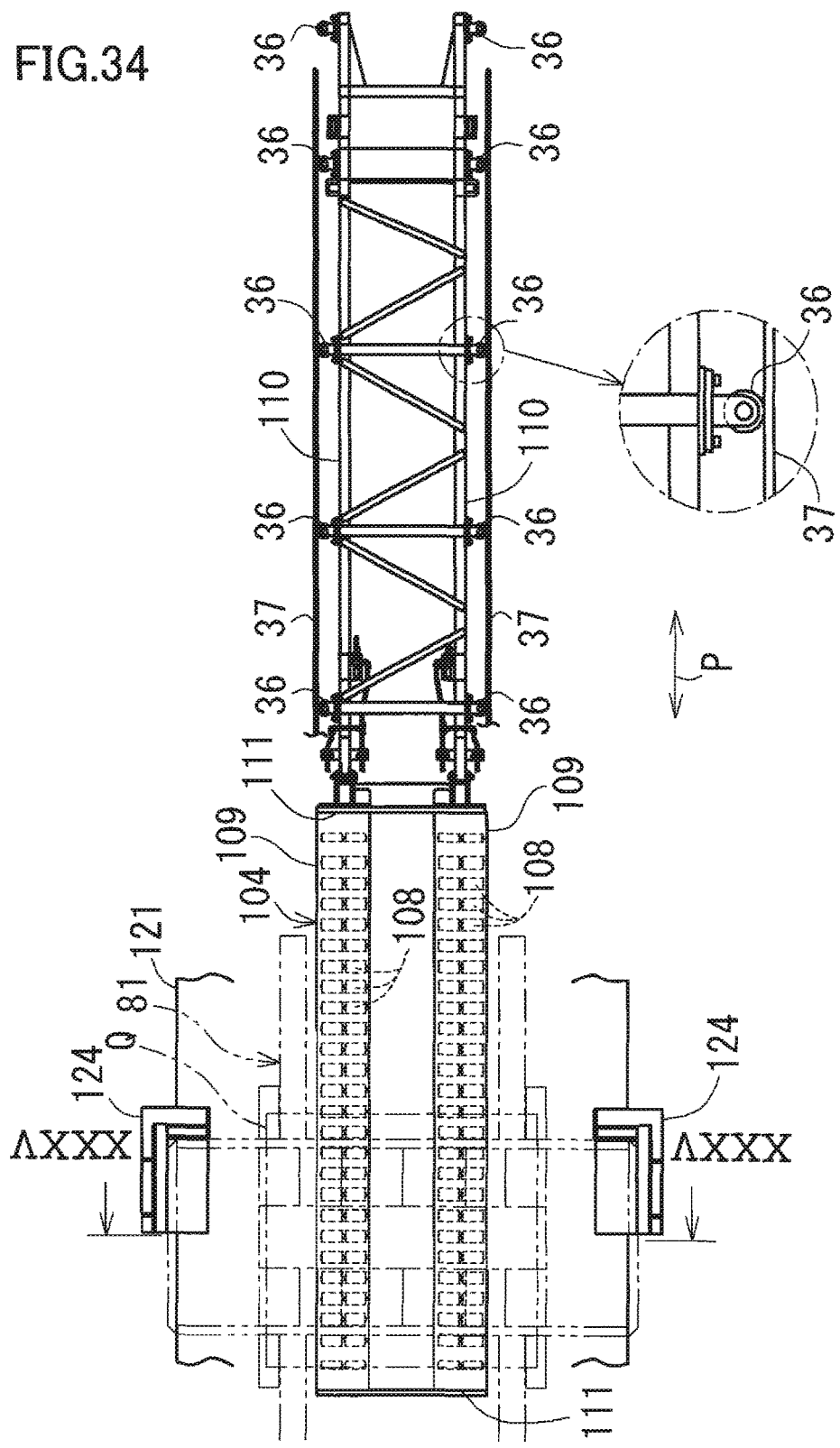
FIG. 34 is a view taken in a direction of arrow XXXIV in FIG. 33.

To the conveyance body 104, one end side of a push chain 107 for causing the conveyance body 104 to travel on the floor face along the front-back direction P of the chassis 2a is connected (see FIG. 29). As shown in FIGS. 33 and 34, this conveyance body 104 includes the left and right main bodies 109 having the large number of traveling wheels 108 for traveling on the floor face, and a support body 110 extending in the front-back direction P of the chassis 2a from the one end sides of the respective main bodies 109. Opposite end sides in a length direction of the left and right main bodies 109 are connected to each other by connecting members 111. The one end side of the push chain 107 is moved in the front-back direction P above the stage 105 by driving by a motor to thereby send the conveyance body 104 forward or pull the conveyance body 104 rearward.

Figure 35:
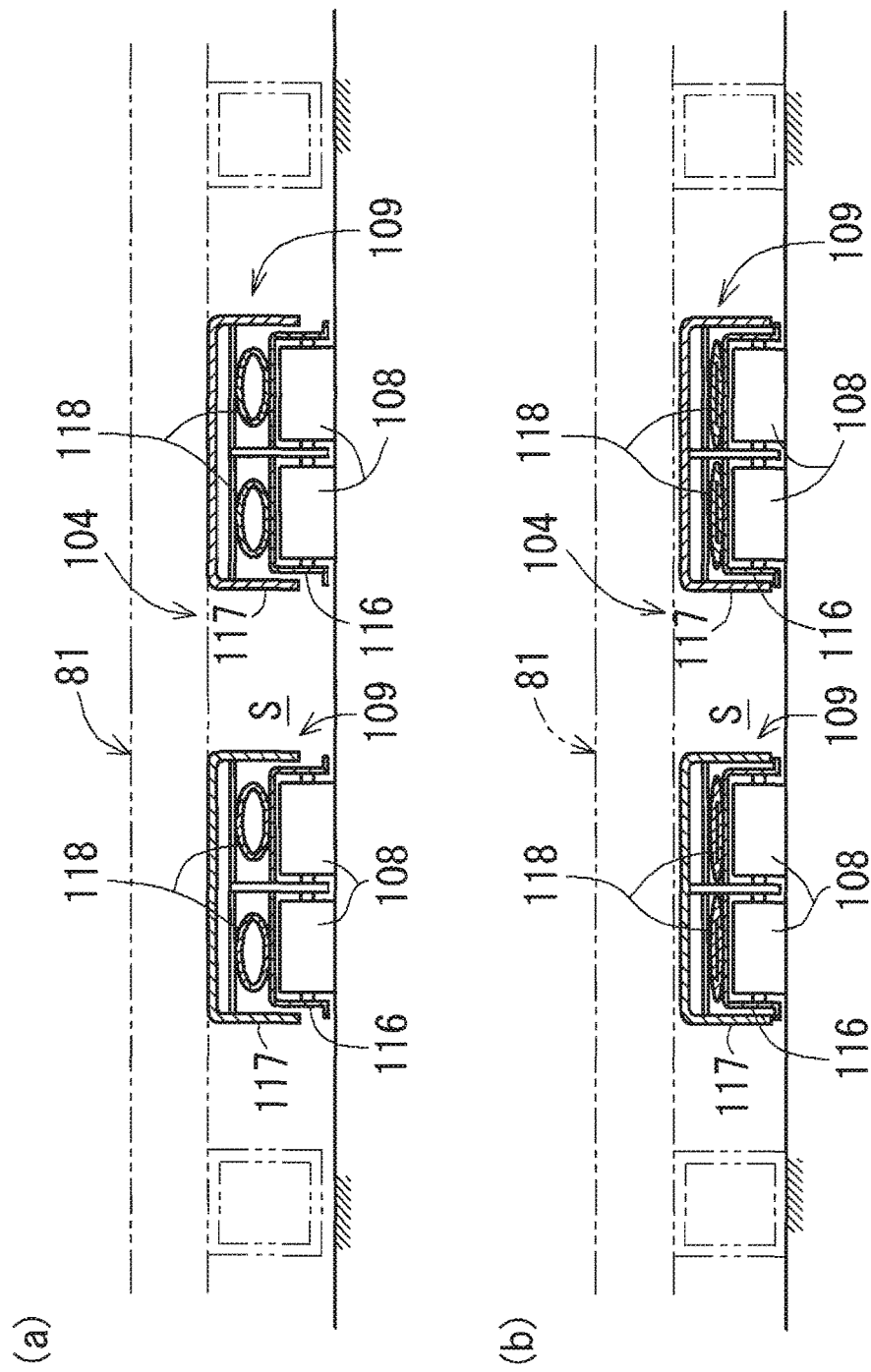

As shown in FIG. 35, each of the main bodies 109 includes: a base member 116 for rotatably supporting the traveling wheels 108 and having a substantially U-shaped vertical section; a pallet support member 117 disposed to cover an upper part of the base member 116, supporting the pallet 81, and having a substantially U-shaped vertical section; and tubular expanding/contracting members 118 disposed between the base member 116 and the pallet support member 117 and expanding and contracting when compressed air is supplied into and exhausted from the expanding/contracting members 118. When the expanding/contracting members 118 expand due to the supply of compressed air, the pallet support members 117 lift to raise the pallet 81 placed on the floor face (see FIG. 35(a)). On the other hand, when the expanding/contracting members 118 contract due to the exhausting of the compressed air, the pallet support members 117 which have lifted lower to place the pallet 81 on the floor face (see FIG. 35(b)).

As shown in FIGS. 33 and 34, the support body 110 is formed by assembling a plurality of long members into a frame. On left and right opposite sides of the support body 110, the plurality of rotary rollers (shown as examples of the "guided portions" according to the invention) 36 are supported to be rotatable about the vertical axes at the predetermined intervals along the front-back direction P of the chassis 2a. The respective rotary rollers 36 are guided by the guide portions 37 provided to the stage 105 when the conveyance body 104 travels on the stage 105. The guide portions 37 extend like walls along a traveling direction of the conveyance body 104 (i.e., the front-back direction P of the chassis 2a).

As shown in FIGS. 33 and 34, the stage 105 includes a mobile-side stage 121 on which the conveyance body 104 travels and a fixed-side stage 122 which supports the mobile-side stage 121 so that the mobile-side stage 121 can move in the front-back direction P of the chassis 2a and which is lifted and lowered by jack mechanisms 24. A plurality of traveling wheels 123 for traveling on an upper face of the fixed-side stage 122 are provided on a lower face side of the mobile-side stage 121. Left and right guides 124 having substantially L-shaped cross sections are provided on an upper face side of the mobile-side stage 121. By being guided by the respective guides 124, the pallet 81 which is suspended and transferred by the crane or the like is positioned in a predetermined position on the mobile-side stage 121 which is determined in advance.

As shown in FIG. 36, engagement levers 127 which can be engaged with and disengaged from hole-shaped engaged portions 126 provided to the conveyance body 104 are provided to a rear end side of the mobile-side stage 121 to be able to swing. By engagement of tip end sides of the engagement levers 127 in the engaged portions 126, power of the push chain 107 (see FIG. 29) is transmitted to the mobile-side stage 121 via the conveyance body 104 and the mobile-side stage 121 is moved in the front-back direction P of the chassis 2a with respect to the fixed-side stage 122. On the other hand, by disengagement of the engagement levers 127 from the engaged portions 126, only the conveyance body 104 is moved in the front-back direction P by the push chain 107 while the mobile-side stage 121 stays stopped. Moreover, the mobile-side stage 121 has the lock mechanisms 61 which are attachable to and detachable from left and right opposite sides of a front end portion of the mobile-side stage 121 (see FIG. 30).

As shown in FIG. 29, slide portions 129 extending downward are provided to a lower face side of the fixed-side stage 122. Each of the slide portions 129 is supported by a guide portion 39 provided to the mobile body 23 to be able to lift and lower. By supporting and guiding the slide portions 129 by the guide portions 39, the mobile body 23 supports the fixed-side stage 122 (i.e., the stage 105) so that the fixed-side stage 122 can lift and lower. Furthermore, the lifting/lowering bodies 56 forming the jack mechanisms 24 come in contact with the fixed-side stage 122 from below to lift and lower the fixed-side stage 122.

Figure 30:
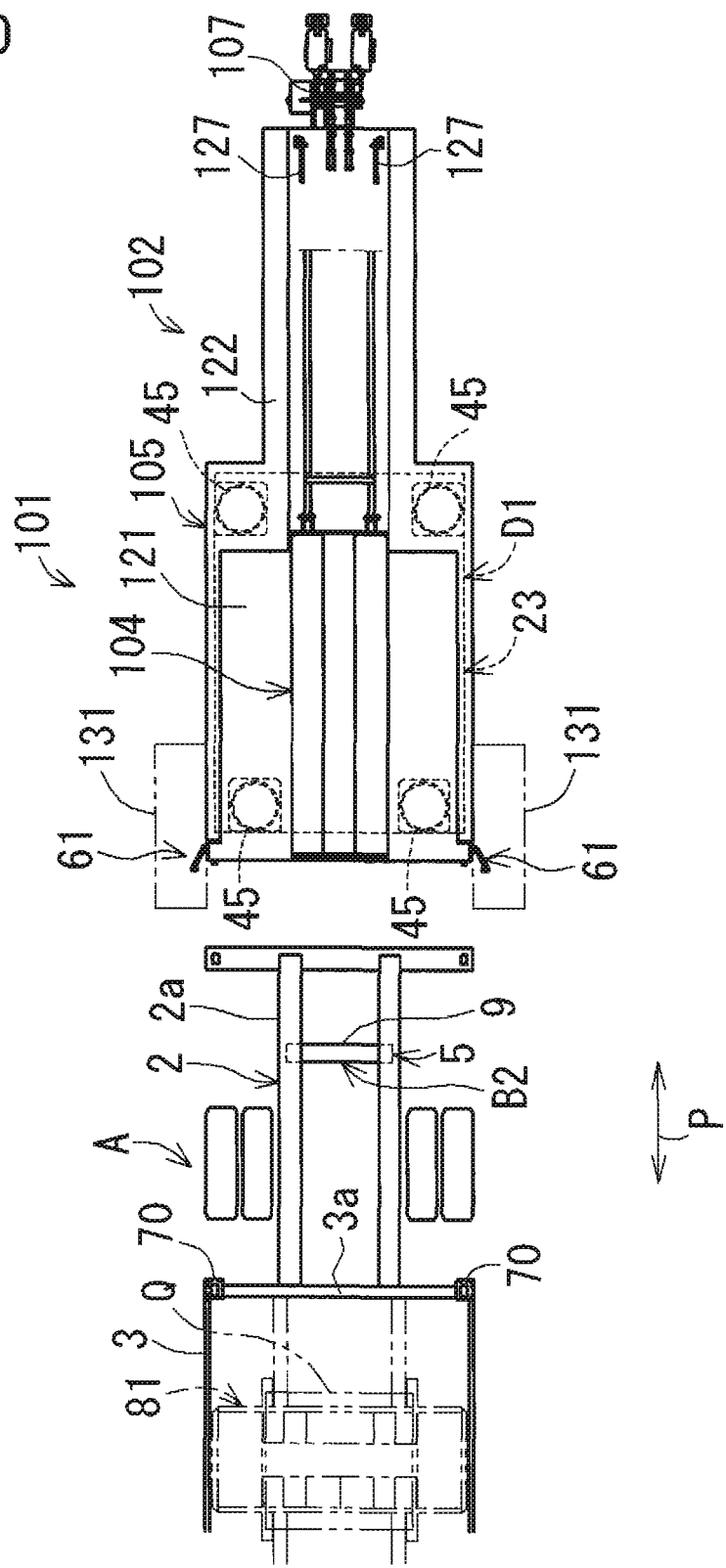
FIG. 30 is a view taken in a direction of arrow XXX in FIG. 29.
Figure 31:
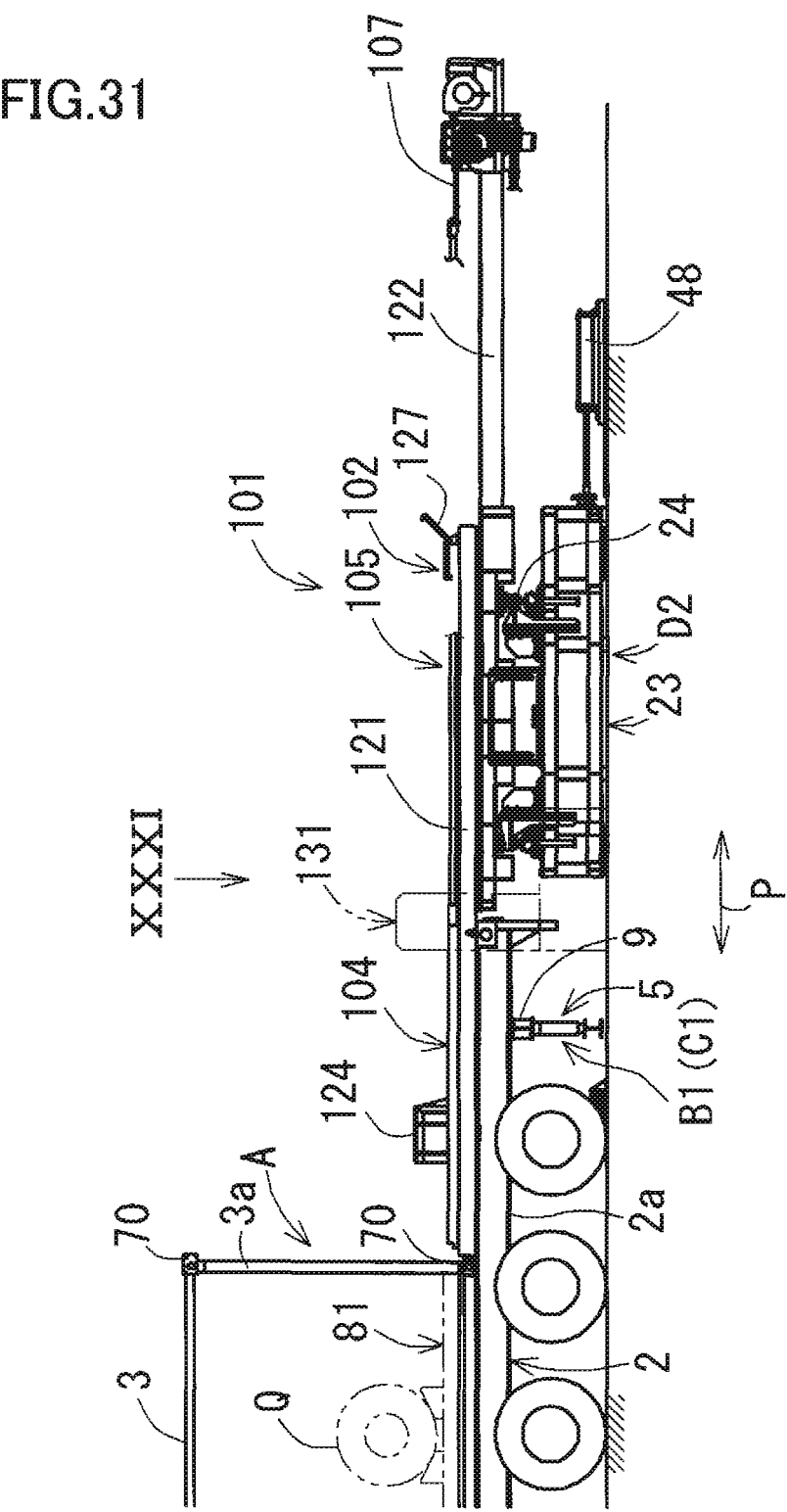
FIG. 31 is a side view of the conveyance system (after setting) for an object to be conveyed.
Figure 32:
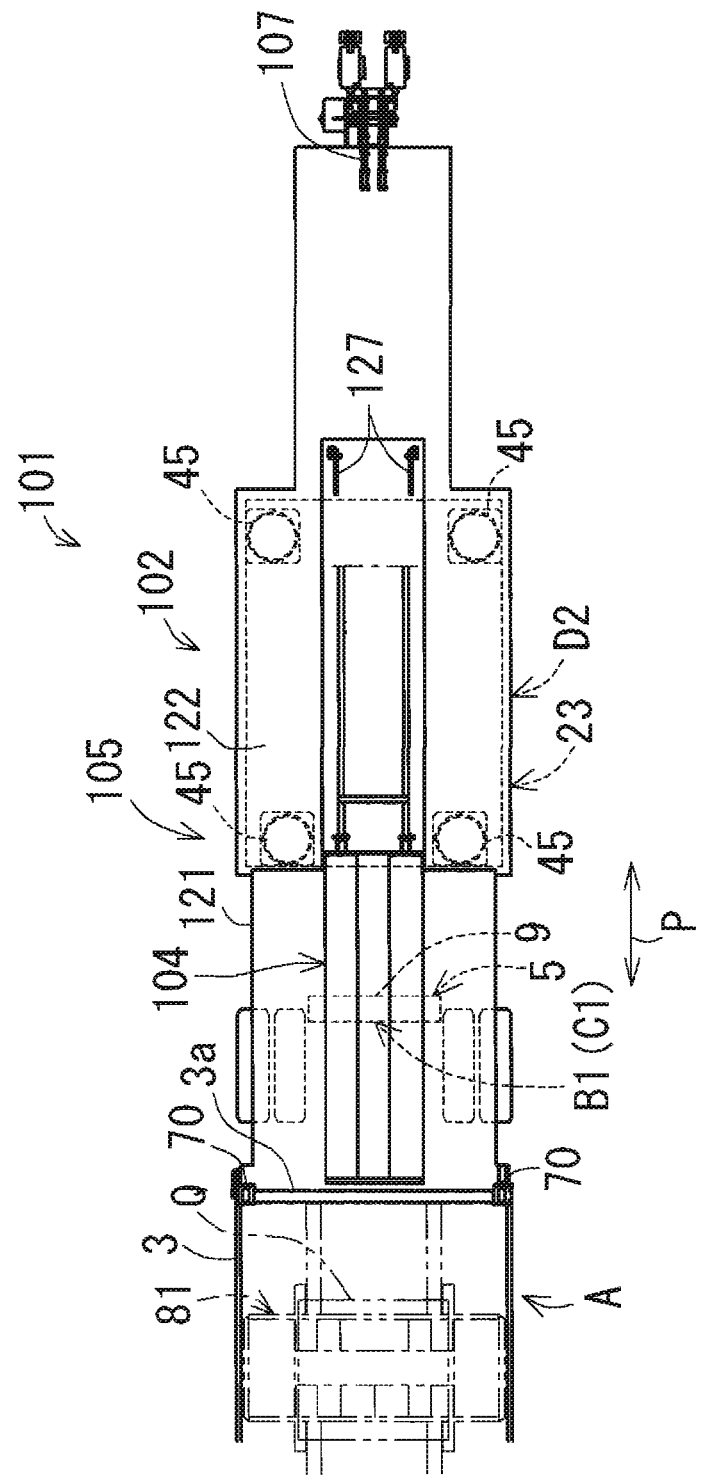
FIG. 32 is a view taken in a direction of arrow XXXI in FIG. 31.

Here, as shown in FIGS. 29 and 30, left and right auxiliary jack devices 131 are provided on opposite sides of the chassis 2a of the trailer 2 positioned in the predetermined position A. The respective auxiliary jack devices 131 are used to convey the object to be conveyed Q to the container 3 with the chassis 2a not bulging rearward from the opening end side 3a of the container 3 mounted on the chassis 2a of the trailer 2.

Figure 37:
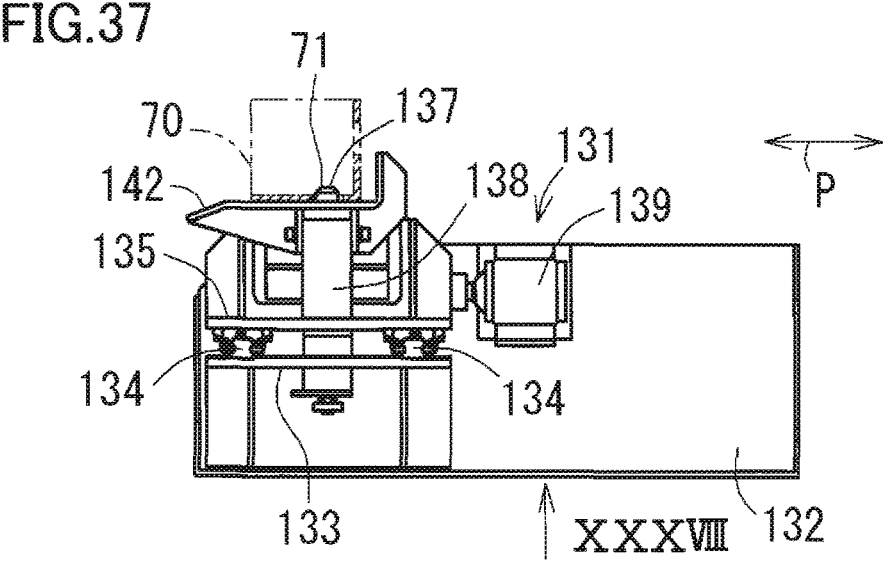
FIG. 37 is a plan view of an auxiliary jack device according to Example 2.
Figure 38:
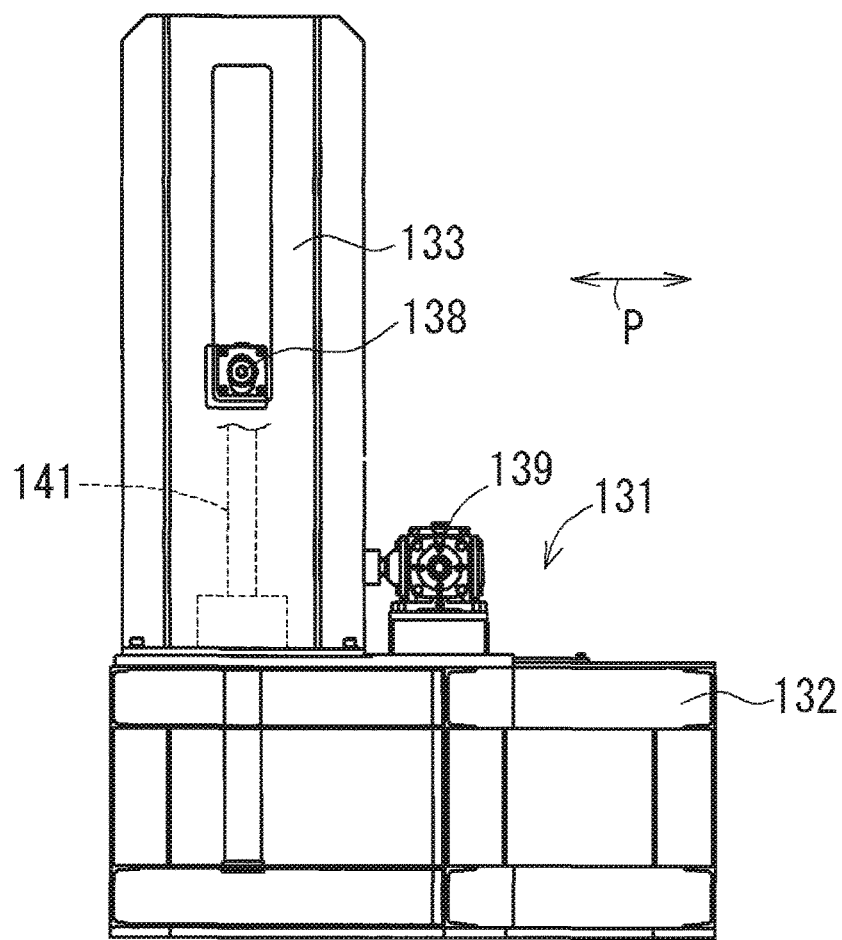
FIG. 38 is a view taken in a direction of arrow XXXVIII in FIG. 37.
Figure 39:
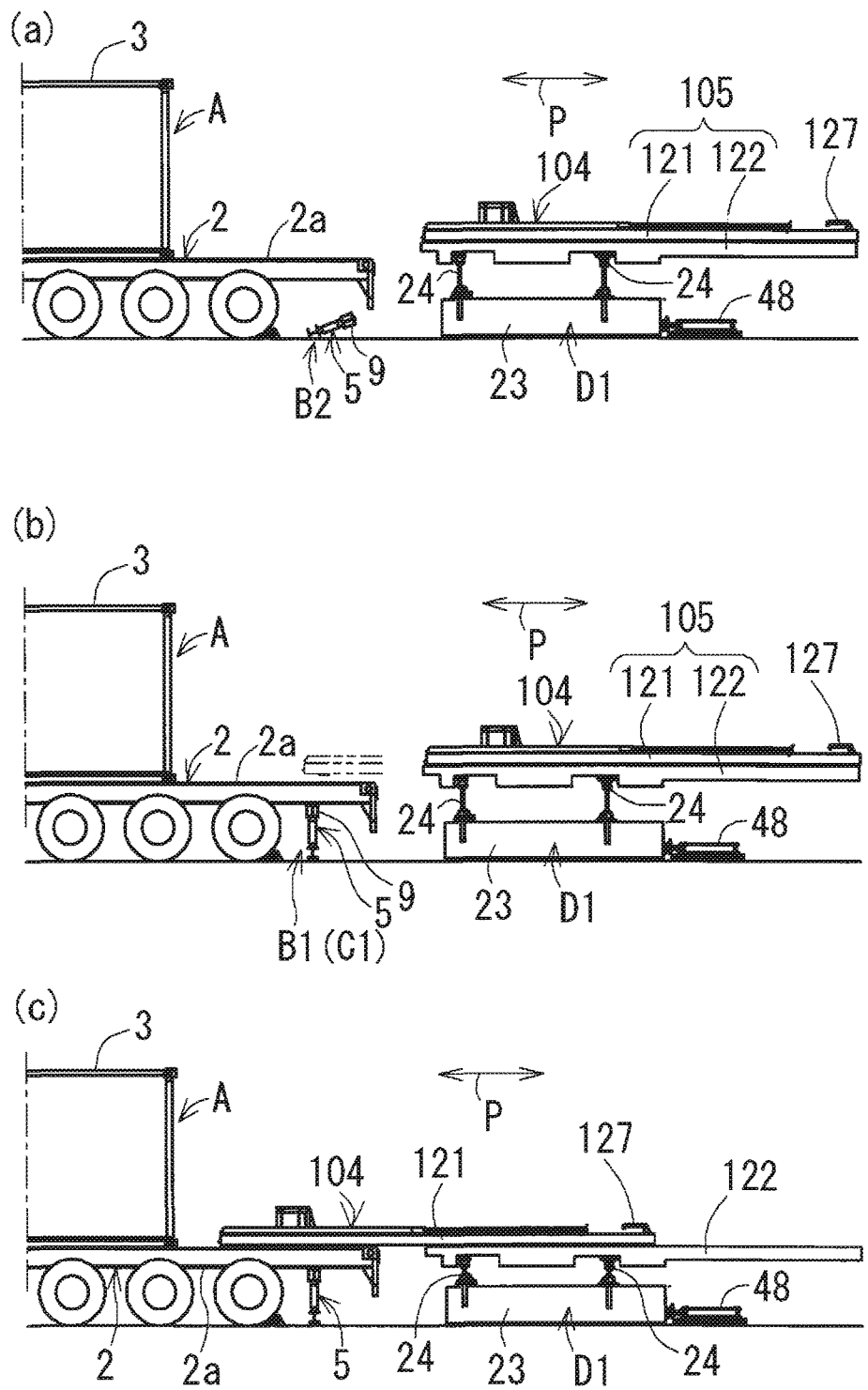
Figure 41:
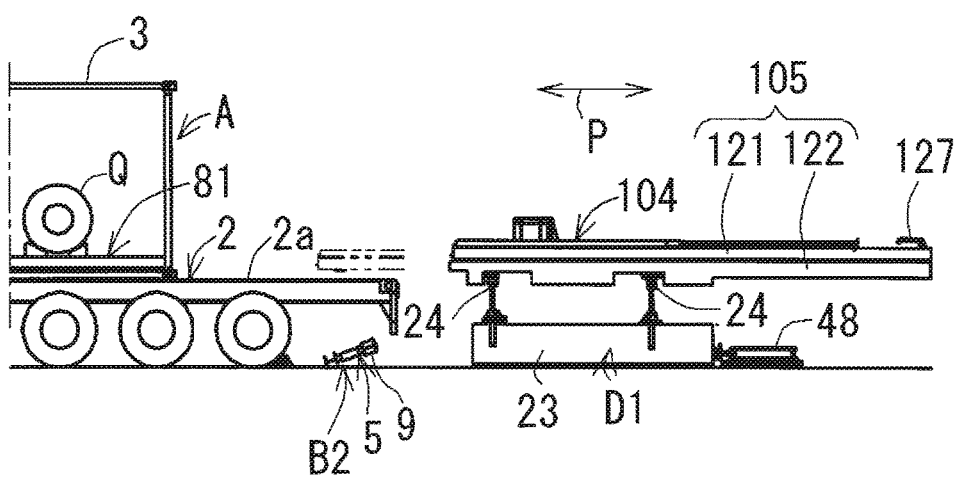
Figure 42:
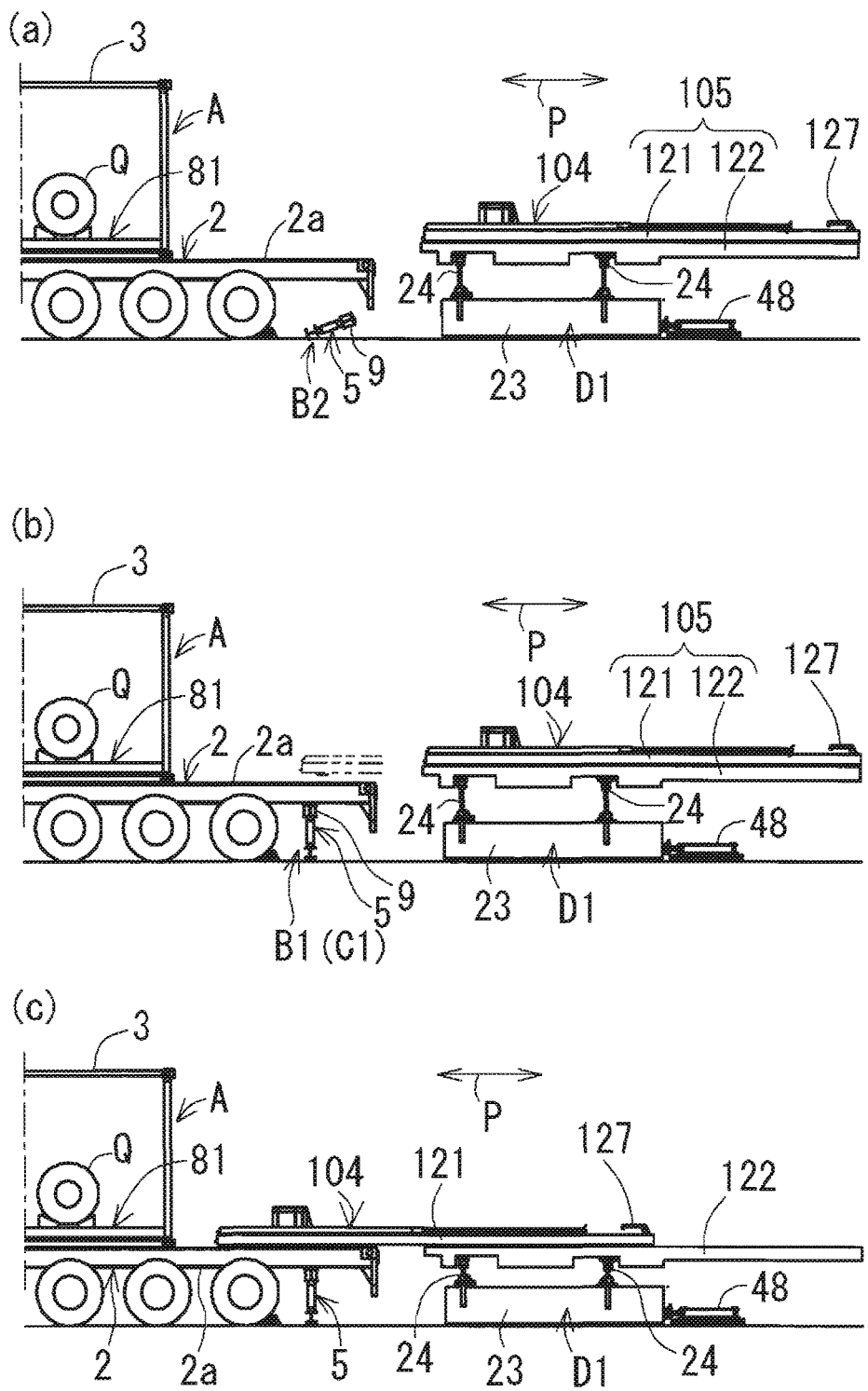

The auxiliary jack devices 131 are provided on left and right opposite sides of a front portion of the mobile body 23 (see FIG. 30). As shown in FIGS. 37 and 38, the auxiliary jack devices 131 are provided on the left and right opposite sides of the tip end side of the mobile body 23. Each of the auxiliary jack devices 131 includes a base mount 132, a support wall 133 rising from the base mount 132, and a lifting/lowering body 135 supported to be able to lift and lower along guide rails 134 provided to the support wall 133. The lifting/lowering body 135 is provided with a projection/receding cylinder 138 having a third lock pin 137 provided on a tip end side of its piston rod. The lifting/lowering body 135 is lifted and lowered by a screw jack 141 driven by a lifting/lowering motor 139 provided onto the base mount 132. By extension of the piston rod of the projection/receding cylinder 138 when the trailer 2 is positioned in the predetermined position A, the third lock pins 137 are inserted from the width direction of the chassis 2a into the first insertion holes 71 in the corner fittings 70 of the container 3 mounted on the chassis 2a of the trailer 2. In this inserted states, the lifting/lowering bodies 135 are lifted by the lifting/lowering motors 139 to thereby raise the container 3.

(2) Workings of Conveyance System for Object to be Conveyed

Next, carrying-in (also referred to as "vanning") workings of the conveyance system 101 for the object to be conveyed having the above-described structure will be described. In the present example, the two pallets 81 on each of which the large weight coil-shaped object to be conveyed Q2 is loaded by use of the large weight attachments 93 (hereinafter, also referred to as "pallets 81 loaded with the objects to be conveyed") are arranged and stored in the container 3 (see FIG. 24(c)).

First, as shown in FIG. 39(a), the trailer 2 with doors on the opening end side 3a of the container 3 open is moved backward and positioned in the predetermined position A. Next, in the jack device 5, the lifting/lowering body 9 is brought into the upright state B1 by extension of the piston rods of the reversing cylinders 19 and the lifting/lowering body 9 is lifted in the upright state B1 to be brought into the raising state C1 by extension of the piston rod of the lifting/lowering cylinder 19 (see FIG. 5). Then, as shown in FIG. 39(b), the chassis 2a bulging rearward from the opening end side 3a of the container 3 is raised by the jack device 5 from below. Then, the engagement levers 127 of the mobile-side stage 121 are engaged in the engaged portions 126 in the conveyance body 104 (see FIG. 36). After that, as shown in FIG. 39(c), the mobile-side stage 121 is caused to move forward on the fixed-side stage 122 together with the conveyance body 104 by the push chain 107 (see FIG. 29).

Next, as shown in FIG. 40(a), the mobile body 23 which is in the standby state D1 and lifted from the floor face by the air bearings 45 is moved forward by extension of the piston rods of the moving cylinders 48. During the forward movement of the mobile body 23, the fixed-side stage 122 is lowered by the jack mechanisms 24 so that the lower face of the mobile-side stage 121 and the upper face of the chassis 2a come close to each other and the guide rollers 50 are brought into the projecting states by extension of the piston rods of the guiding cylinders 51 and guided by the guide portions 52 (see FIG. 13(a)). On the other hand, immediately before the end of the forward movement of the mobile body 23 (i.e., immediately before the mobile body 23 comes into advanced state D2), the guide rollers 50 are brought into the receding states by contraction of the piston rods of the guiding cylinders 51 and the guiding by the guide portions 52 is cancelled (see FIG. 13(b)). When the mobile body 23 is brought into the advanced state D2, the second lock pins 68 are inserted into the second insertion holes 72 in the corner fittings 70 of the container 3 and the first lock pins 65 are inserted by the lock mechanisms 61 into the first insertion holes 71 in the corner fittings 70 of the container 3 and drawn rearward (see FIG. 15(b)).

Then, the opening end side 3a of the container 3 and the tip end side of the mobile-side stage 121 come in contact with and are connected to each other in the front-back direction P of the chassis 2a and the mobile-side stage 121 is accurately positioned in the width direction and the front-back direction with respect to the chassis 2a. Then, the fixed-side stage 122 is further lowered by the jack mechanisms 24 and the mobile-side stage 121 is placed onto the chassis 2a. At this time, the floor face of the container 3 and the floor face of the mobile-side stage 121 are substantially flush with each other.

Then, as shown in FIG. 40(b), the pallet 81 which is loaded with the object to be conveyed and which is suspended and transferred by the crane or the like is lowered onto the predetermined position on the mobile-side stage 121. At this time, the conveyance body 104 is on standby below the pallet 81 loaded with the object to be conveyed. Then, the engagement levers 127 of the mobile-side stage 121 are disengaged from the engaged portions 126 in the conveyance body 104 to cancel the engagement (see FIG. 36). Next, as shown in FIG. 40(c), compressed air is supplied into the expanding/contracting members 118 to cause the conveyance body 104 to raise the pallet 81 loaded with the object to be conveyed from the floor face (see FIG. 35(a)) and the push chain 107 (see FIG. 29) causes the conveyance body 104 to travel from the position on the mobile-side stage 121 toward the inside of the container 3. Then, the compressed air is exhausted from the expanding/contracting members 118 to cause the conveyance body 104 to place the pallet 81 loaded with the object to be conveyed onto the floor face of the container 3 (see FIG. 35(b)). Then, by repeating the above-described workings according to the number of pallets 81 which are loaded with the objects to be conveyed and which are to be stored into the container 3, the predetermined number of pallets 81 loaded with the objects to be conveyed are carried into the container 3.

When a series of carrying-in operations are finished as described above, as shown in FIG. 41, the stage device 102 is returned into a state before setting. To put it concretely, the engagement levers 127 of the mobile-side stage 121 are engaged in the engaged portions 126 in the conveyance body 104 (see FIG. 36). Then, the mobile-side stage 121 is lifted slightly from the upper face of the chassis 2a by the jack mechanisms 24. In this state, the first lock pins 65 are withdrawn from the first insertion holes 71 by the lock mechanisms 61 and the mobile body 23 is caused to move rearward by contraction of the moving cylinders 48 to withdraw the second lock pins 68 from the second insertion holes 72. Then, the mobile-side stage 121 is caused to move rearward on the fixed-side stage 122 together with the conveyance body 104 by the push chain 107 (see FIG. 29). Then, it is cancelled to raise the chassis 2a by the jack device 5.

Next, carrying-out (also referred to as "devanning") workings of the conveyance system 101 for the object to be conveyed having the above-described structure will be described. In the present example, the two pallets 81 on each of which the large weight coil-shaped object to be conveyed Q2 is loaded by use of the large weight attachments 93 (hereinafter also referred to as "pallets 81 loaded with the objects to be conveyed") are arranged and stored in the container 3 (see FIG. 24(c)).

First, as shown in FIG. 42(a), the trailer 2 with the doors on the opening end side 3a of the container 3 open is moved backward and positioned in the predetermined position A. Next, in the jack device 5, the lifting/lowering body 9 is brought into the upright state B1 by extension of the piston rods of the reversing cylinders 19 and the lifting/lowering body 9 is lifted in the upright state B1 to be brought into the raising state C1 by extension of the piston rod of the lifting/lowering cylinder 17 (see FIG. 5). Then, as shown in FIG. 42(b), the chassis 2a bulging rearward from the opening end side 3a of the container 3 is raised by the jack device 5 from below. Then, the engagement levers 127 of the mobile-side stage 121 are engaged in the engaged portions 126 in the conveyance body 104 (see FIG. 36). After that, as shown in FIG. 42(c), the mobile-side stage 121 is caused to move forward on the fixed-side stage 122 together with the conveyance body 104 by the push chain 107 (see FIG. 29).

Next, as shown in FIG. 43(a), the mobile body 23 which is in the standby state D1 and lifted from the floor face by the air bearings 45 is moved forward by extension of the piston rods of the moving cylinders 48. During the forward movement of the mobile body 23, the fixed-side stage 122 is lowered by the jack mechanisms 24 so that the lower face of the mobile-side stage 121 and the upper face of the chassis 2a come close to each other and the guide rollers 50 are brought into the projecting states by extension of the piston rods of the guiding cylinders 51 and guided by the guide portions 52 (see FIG. 13(a)). On the other hand, immediately before the end of the forward movement of the mobile body 23 (i.e., immediately before the mobile body 23 comes into the advanced state D2), the guide rollers 50 are brought into the receding states by contraction of the piston rods of the guiding cylinders 51 and the guiding by the guide portions 52 is cancelled (see FIG. 13(b)). When the mobile body 23 is brought into the advanced state D2, the second lock pins 68 are inserted into the second insertion holes 72 formed in the corner fittings 70 of the container 3 and the first lock pins 65 are inserted by the lock mechanisms 61 into the first insertion holes 71 in the corner fittings 70 of the container 3 and drawn rearward (see FIG. 15(b)).

Then, the opening end side 3a of the container 3 and the tip end side of the mobile-side stage 121 come in contact with and are connected to each other in the front-back direction P of the chassis 2a and the mobile-side stage 121 is accurately positioned in the width direction and the front-back direction with respect to the chassis 2a. Then, the fixed-side stage 122 is further lowered by the jack mechanisms 24 and the mobile-side stage 121 is placed onto the chassis 2a. At this time, the floor face of the container 3 and the floor face of the mobile-side stage 121 are substantially flush with each other.

Next, the engagement levers 127 of the mobile-side stage 121 are disengaged from the engaged portions 126 in the conveyance body 104 to cancel the engagement (see FIG. 36). Then, as shown in FIG. 43(b), the conveyance body 104 on the mobile-side stage 121 is caused to travel toward the inside of the container 3 by the push chain 107 (see FIG. 29). Then, compressed air is supplied into the expanding/contracting members 118 to cause the conveyance body 104 to raise the pallet 81 loaded with the object to be conveyed from the floor face while the conveyance body 104 is positioned directly below the pallet 81 which is loaded with the object to be conveyed and which is placed in the container 3 (see FIG. 35(a)) and the conveyance body 104 is caused to travel toward the mobile-side stage 121 by the push chain 107. Then, as shown in FIG. 43(c), the compressed air is exhausted from the expanding/contracting members 118 to cause the conveyance body 104 to place the pallet 81 loaded with the object to be conveyed onto the floor face of the mobile-side stage 121 (see FIG. 35(b)). Then, the pallet 81 loaded with the object to be conveyed is transferred from the position on the mobile-side stage 121 by the crane or the like. Then, by repeating the above-described workings according to the number of pallets 81 which are loaded with the objects to be conveyed and which are stored in the container 3, the predetermined number of pallets 81 loaded with the objects to be conveyed are carried out of the container 3.

When a series of carrying-out operations are finished as described above, as shown in FIG. 44, the stage device 102 is returned into the state before setting. To put it concretely, the engagement levers 127 of the mobile-side stage 121 are engaged in the engaged portions 126 in the conveyance body 104 (see FIG. 36). Then, the mobile-side stage 121 is lifted slightly from the upper face of the chassis 2a by the jack mechanisms 24. In this state, the first lock pins 65 are withdrawn from the first insertion holes 71 by the lock mechanisms 61 and the mobile body 23 is caused to move rearward by contraction of the moving cylinders 48 to withdraw the second lock pins 68 from the second insertion holes 72. Then, the mobile-side stage 121 is caused to move rearward on the fixed-side stage 122 together with the conveyance body 104 by the push chain 107. Then, it is cancelled to raise the chassis 2a by the jack device 5.

Next, conveyance workings for the object to be conveyed by use of the auxiliary jack devices 131 having the above-described structures will be described. In the present example, a twenty-foot dry container is mounted on the chassis 2a which can be mounted with a twenty-foot dry container and the chassis 2a is not bulging rearward from the opening end side 3a of the container 3. In conveyance of the object to be conveyed by use of the auxiliary jack devices 31, the lock mechanisms 61 are detached from the mobile-side stage 121.

First, as shown in FIG. 45(a), the trailer 2 with the doors on the opening end side 3a of the container 3 open is moved backward and positioned in the predetermined position A. Next, the corner fittings 70 of the opening end side 3a of the container 3 are unlocked so that a connected state between the container 3 and the chassis 2a is cancelled. Then, as shown in FIG. 45(b), air is supplied to the air bearings 45 to lift the mobile body 23 from the floor face and the mobile body 23 is caused to move forward by extension of the piston rods of the moving cylinders 48 from this state. Then, guides 142 (see FIG. 37) provided to the auxiliary jack devices 131 come in contact with and are guided by the corner fittings 70 of the container 3 and the mobile body 23 comes into the advanced state D2. After that, the third lock pins 137 are inserted into the first insertion holes 71 by extension of the piston rods of the projection/receding cylinders 138 (see FIG. 37) and air is exhausted from the air bearings 45. Then, the jacks 141 are extended to raise the container 3 until the container 3 comes into a substantially horizontal state. Then, the fixed-side stage 122 is lowered so that the floor face of the container 3 and the floor face of the mobile-side stage 121 are aligned with each other in height. Then, conveyance of the object to be conveyed Q by the conveyance body 104 is carried out between the container 3 and the mobile-side stage 121.

(3) Effect of Embodiment

According to the conveyance system 101 for the object to be conveyed of the embodiment, the conveyance system 101 provides the function/effect approximately similar to that of the conveyance system 1. Also, there is the form in which the stage 105 includes the mobile-side stage 121 on which the conveyance body 104 travels and the fixed-side stage 122 which supports the mobile-side stage 121 so that the mobile-side stage 121 can move in the front-back direction P of the chassis 2a and which is lifted and lowered by the jack mechanism 24. In this way, by moving the mobile-side stage 121 in the front-back direction P of the chassis 2a with respect to the fixed-side stage 122 to change the slide position, it is possible to convey the object to be conveyed Q to the container 3 with the chassis 2a bulging rearward from the opening end side 3a of the container 3 and it is possible to convey the object to be conveyed Q to the container 3 with the chassis 2a not bulging rearward from the opening end side 3a of the container 3.

Further, in the embodiment, the push chain 107 for causing the conveyance body 104 to travel is connected to the conveyance body 104 and the mobile-side stage 121 is provided with the engagement lever 127, which can be engaged with and disengaged from the engaged portion 126 provided to the conveyance body 104, so that the engagement lever 127 can swing. In this way, by engaging the engagement lever 127 with the engaged portion 126, the push chain 107 can move the mobile-side stage 121 in the front-back direction P of the chassis 2a together with the conveyance body 104.

The invention is not limited to the above-described examples and the examples can be changed in various ways without departing from the scope of the invention according to purposes and uses. In other words, although the stage 22 or the mobile-side stage 121 is lowered while the mobile body 23 is moved forward in placing the stage 22 or the mobile-side stage 121 onto the chassis 2a in the above-described examples, the invention is not limited to it. For example, the forward movement of the mobile body 23 and the lowering of the stage 22 of the mobile-side stage 121 may be carried out separately in a predetermined order.

Although the opening end side of the container and the tip end side of the stage 22 or the mobile-side stage 121 are brought into contact with and connected to each other in placing the stage 22 or the mobile-side stage 121 onto the chassis 2a in the above-described examples, the invention is not limited to it. For example, the opening end side of the container and the tip end side of the stage 22 or the mobile-side stage 121 may be brought close and connected to each other.

Although the lock mechanisms 61 to be driven by the cylinders 66, 67 are shown as examples in the above-described examples, the invention it not limited to them. For examples, lock mechanisms to be driven by motors may be employed. Although the lock mechanisms 61 each of which includes the drive source (cylinder 66) for inserting the lock pin 65 and the drive source (cylinder 67) for drawing the lock pin 65 are shown as the example in the above-described example, the invention is not limited to them. For example, lock mechanisms each of which carries out an inserting operation and a drawing operation of a lock pin 65 with a single drive source (e.g., a cylinder or a motor) may be employed.

Furthermore, although the lock pins 65 are inserted into the insertion holes 71 in the corner fittings 70 of the container 3 and drawn rearward by the lock mechanisms 61 and then the stage 22 or the mobile-side stage 121 is lowered and placed onto the chassis 2a in the above-described examples, the invention is not limited to it. For example, the stage 22 or the mobile-side stage 121 may be lowered and placed onto the chassis 2a and then the lock pins 65 may be inserted into the insertion holes 71 in the corner fittings 70 of the container 3 and drawn rearward by the lock mechanisms 61.

Although the jack device 5 to be actuated by the lifting/lowering cylinder 17 is shown as an example in the above-described examples, the invention is not limited to it. For example, a jack device to be actuated by a lifting/lowering motor may be employed.

Although the jack mechanisms 24 which are actuated by the lifting/lowering motors 54 are shown as examples in the above-described examples, the invention is not limited to them. For example, jack mechanisms to be actuated by lifting/lowering cylinders may be employed. Moreover, although the screw-type jack mechanisms 24 are shown as examples in the above-described examples, the invention is not limited to them. For example, rack-type jack mechanisms may be employed.

Although the conveyance bodies 21, 104 to be caused to travel by the push chains 26, 107 are shown as examples in the above-described examples, the invention is not limited to them. For example, a conveyance body for traveling by itself by use of a traveling motor (e.g., a motor having a rotating shaft or a linear motor) or a conveyance body which is lifted by air and pushed by a person or a cylinder to travel may be employed.

Although the mobile body 23 which is lifted by air and pushed by the cylinders 48 to travel is shown as an example in the above-described examples, the invention is not limited to it. For example, a mobile body is lifted by air and pushed by a person to travel or a mobile body which travels by itself by use of a traveling motor (e.g., a motor having a rotating shaft or a linear motor) may be employed.

Furthermore, although the rollers 36 to be guided by the guide portions 37 are shown as examples of the guided portions of the conveyance body 21 in the above-described examples, the invention is not limited to them. For example, balls, sliding portions, endless belts, or the like to be guided by the guide portions 37 may be employed.

Although the rollers 50 to be guided by the guide portions 52 are shown as examples of the guided portions of the mobile body 23 in the above-described examples, the invention is not limited to them. For example, balls, sliding portions, endless belts, or the like to be guided by the guide portions 52 may be employed.

Although the lifting/lowering bodies 56 of the front jack mechanisms 24 separate from the stage 22 and the contact is cancelled when the stage 22 is placed onto the chassis 2a in the above-described examples, the invention is not limited to it. For example, the lifting/lowering bodies 56 of the front and rear jack mechanisms 24 may separate from the stage 22 and the contact may be cancelled.

Although the hole-shaped engaged portions 126 in and from which the engagement levers 127 are engaged and disengaged are shown as examples in the above-described examples, the invention is not limited to them. For example, protruding or recessed engaged portions may be employed.

Although the semi-trailer is shown as an example of the trailer 2 in the above-described examples, the invention is not limited to it. For example, a full-trailer or the like may be employed.

Although the dry container is shown as an example of the container 3 in the above-described examples, the invention is not limited to it. For example, a reefer container, an open top container, or the like may be employed.

Moreover, although the coil-shaped object to be conveyed is shown as an example of the object to be conveyed Q in the above-described examples, the invention is not limited to it.

For example, a plate-shaped, long, or block-like object to be conveyed may be employed. Examples of material of the object to be conveyed include steel, stainless steel, aluminum, plastic, glass, stone (e.g., a tombstone), and wood.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above-described embodiments, and various variations and modifications may be possible without departing from the scope of the present invention.

INDUSTRIAL APPLICABILITY

The invention is widely used as a technique of conveying an object to be conveyed to a container. Especially, the invention is suitably used as a technique of conveying an object to be conveyed to a dry container which has an opening end side on one end side in a longitudinal direction and which is used in land transportation, marine transportation, air transportation, and the like.

REFERENCE SIGNS LIST 1, 101 conveyance system for object to be conveyed
2 trailer
2a chassis
3 container
3a opening end side
5 jack device
6, 102 stage device
21, 104 conveyance body
22, 105 stage
23 mobile body
24 jack mechanism
36 rotary roller
37 guide portion
50 guide roller
52 guide portion
61 lock mechanism
65 first lock pin
70 corner fitting
71 first insertion hole
81 pallet
93 large weight attachment
94 large outside diameter attachment
P front-back direction of chassis
Q object to be conveyed

The invention claimed is:

1. A conveyance system for an object to be conveyed and for conveying an object to be conveyed to a container mounted on a chassis of a trailer with the chassis bulging rearward from an opening end side of the container, the conveyance system comprising:
- a jack device configured to lift the chassis from below; and
- a stage device arranged behind the jack device,
- wherein the stage device includes a conveyance body on which the object to be conveyed is placed and conveyed, a stage on which the conveyance body travels, a mobile body for supporting the stage and configured to move in a front-back direction of the chassis, and a jack mechanism provided to the mobile body to raise the stage from below so that the stage is lifted or lowered,
- wherein the mobile body moves forward and the jack mechanism lowers the stage while the jack device raises the chassis from below to thereby place the stage on the chassis so that the opening end side of the container and a tip end side of the stage are connected to each other, and the conveyance body on which the object to be conveyed is placed, travels on floor faces of the stage and the container in this state to thereby convey the object to be conveyed to the container,
- wherein a front portion of the stage extends beyond a front edge of the mobile body.

2. The conveyance system for an object to be conveyed according to claim 1, wherein the conveyance body includes a guided portion to be guided by a guide portion provided to the stage when the conveyance body travels on the stage.

3. The conveyance system for an object to be conveyed according to claim 1, wherein the stage has a lock mechanism for inserting a lock pin into an insertion hole formed in a corner fitting of the container from a width direction of the chassis and drawing the lock pin rearward.

4. The conveyance system for an object to be conveyed according to claim 3, wherein the mobile body includes a guided portion to be guided by a guide portion provided to a floor face when the mobile body moves in a front-back direction of the chassis.

5. The conveyance system for an object to be conveyed according to claim 1, wherein the object to be conveyed is a coil-shaped object to be conveyed which is loaded on a pallet, a large weight attachment is attached to the pallet when a weight of the coil-shaped object to be conveyed is larger than or equal to a predetermined value, and a large outside diameter attachment is attached to the pallet when an outside diameter of the coil-shaped object to be conveyed is larger than or equal to a predetermined value.

6. The conveyance system for an object to be conveyed according to claim 1, wherein the lowering of the stage is carried out during the forward movement of the mobile body in placing the stage onto the chassis.

7. The conveyance system for an object to be conveyed according to claim 1, wherein the jack device includes a support mount and a liftering/lowering body provided to the support mount to be able to lift/lower and tilt, the lifting/lowering body is configured to lift the chassis from below.

8. A conveyance method for an object to be conveyed and using the conveyance system for an object to be conveyed to a container mounted on a chassis of a trailer, the conveyance system including a jack device configured to lift the chassis from below, and a stage device arranged behind the jack device, the stage device includes a conveyance body on which the object to be conveyed is placed and conveyed, a stage on which the conveyance body travels, a mobile body for supporting the stage and configured to move in a front-back direction of the chassis, and a jack mechanism provided to the mobile body to raise the stage from below so that the stage is lifted or lowered, the method comprising:
- moving the mobile body forward and lowering the stage with the jack mechanism while raising the chassis with the jack device from below to thereby place the stage on the chassis so that the opening end side of the container and the tip end side of the stage are connected to each other; and
- causing the conveyance body on which the object to be conveyed is placed to travel on floor faces of the stage and the container in this state to thereby convey the object to be conveyed to the container.

* * * * *